United States Patent
Li

(10) Patent No.: US 11,424,796 B1
(45) Date of Patent: Aug. 23, 2022

(54) PANEL SERIALIZER/DESERIALIZER (SERDES) ROUTING

(71) Applicant: Amazon Technologies, Inc., Seattle, WA (US)

(72) Inventor: Yan Li, San Diego, CA (US)

(73) Assignee: Amazon Technologies, Inc., Seattle, WA (US)

(*) Notice: Subject to any disclaimer, the term of this patent is extended or adjusted under 35 U.S.C. 154(b) by 108 days.

(21) Appl. No.: 16/940,242

(22) Filed: Jul. 27, 2020

(51) Int. Cl.
*H04B 17/12* (2015.01)
*H04B 7/06* (2006.01)
*H01Q 3/26* (2006.01)
*H04B 7/0417* (2017.01)

(52) U.S. Cl.
CPC ......... *H04B 7/0608* (2013.01); *H01Q 3/2605* (2013.01); *H04B 7/0417* (2013.01); *H04B 7/0617* (2013.01); *H04B 17/12* (2015.01)

(58) Field of Classification Search
CPC ..................................................... H04L 12/28

USPC .......................................................... 370/329
See application file for complete search history.

(56) References Cited

U.S. PATENT DOCUMENTS 6,370,188 B1 * 4/2002 Wu .................... H04L 27/2675
375/326

* cited by examiner

*Primary Examiner* — Dang T Ton
(74) *Attorney, Agent, or Firm* — Lowenstein Sandler LLP

(57) ABSTRACT

Technologies directed to Serializer/Deserializer (SerDes) connections and SerDes routing between digital beam forming (DBF) devices of a panel with an array of antenna elements, such as on satellite User Link panels, are described. A first DBF device is coupled to a first modem over a first SerDes link and coupled to RFFE circuitry. A second DBF device is coupled to the first DBF device over a second SerDes link. Each of the DBF devices is coupled to multiple antenna elements. The DBF devices route data between the modem and the other DBF devices, such as in a chain of DBF devices.

20 Claims, 42 Drawing Sheets

PANEL SERIALIZER/DESERIALIZER (SERDES) ROUTING

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, Personal Digital Assistants (PDAs), portable media players, tablet computers, netbooks, laptops, and the like. These electronic devices wirelessly communicate with a communications infrastructure to enable the consumption of the digital media items. In order to communicate with other devices wirelessly, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1A:
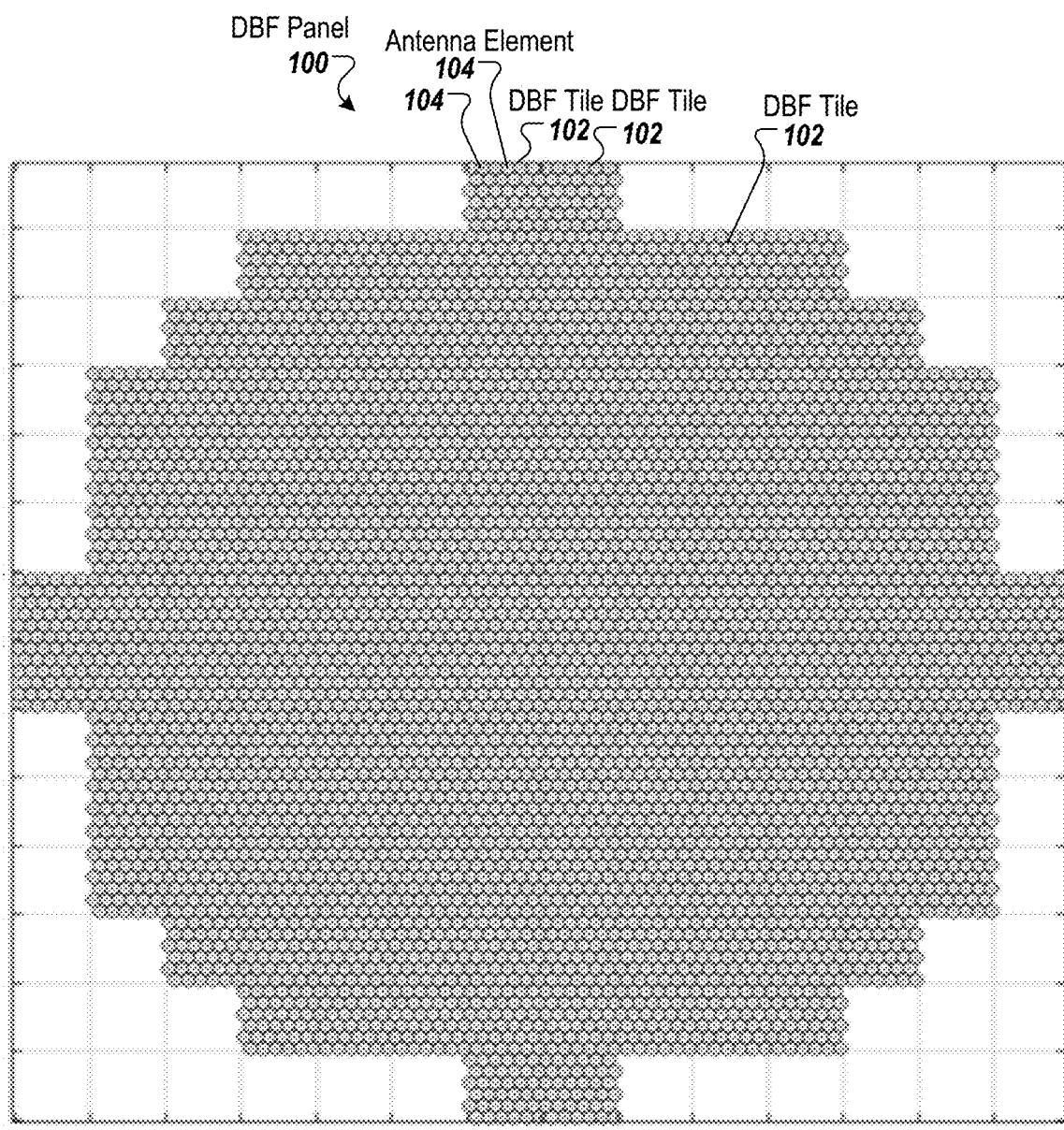
FIG. 1A illustrates a digital beam forming (DBF) panel with a staircase array according to one embodiment.

Technologies directed to SerDes connections and SerDes routing between DBF devices of a panel with an array of antenna elements, such as on satellite User Link panels, are described. An array of antenna elements, such as a phased array antenna, can include hundreds or thousands of antenna elements. The antenna elements can be arranged in antenna modules for applications in large array antennas, such as a phased array antenna. The panel can be made up of antenna modules, or simply modules, that include a subset of antenna elements with the subset containing one to tens of antenna elements. The modules can be individually manufactured and assembled as an array antenna. For several reasons including manufacturability and ease of assembly, array antennas in microwave and lower millimeter wave (mm-Wave) are built upon or are supported by Printed Wiring Boards (PWBs) or Printed Circuit Boards (PCBs), where the RF interconnects and possibly also the antenna elements are realized. In general, a PWB is similar to a PCB, but without any components installed on it. The large array antenna can be made up of an array of antenna modules that are attached to another substrate, such as a PWB, for interconnection. Each antenna module thus incorporates an integer number of antenna elements. The antenna modules are often very closely spaced between each other, preventing the insertion of any other component between them.

Conventionally, a modem is coupled to a DBF device and the DBF device is coupled to front-end radio frequency (RFFE) circuitry. The RFFE circuitry is coupled to one or more antenna elements. Given the size of the array antenna, data latency and size of memory used for data synchronization can be problematic in conventional designs.

Aspects of the present disclosure overcome the deficiencies of conventional array antennas by providing a connection network of SerDes links between DBF devices on a panel. Modem data routing through the connection network of SerDes links on the panel (e.g., satellite User Link panel) can have big impact on data latency and size of memory used for data synchronization. The embodiments described herein describe effects of different SerDes connections, different SerDes routing, different arrangements of circuit boards in a sectorized panel (e.g., four-quadrants, H-cut, T-cut, and V-cut panels), as well as re-routing for failure cases of DBF devices on the panel. A sectorized panel is a panel in which multiple circuit boards are arranged to provide an aperture of antenna elements as described herein. The sectorized panel can be used in a way that accommodates the SerDes connections on the circuit boards in view of the routing patterns, as well as the SerDes connections between circuit boards. The areas or gaps between the circuit boards can correspond to places where there is no need for SerDes connections between circuit boards. In some embodiments, antenna elements are arranged on a triangular lattice. A feed point (such as an antenna feed element) is associated with each antenna element. In order to arrange the antenna elements on a triangular lattice, the feed points can be used as a reference. In other words, the feed points can be placed at each location of a triangular lattice. Arranging antenna elements on a triangular lattice improves performance by removing or reducing the grating lobes and simplifies the array antenna architecture by reducing the number of antenna elements that are required. Reducing the number of antenna elements reduces complexity, cost, mass, and power consumption (or power requirements) of the array antenna. Aspects of the present disclosure can use rectangular antenna modules that are identical to facilitate manufacturing, assembly, and part management. The array antenna is constructed using the antenna rectangular antenna modules. The antenna modules can be manufactured from a ceramic-based material, a Teflon-based material, organic materials, or the like. The antenna elements can be printed on the modules (e.g., using copper). The antenna elements should be printed on the antenna modules in such a way to minimize the space between an edge of the antenna module and one of the antenna elements near the edge. In this way, the antenna elements can be spaced closer together when the antenna modules are assembled together, and the grading lobes can be minimized.

FIG. 1A illustrates a digital beam forming (DBF) panel 100 with a staircase array according to one embodiment. The DBF panel 100 includes multiple DBF tiles 102. Each of the DBF tiles 102 includes a DBF device (not illustrated in FIG. 1), and a set of antenna elements 104, represented as the circles of each of the DBF tiles 102. The DBF tiles 102 are illustrates as a box within the grid lines. In the illustrated embodiment, the DBF panel 100 includes 140 DBF tiles 102, as well as 140 DBF devices. Alternatively, the DBF panel 100 can include more or less DBF tiles and more or less DBF devices. The DBF device is an integrated circuit that is configured to perform operations in connection with beam forming (also referred to as beam steering). It should be noted that the DBF device represents a data producer or a data consumer device that is connected with other data producers or data consumers using the SerDes links as described herein. The SerDes network of links can include some backup links for routing and re-routing signals between the data producers/consumers. This routing intelligence allows the panel to deal with failures of one or more of these devices in the SerDes network. For example, in another embodiment, the SerDes network can be used in connection with a sensor array in which sensor circuits of the sensor array are coupled together using the SerDes network and use similar techniques as described herein to send and receive data between the individual circuits of the SerDes network. In other embodiments, a panel can include analog beam forming circuits as well.

Referring back to FIG. 1A, each DBF device, such a TX DBF device, can handle 36 antenna elements by connecting to nine front-end integrated circuits (FEICs), each of which in turn connects to 4 antenna elements. For example, each DBF device in the first chain and the second chain is coupled to a respective set of RFFE circuits and each of the set of RFFE circuits is coupled to at least one antenna element. The FEICs can include RF circuitry, such as power amplifiers, low noise amplifiers (LNA), mixers, impedance matching, or the like. The four antenna elements can be organized as two rows of two elements that are aligned or offset. Alternatively, the DBF device can be coupled to any number of antenna elements via different configurations of RFFE circuitry. Each of the DBF devices are coupled together as illustrated in FIG. 1B.

Figure 1B:
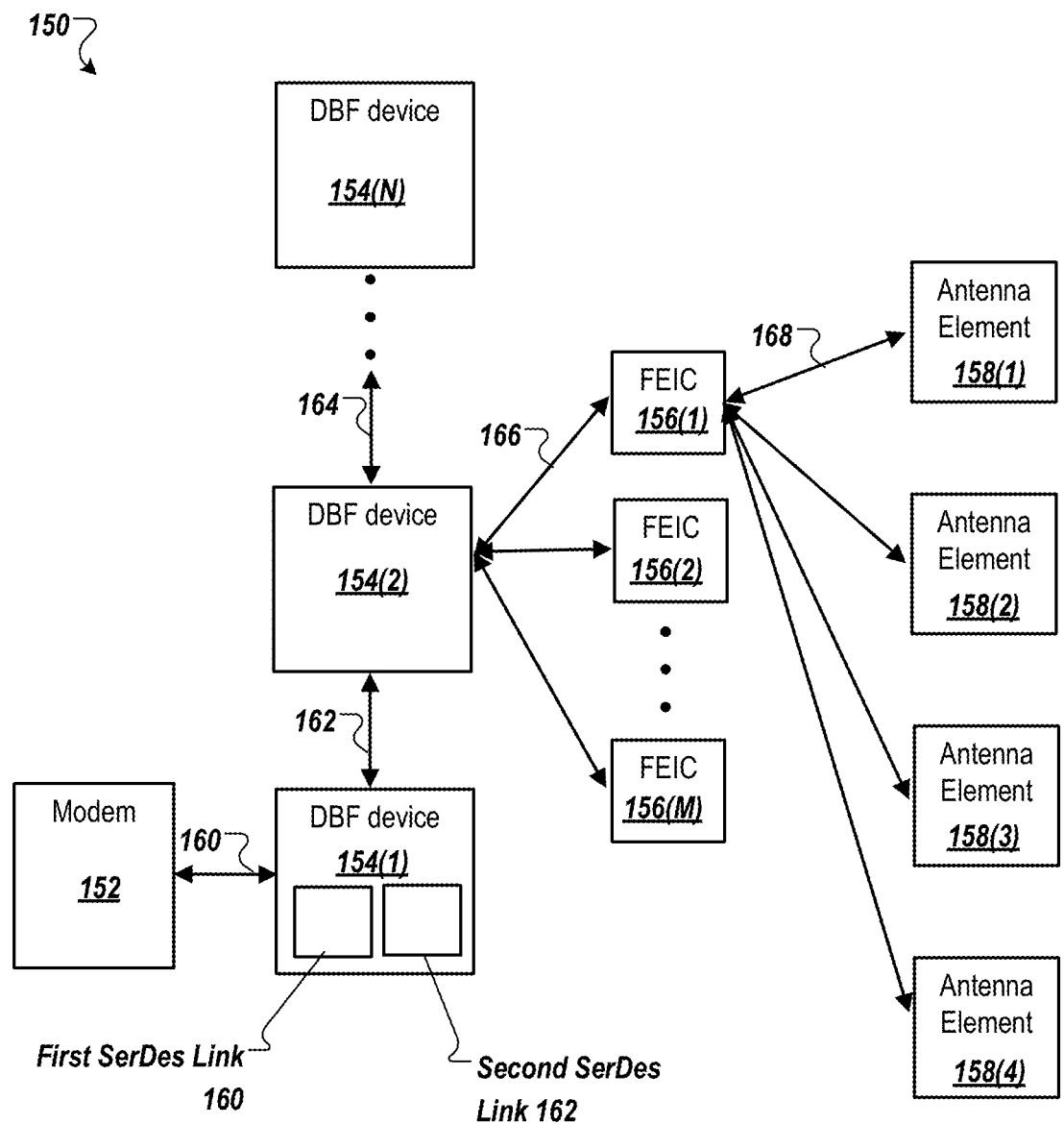
FIG. 1B illustrates a block diagram of a portion of a panel, including a modem, multiple DBF devices, multiple FEICs, and multiple antenna elements according to one embodiment.

FIG. 1B illustrates a block diagram of a portion of a panel 150, including a modem 152, multiple DBF devices 154, multiple FEICs 156, and multiple antenna elements 158 according to one embodiment. The modem 152 is coupled to a first DBF device 154(1) over a first SerDes link 160 (e.g., a first SerDes connection). The SerDes links can include one or more SerDes connections. The first DBF device 154 is coupled to a second DBF device 154(2) over a second SerDes link 162 (e.g., a second SerDes connection). The second DBF device 154(2) can be coupled to one or more additional DBF devices 154(N), where N is a positive integer, over one or more additional SerDes connections 164. Each of the DBF devices 154 can be coupled to one or more FEICs 156. For example, the second DBF device 154(2) is coupled to M number of FEICs 156(1)-156(M), where M is a positive integer. For example, each DBF device 154 can be coupled to nine FEICs 156. The DBF devices 154 can be coupled to the FEIC 156 over a wired connection 166, such as a circuit board trace or a transmission line that is coupled between the DBF device 154 and the FEIC 156. Each of the FEICs 156 can be coupled to one or more antenna elements 158. For example, the first FEIC 156(1) is coupled to four antenna elements 158(1)-158(4). The FEIC 156 can be coupled to the antenna element 158 over a wired connection 168, such as a circuit board trace or a transmission line between the FEIC 156 and the antenna element 158. Alternatively, the first FEIC 156(1) can be coupled to more or less antenna elements than four. It should be noted that the wired connections 166 and 168 are not SerDes connections.

In the illustrated embodiment, the first DBF device 154(1) is considered to be a modem entry. A modem entry is a DBF device that connects to one or more modems of the panel. The modem entry is an ingress and egress for data signals and control signals to and from a modem to which it is connected (i.e., modem 152 in the illustrated embodiment).

In one embodiment, a first set of antenna elements is coupled to a first RFFE circuit of a first set of RFFE circuits that is coupled to the first DBF device 154(1). A second set of antenna elements is coupled to a second RFFE circuit of the first set. A third set of antenna elements is coupled to a first RFFE circuit of the second set of RFFE circuits (e.g., FEIC 156(1)-(M). It should be noted that in another embodiment, the DBF devices can couple directly to the antenna elements without the RFFE circuits. Some or all of the functionality of the set of RFFE circuits can be implemented in the DBF devices. The DBF devices 154 can be part of a TX panel. In the TX panel, the first DBF device 154(1) is configured to receive a first data stream from the modem 152 over the first SerDes link 160, send the first data stream to the second DBF device 154(2) over the second SerDes link 162 and send at least a portion of the first data stream to the first set of RFFE circuits. In another embodiment, the DBF devices 154 can be part of a RX panel. In the RX panel, the first DBF device 154(1) is configured to receive a first data stream from the first set of RFFE circuits, receive a second data stream from the second DBF device 154(2) over the second SerDes link 162, and send a combined data stream to the modem 152 over the first SerDes link 160. The combined data stream includes at least a portion of the first data stream and at least a portion of the second data stream with matching time stamps.

In another embodiment, the first DBF device 154(1) includes a digital signal processing (DSP) unit and a memory device coupled to the DSP unit. The DSP unit is configured to receive a first data stream from the first set of RFFE circuits, process the first data stream, and store the first data stream with the first time stamp data in the memory device. The DSP unit also receives a second data stream from the second DBF device 154(2) over the second SerDes link 162. The second data stream includes second time stamp data. The DSP unit combines, into a combined data stream, a portion of the first data stream and a portion of the second data stream, and outputs the combined data stream to the modem 152 over the first SerDes link 160. The first time stamp data of the portion of the first data stream matches the second time stamp data of the portion of the second data stream.

Figure 7:
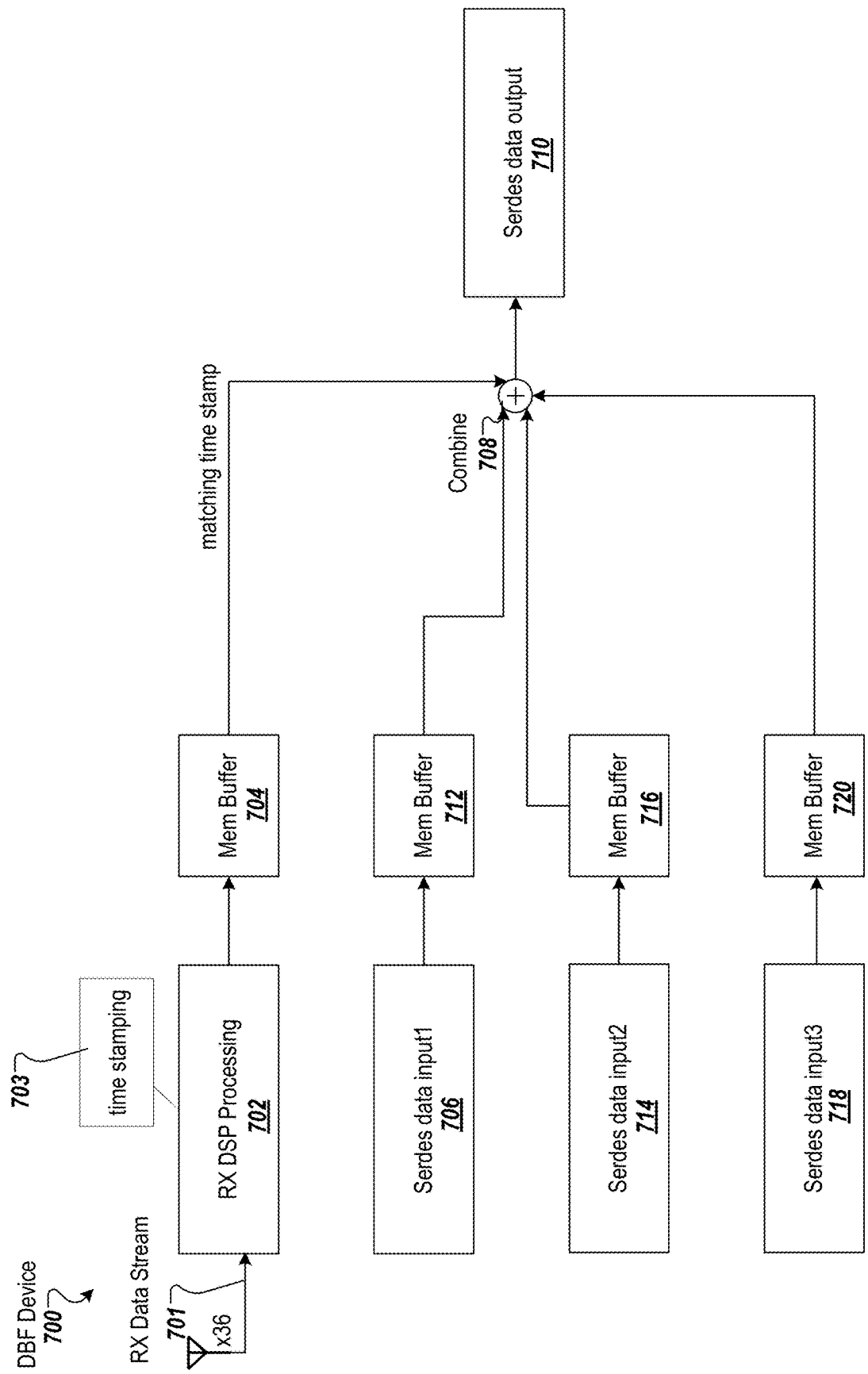
FIG. 7 is a block diagram of a symmetrical RX data combining path of four streams according to one embodiment.

As illustrated in FIG. 7, the memory device can include a first memory buffer, a second memory buffer, and a third memory buffer. The first memory buffer can store the first data stream. The second memory buffer can store the second data stream received from the second DBF device 154(2) over the second SerDes link 162. The third memory buffer can store a third data stream received from a third DBF device over a third SerDes link (not illustrated in FIG. 1B). The DSP unit is further configured to combine a portion of the third data stream into the combined data stream. The portion of the third data stream comprise third time stamp data that matches the first time stamp data and the second time stamp data.

Figure 8:
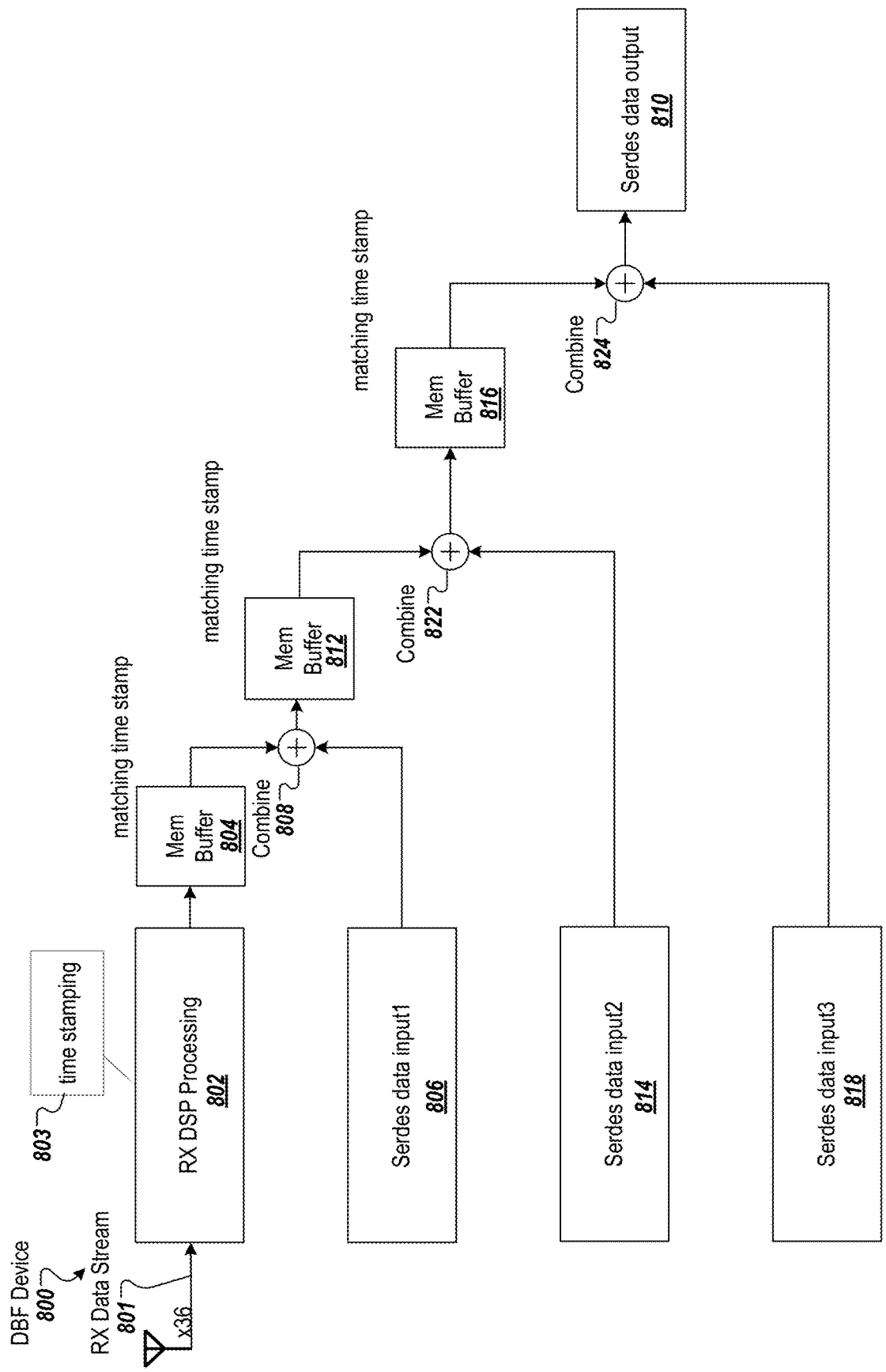
FIG. 8 is a block diagram of a pipelined RX data combining path of four streams according to one embodiment.

As illustrated in FIG. 8, the memory device can include a first memory buffer, a second memory buffer, and a third memory buffer. The first memory buffer can store the first data stream. The second memory buffer can store the combined data stream. The third memory buffer can store a third data stream received from a third DBF device over a third SerDes link. The DSP unit is further configured to combine a portion of the third data stream with the combined data stream into a second combined data stream. The portion of the third data stream comprise third time stamp data that matches the first time stamp data and the second time stamp data.

Figure 9:
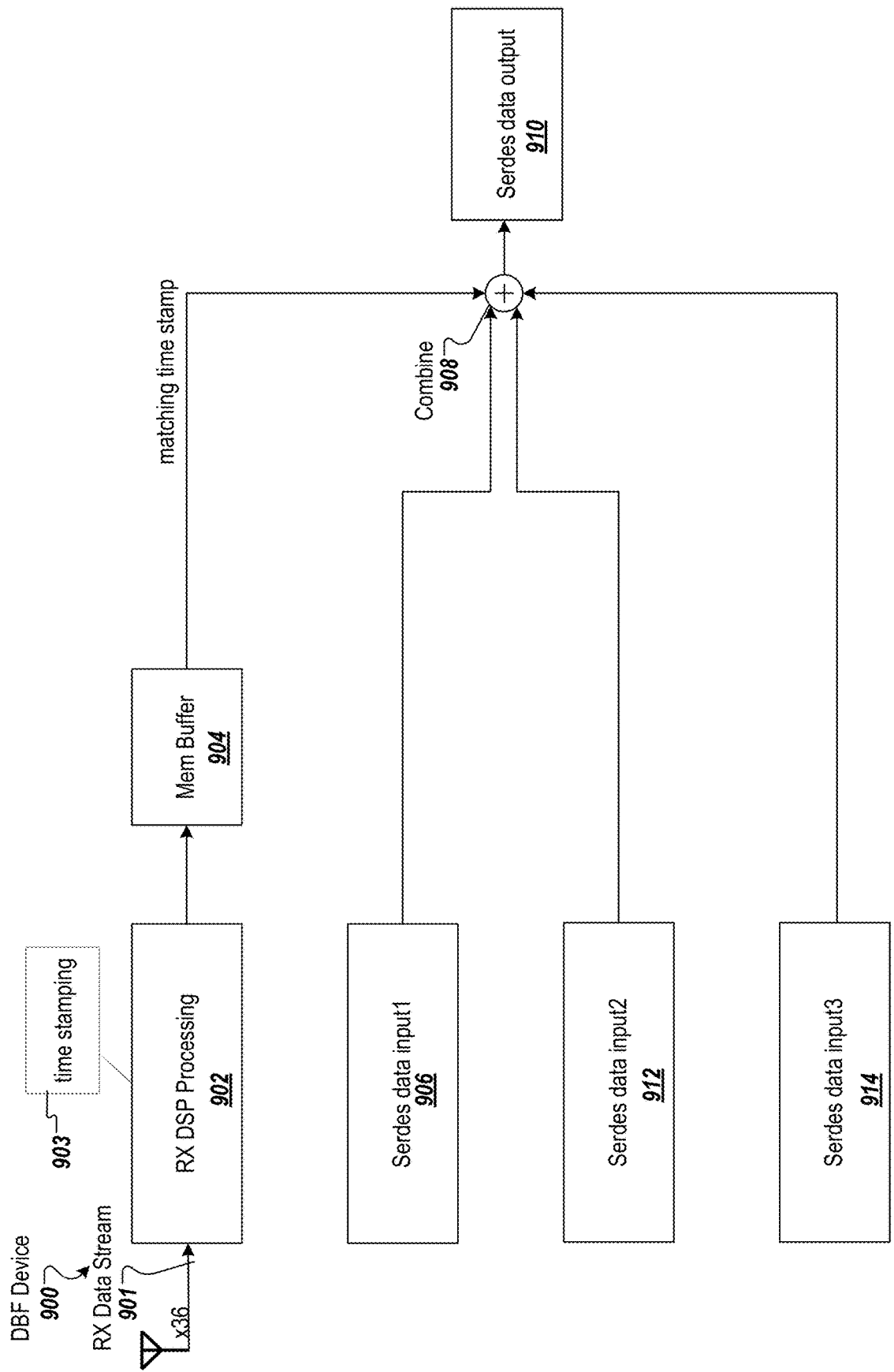
FIG. 9 is a block diagram of a pre-balanced RX data combining path of four streams according to one embodiment.

As illustrated in FIG. 9, the memory device can include a single memory buffer that stores the first data stream. The DSP unit is further configured to receive a second data stream from a second DBF device over a second SerDes link and a third data stream from a third DBF device over a third SerDes link. The second data stream includes second time stamp data and the third data stream includes third time stamp data. The DSP unit combines, into the combined data stream the portion of the first data stream, the portion of the second data stream, and a portion of the third data stream and outputs the combined data stream to the modem 152 over the first SerDes link 160. The first time stamp data, the second time stamp data, and the third time stamp data match. In this embodiment, the portion of the second data stream is delayed at the second DBF device 154(2) and the portion of the third data stream is delayed at the third DBF device such that the portion of the second data stream and the portion of the third data stream are not stored in the first memory buffer. That is, the portions of the second data stream and the third data stream arrive at a time that the portion of the first data stream is available for being combined.

It should also be noted that FIG. 1B shows only two of the SerDes links of the first DBF device 154(1) and the second DBF device 154(2). Each of the DBF devices 154 can include more than two SerDes links. For example, the first DBF 154(1) can include four SerDes links, a first SerDes link (e.g., bidirectional SerDes link) to connect to a first device (e.g., modem 152) that is located in a first direction (e.g., left) from the first DBF 154(1) on the panel, a second SerDes link to connect to a second device (e.g., another DBF device) that is located in a second direction (e.g., right) from the first DBF 154(1) on the panel, a third SerDes link to connect to a third device (e.g., second DBF device 154(2)) that is located in a third direction (e.g., up) from the first DBF 154(1) on the panel, and a fourth SerDes link to connect to a fourth device (e.g., another DBF device) that is located in a fourth direction (e.g., down) from the first DBF 154(1) on the panel. The modem 152 and the DBF devices 154 can form a first chain of DBF devices. A second modem can be coupled to the same DBF devices 154 using additional SerDes links in an opposite direction or symmetrically. This can be considered a second chain that is physically symmetric with the first chain. Similarly, a third modem can be coupled to a third chain of DBF devices and a fourth modem can be coupled to a fourth chain of DBF devices. The third and fourth chains may be physically symmetrical. Also, the first and second chains can be symmetric with respect to the third and fourth chains, such as illustrated in FIG. 2A.

Figure 2A:
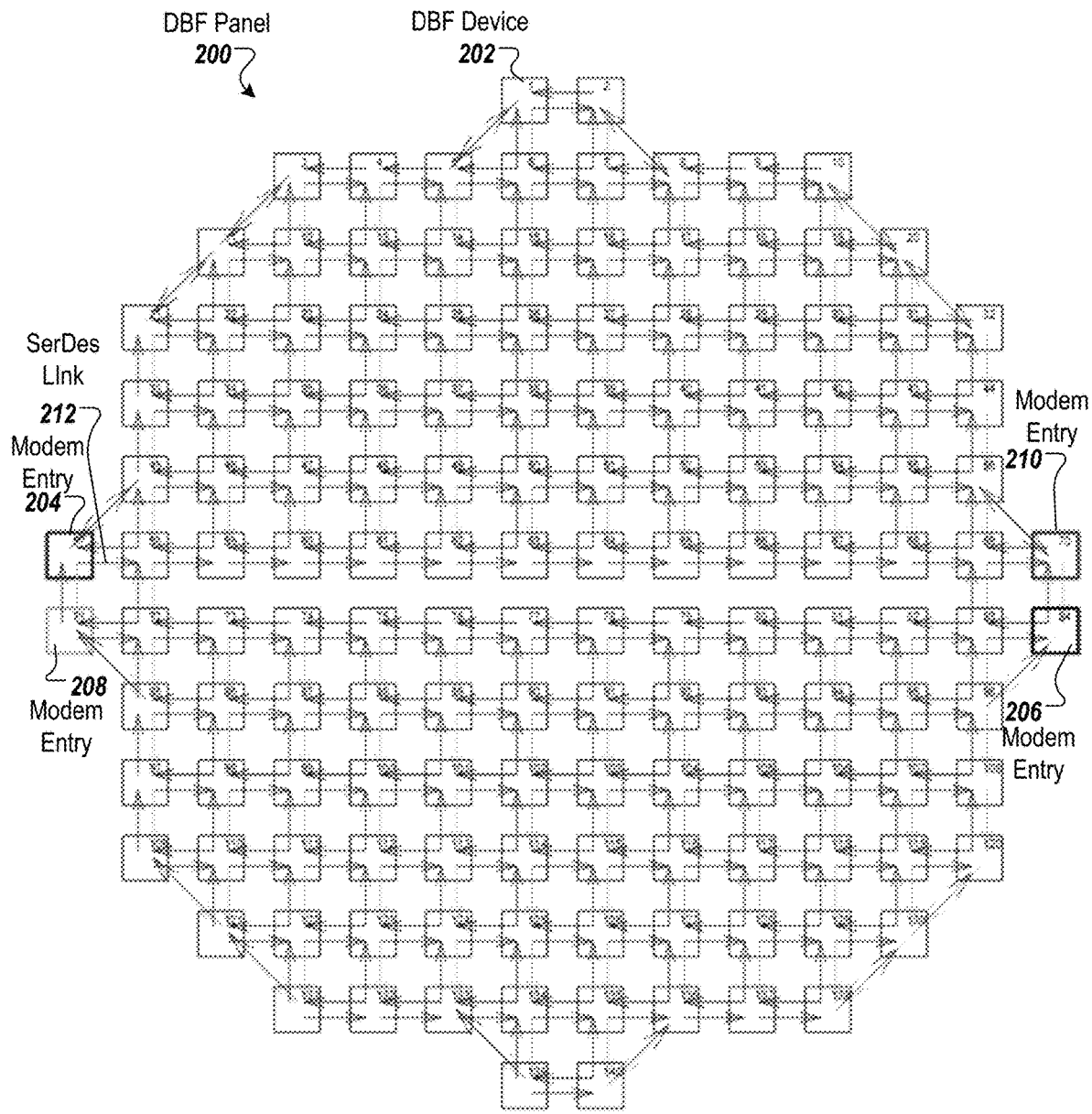
FIG. 2A illustrates a connection network of Serializer/ Deserializer (SerDes) links of a DBF panel according to one embodiment.

FIG. 2A illustrates a connection network of SerDes links of a DBF panel 200 according to one embodiment. The DBF panel 200 includes multiple DBF devices 202 (represented as the square boxes), four of which operate modem entries 204, 206, 208, and 210. A modem entry is a DBF device that connects to one or more modems of the DBF panel 200. The modems and DBF-modem links are not illustrated in FIG. 2A. The modem entry is an ingress and egress for data signals and control signals to and from a modem to which it is connected. In this case, there are four modem entries, so each modem entry connects to ¼ of all modems on the panel. Modem entries can be set to different DBF devices on the panel, and other DBF devices can be designated as backup modem entries. In some cases, the modem entries can be left and right symmetrical. The illustrated embodiment has four modem entries at an equator of the DBF panel 200, on both the north and south sides of the equator.

The SerDes connection network is formed by connecting all DBF devices 202 and modems on the DBF panel 200 via SerDes links 212. The arrows show physical SerDes link connections and directions. The SerDes links 212 can be chip-to-chip (c2c) bidirectional SerDes links. Each of the DBF devices 202 can be indexed by a reference number. For example, the DBF device 202 at the top center is indexed as 1, whereas the DBF device adjacent to the right of it is indexed as 2. The next row of DBF devices is indexed as 3-10. The next row of DBF devices is indexed as 11-20, and so on. In this example, the modem entries 204, 206, 208, and 210 are indexed as 57, 84, 71, and 70, respectively. It should be noted that these index numbers can be used for routing purposes, but are not the same as DBF chip identifiers (IDs) used on a panel. Any of the DBF devices 202 can include as main as eight SerDes links to create the connection network.

The DBF panel 200 can include four modem, each modem being coupled to one of the modem entries 204, 206, 208, and 210. The modem entry 204, which can be a first DBF device, is coupled to a first modem. The modem entry 206 is coupled to a second modem. The modem entry 208 is coupled to a third modem. The modem entry 210 is coupled to a fourth modem.

As illustrated in FIG. 2A, the DBF panel 200 include a first chain of DBF devices, a second chain of DBF devices, a third chain of DBF devices, and a fourth chain of DBF devices. The chains can include one or more sub-chains that extend from any one of the DBF devices in the chain, such as illustrated in FIG. 2B.

Figure 2B:
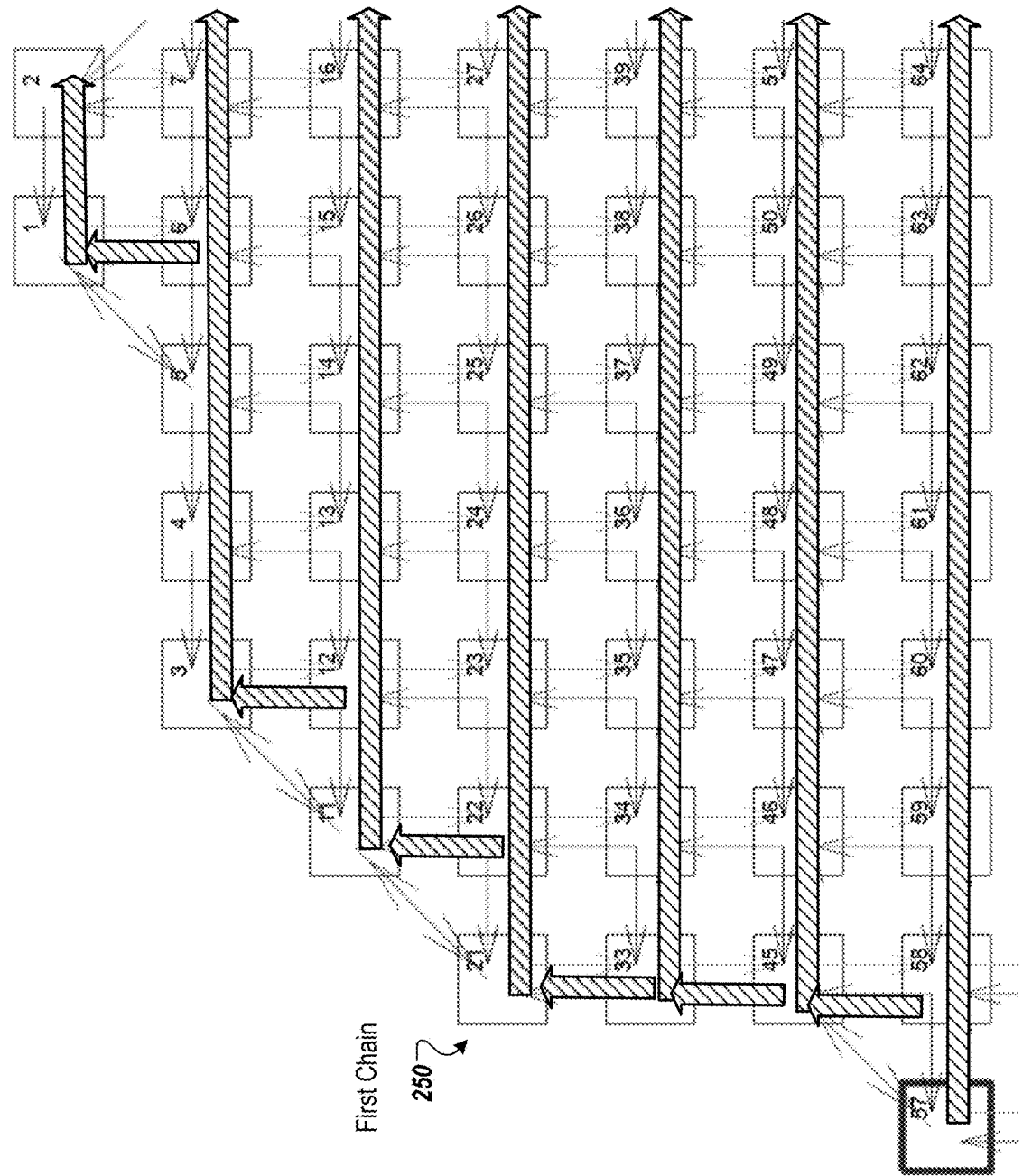
FIG. 2B illustrates a first chain of DBF devices formed by a set of SerDes links of the DBF panel of FIG. 2A.

FIG. 2B illustrates a first chain 250 of DBF devices formed by a set of SerDes links of the DBF panel of FIG. 2A. The first chain 250 starts at the modem entry 204 and extends along a first line of DBF devices in a first direction towards modem entry 210. The first chain 250 extends from a first DBF device in the first line in a second direction to a second line of DBF devices that extend towards the modem entry 210 in the first direction. Similarly, the first chain 250 extends from a first DBF device in the second line in the second direction to a third line of DBF devices that extend towards the modem entry 210 in the first direction. The first chain 250 similarly extends to a fourth line, a fifth line, a sixth line, and a seventh line of DBF devices as illustrated. A second chain that starts at the modem entry 206 can be symmetric to the first chain 250 about a center axis. That is, the modem entry 204 corresponds to the first chain 250 on a north side of the equator and the modem entry 206 corresponds to the second chain on a south side of the equator.

In another embodiment, a panel of a phased array antenna can include a modem, a second modem, a first chain of DBF devices, and a second chain of DBF devices. The first chain includes: a first DBF device coupled to the modem over a first SerDes link and coupled to a first set of front-end radio frequency (RFFE) circuits; and a first set of DBF devices coupled in a series with a SerDes link between each pair of DBF devices in the series. The first set of DBF devices includes a second DBF device that is coupled to the first DBF device over a second SerDes link. Each DBF device of the first set is coupled to a respective set of RFFE circuits that is each coupled to a respective set of antenna elements. The second chain includes: a third DBF device coupled to the second modem over a third SerDes link and coupled to a second set of RFFE circuits; and a second set of DBF devices coupled in a series with a SerDes link between each pair of DBF devices in the series. The second set of DBF devices comprises a fourth DBF device that is coupled to the second DBF device over a third SerDes link. Each DBF device of the second set is coupled to a respective set of RFFE circuits that is each coupled to a respective set of antenna elements. The first chain and the second chain are organized to be physically symmetrical on the panel.

Figure 3A:
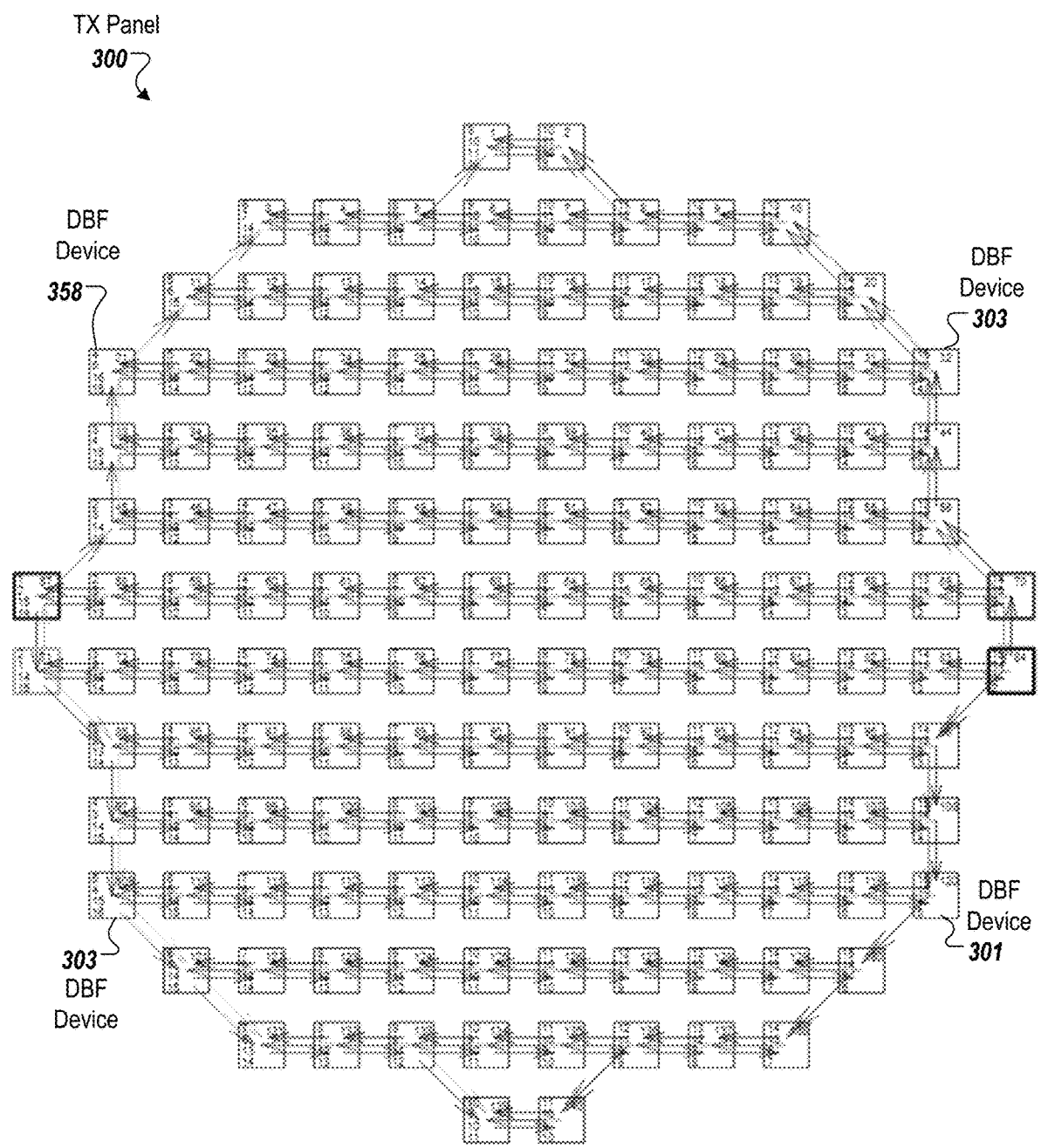
FIG. 3A illustrates a transmit (TX) panel with SerDes routing according to one embodiment.

The DBF devices can be configured according to various SerDes routing configurations, such as illustrated in various figures, including FIG. 3A.

FIG. 3A illustrates a TX panel 300 with SerDes routing according to one embodiment. For the TX panel 300, the four modem entries at an equator of the TX panel. The arrows show modem data flow directions. The four different arrows between DBF devices are four different groups of modem data streams, with each group coming from one of the four modem entries. Each arrow represents a SerDes link having a specified SerDes bandwidth (BW). For example, each arrow can represent a BW requirement of 7.68*4 Gbps (e.g., four modem beams in the frequency domain).

Figure 3B:
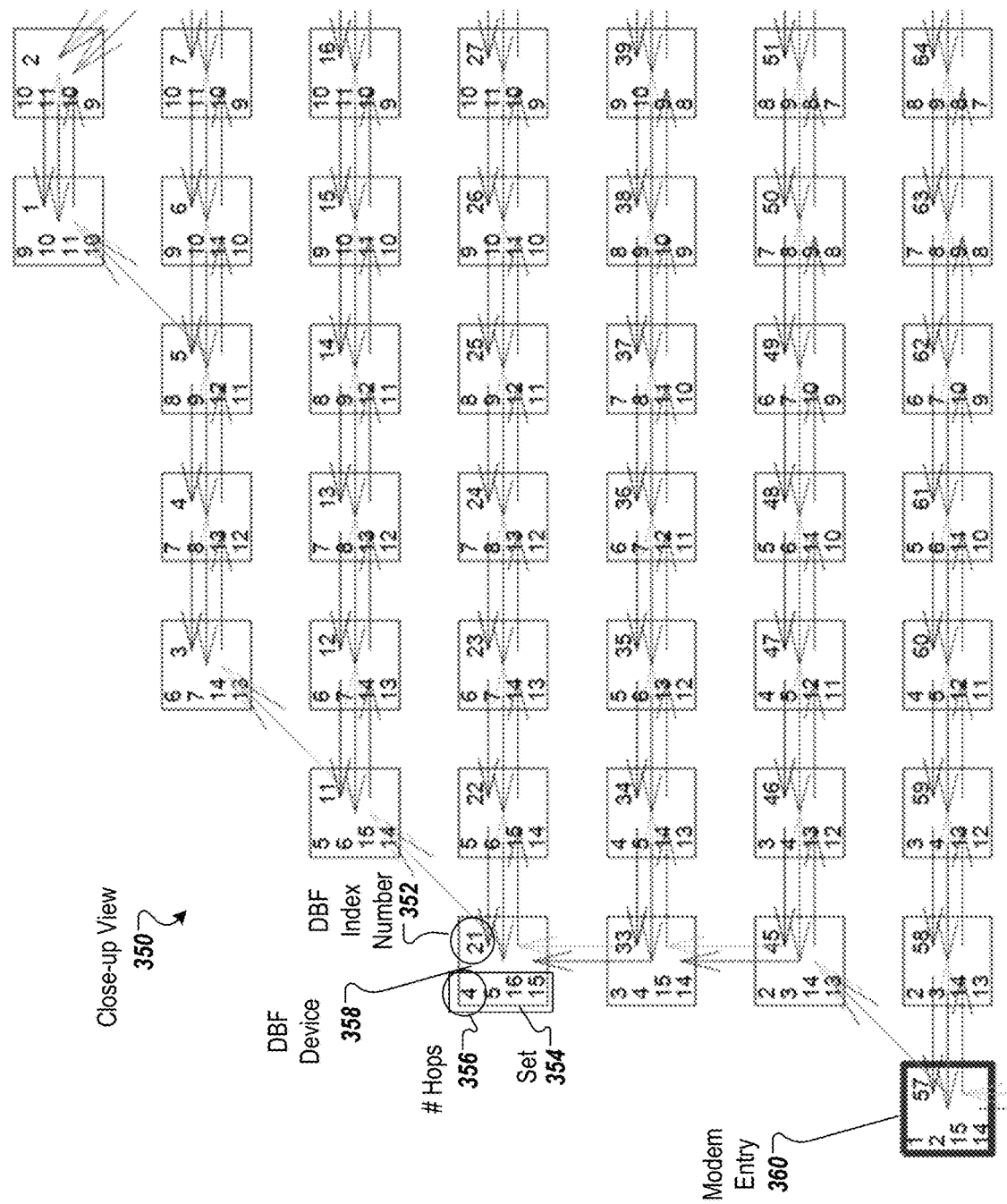
FIG. 3B illustrates a close-up view of a portion of the TX panel 300 of FIG. 3A.

FIG. 3B illustrates a close-up view 350 of a portion of the TX panel 300 of FIG. 3A. Each DBF includes a DBF index number 352 at an upper right corner. The DBF index number 352 represents a specific DBF device in the DBF panel 200. Besides the DBF index number, there is a set 354 of 4 numbers on the left side in each box. Each number of the set 354 represents a number of hops (number of Serdes links data pass through) for each of the 4 groups of modem data streams to reach that DBF device from a modem. The number of hops is equal to the number of SerDes links data passes through to get to the modem. From top to bottom the 4 numbers are for modem group streams 1 to 4 respectively. Modem entries are numbered counterclockwise from upper left (red box), so stream 1 is from a modem entry, 2 from a second modem entry, 3 from a third modem entry, and 4 from a fourth modem entry. For example, as illustrated in FIG. 3B, a DBF device 358 has a DBF index number 352 of #21. This is the 21$^{st}$ DBF device in the TX panel 300. The set 354 numbers for the DBF device 358 are 4, 5, 16, and 15, where 4 represents the number of hops to a modem via a modem entry 360, 5 represents the number of hops from a second modem coupled to a second modem entry (not illustrated in FIG. 3B) that is one more hop from the modem entry 360, 16 represents the number of hops from a third modem via a third modem entry (not illustrated in FIG. 3B), and 15 represents the number of hops from a fourth modem via a fourth modem entry (not illustrated in FIG. 3B).

For this configuration of entries, as illustrated in FIG. 3A, the maximum number of hops is 16 for stream 1 at DBF #120, stream 2 at DBF #32, stream 3 at DBF #21, and stream 4 at DBF #109.

Also, as illustrated in FIGS. 3A-3B, not all of the SerDes links are utilized. To be exact, there are 556 arrows in the diagram, plus 4 for connections to modems at the entries, a total of 560 stream hops riding on 280 active SerDes links (each link can support up to 2 modem stream groups, or 8 modem beam streams). That's 2 per DBF device, which is the same as routing in "snake" daisy-chained fashion. The unused SerDes links can be used as backup links. The backup links can be in a power saving mode during normal operations.

Figure 4A:
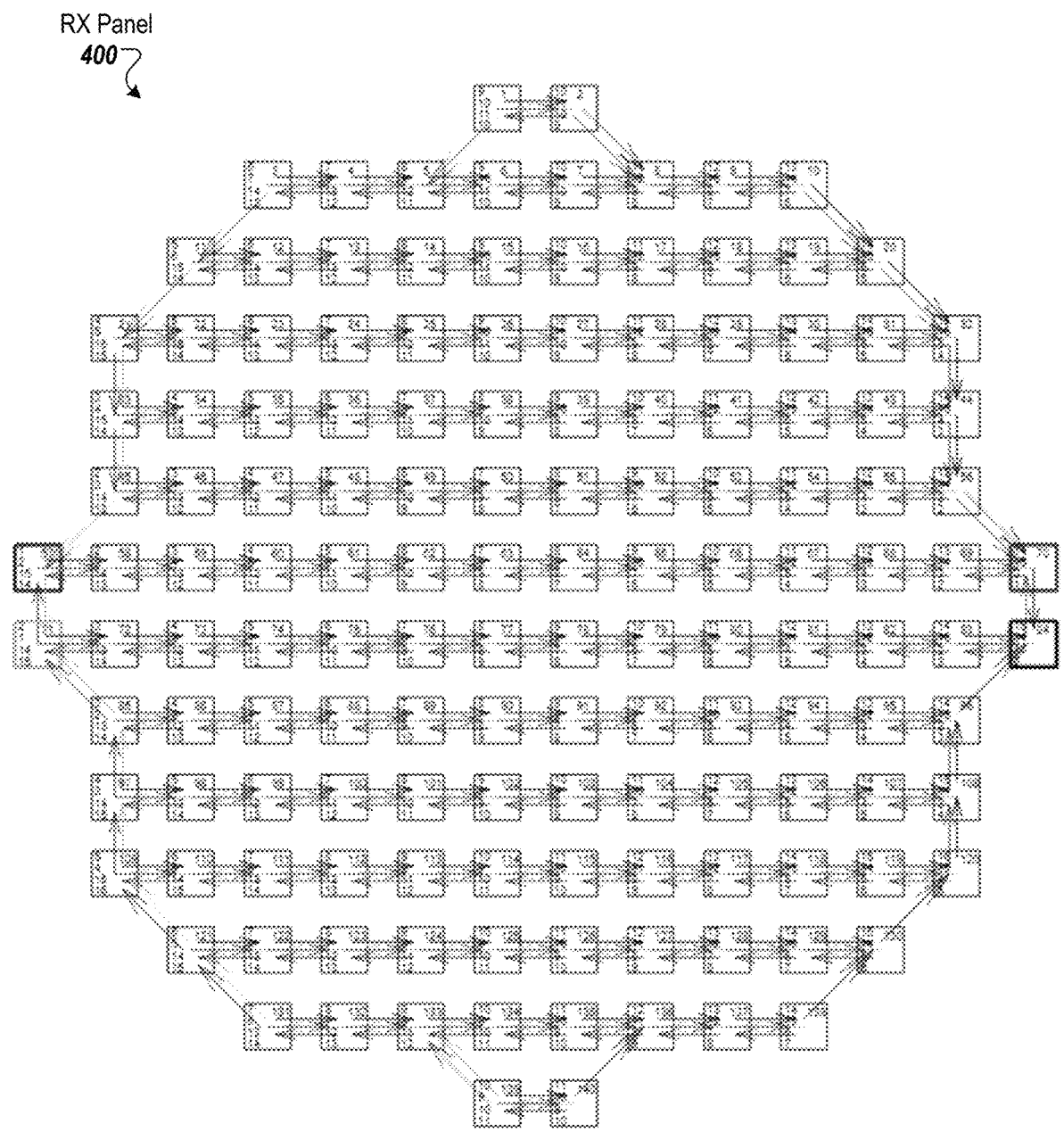
FIG. 4A illustrates a RX panel with SerDes routing according to one embodiment.
Figure 4B:
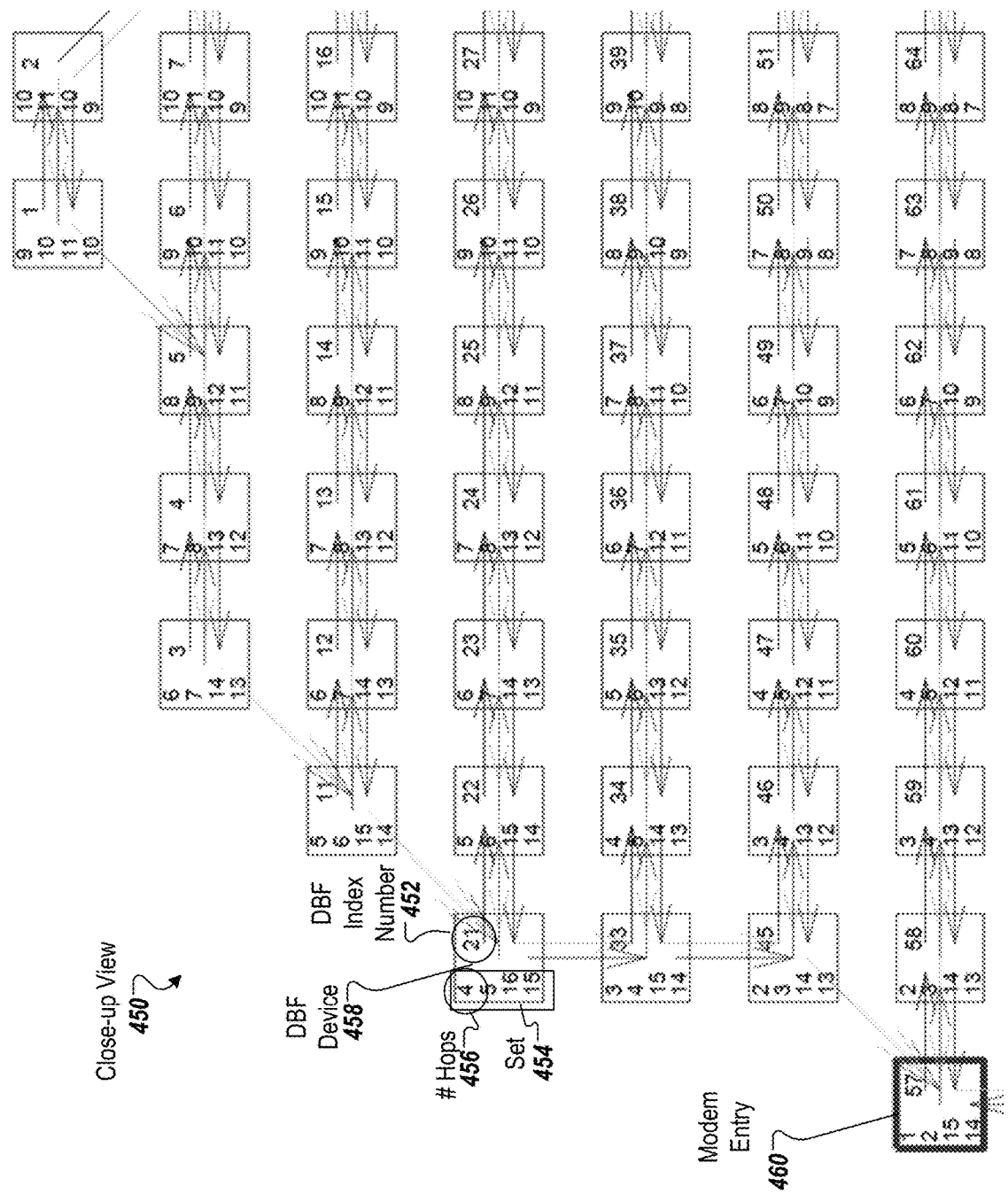
FIG. 4B illustrates a close-up view of a portion of the RX panel of FIG. 4A.

FIG. 4A illustrates a RX panel 400 with SerDes routing according to one embodiment. FIG. 4B illustrates a close-up view 450 of a portion of the RX panel 400 of FIG. 4A. The routing on the RX panel 400 for the same equator entry configuration as TX panel 300. Comparing with FIG. 3A, the only difference with the TX panel routing is that the directions of the arrows are flipped. The DBF index numbers 452 of the RX panel 400 are the same as in the TX panel 300. The set 454 of hop numbers are the same as the TX panel routing, but their meanings are slightly different. Here, the set 454 of hop numbers mean a number of hops for a data stream to reach respective modem from that DBF device. For example, as illustrated in FIG. 4B, a DBF device 458 has a DBF index number 452 of #21. This is the 21$^{st}$ DBF device in the RX panel 400. The set 454 numbers for the DBF device 458 are 4, 5, 16, and 15, where 4 represents the number of hops to reach a first modem from the DBF device 458 via a first modem entry 360, 5 represents the number of hops to reach a second modem from the DBF device 458 via a second modem entry (not illustrated in FIG. 4B) that is one less hop away from the first modem entry 360, 16 represents the number of hops to reach a third modem from the DBF device 458 via a third modem entry (not illustrated in FIG. 4B), and 15 represents the number of hops to reach a fourth modem from the DBF device 458 via a fourth modem entry (not illustrated in FIG. 4B).

Another difference between TX and RX panels is the modem data stream bandwidth. Each arrow in RX panel 400 can represents a BW requirement of 10.368*4 Gbps (e.g., four beams with 9/8 oversampling in the case of 600 MHz BW/beam*total 16 beams) versus the BW requirement of 7.68*4 Gbps per arrow in TX panel 300. In the case of 400 MHz BW/beam with total 24 beams on RX panel 400, each arrow should be equivalent to 6 beams.

Figure 5:
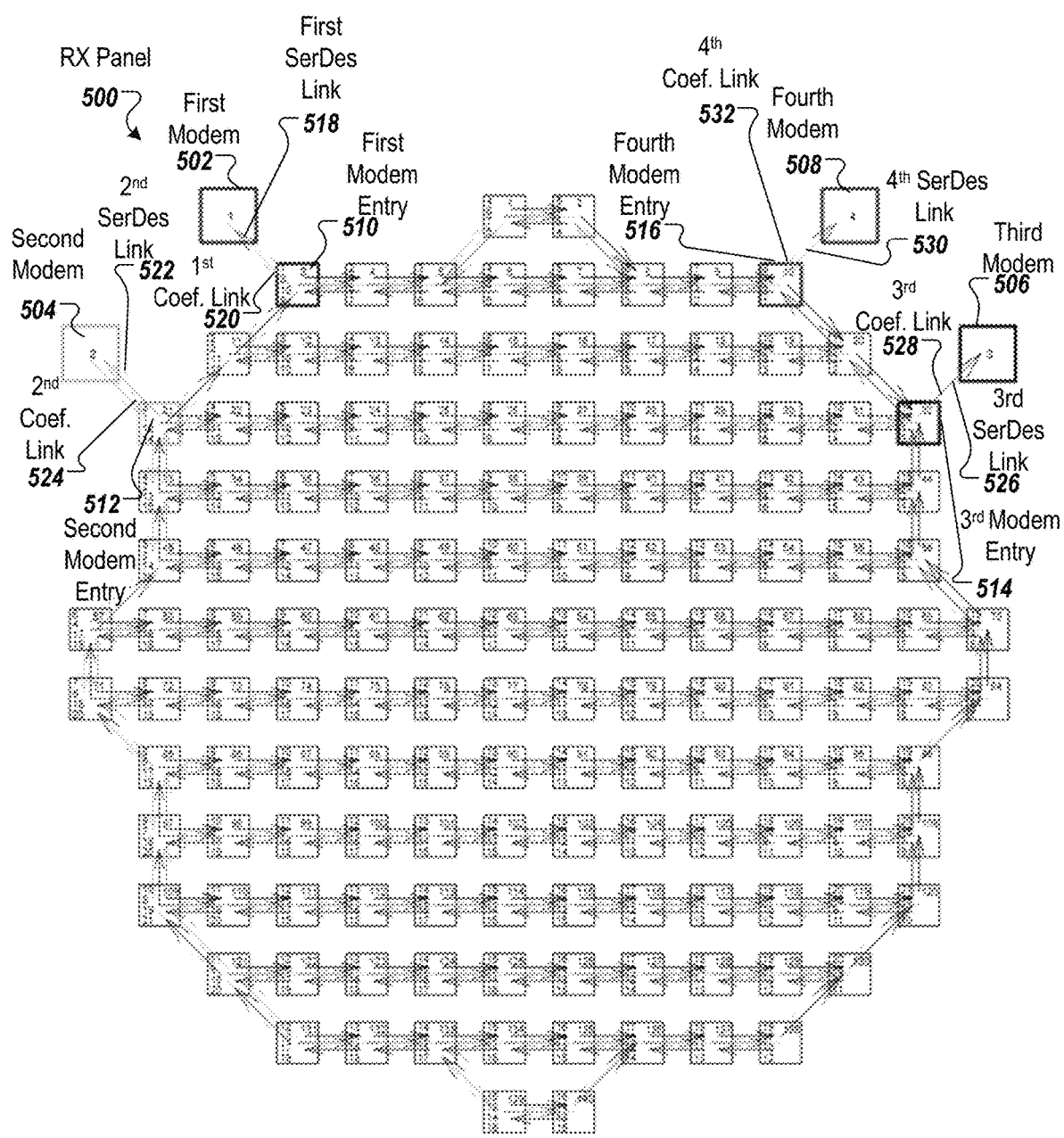
FIG. 5 illustrates a RX panel with SerDes routing with modem groups and coefficient links according to one embodiment.

FIG. 5 illustrates a RX panel 500 with SerDes routing with modem groups and coefficient links according to one embodiment. The SerDes routing of RX panel 500 is similar to the SerDes routing of RX panel 400. The RX panel 500 includes four modem groups, including a first modem 502, a second modem 504, a third modem 506, and a fourth modem 508. A first modem entry 510 is coupled to the first modem over a first SerDes link 518 that extends in a first direction from the first modem entry 510 to the first modem 502. A first coefficient link 520 is coupled between the first modem 502 and the first modem entry 510. The first coefficient link 520 extends in a second direction that is an opposite direction as the first direction. That is, the coefficient stream is sent from the first modem 502 to the first modem entry 510. The first modem entry 510 can propagate the coefficient stream to the other DBF devices in a reverse direction than a RX data stream. Similarly, there is a second SerDes link 522 in which a RX stream flows from a second modem entry 512 to the second modem 504 and a second coefficient link 524 on which a coefficient stream flows from the second modem 504 to the second modem entry 512. Similarly, there is a third SerDes link 526 in which a RX stream flows from a third modem entry 514 to the third modem 506 and a third coefficient link 528 on which a coefficient stream flows from the third modem 506 to the third modem entry 514. Similarly, there is a fourth SerDes link 530 in which a RX stream flows from a fourth modem entry 516 to the fourth modem 508 and a second coefficient link 532 on which a coefficient stream flows from the fourth modem 508 to the fourth modem entry 516. The coefficient stream can include control data, including phases, magnitudes, and delay settings for the DBF device.

During operation, TX data from each modem are sent to all antenna elements on the panel, and RX data received by each antenna element on the panel are sent to all modems. From each modem's point of view, its TX data reaches each DBF device (e.g., digital signal processing (DSP) unit) at exactly the same time, or its RX data from each DBF are received by all antenna elements at the same time, i.e. same latency for all data through a SerDes distribution network.

Since the number of hops for each DBF device is different, data buffering can be used on DBF devices to compensate for SerDes latency and ensure same data latency through the SerDes distribution network.

In the case of a TX panel, a TX memory buffer can be used to hold data long enough till a last DBF device in the SerDes distribution network receives the same TX data. So, a minimum buffer size is the product of data rate and latency difference between a current DBF device and a last DBF device in a chain of DBF devices. With 4 different modem entries on the panel, every DBF device may have different number of hops from each modem entry, as shown in FIGS. 3A-3B. Assuming a maximum hop number for each modem group stream is Hi, data rate M, and hop latency is L, a hop number for each stream at DBF device, n, is hni, then the memory buffer size B can be expressed as follows:

$$B = \max\left(\sum_{i=1}^{4}((H_i - h_{ni}) * L * M)\right)$$

$$= \max\left(L * M * \sum_{i=1}^{4}(H_i - h_{ni})\right)$$

$$= L * M * \max\left(\sum_{i=1}^{4}(H_i) - \sum_{i=1}^{4}(h_{ni})\right)$$

$$= L * M * \left(\sum_{i=1}^{4}(H_i) - \min\left(\sum_{i=1}^{4}(h_{ni})\right)\right)$$

Here the max( ) and min( ) functions are to find maximum or minimum over all DBF devices n. Given the following example of L and M, B can be as follows:

$L$=200 ns $M$=7.68*4 Gbps we have $B$=24 kB for routing configuration shown in FIGS. 3A-3B in a non-failure case, where $$\sum_{i=1}^{4} (H_i) = 64$$

$$\min\left(\sum_{i=1}^{4} (h_{ni})\right) = 32$$

Furthermore, since each TX DBF device may need to store 2 symbol (each symbol requires 4 kB per modem beam*16 beams; 2 symbol storage buffer needed if using decimation-in-time Fast Fourier Transform (DIT FFT) before sending to a DSP unit for processing, B can be represented as follows:

$B=24+128=152$ kB.

The calculation above assumes a non-bursty SerDes data flow, and pre-compensated data entry time from the modem to balance out maximum stream latency, so the result is the minimum buffer size required. In the case of a TX symbol size being 1280*8b=1.25 kB per modem beam, a total ping-pong buffer size can be reduced to 40 kB. At the same time, beam data rate is reduced to 4 Gbps.

In the case of a RX panel, a RX buffer can be used. Comparing with the TX data flow, RX data flows in the reverse direction. And instead of distributing data to the next link or links, RX DBF devices can combine received data with its own before sending them to the next DBF device. To combine RX data, all data from different DBF devices need to be received from FEIC at the respective DBF device at the same time. In order to achieve this, data received by each DBF device needs to be stored at its local memory buffer after being processed by the DSP unit, and the fetched from RX memory buffer at a proper time to combine with data from RX SerDes, as illustrated in FIG. 6.

Figure 6:
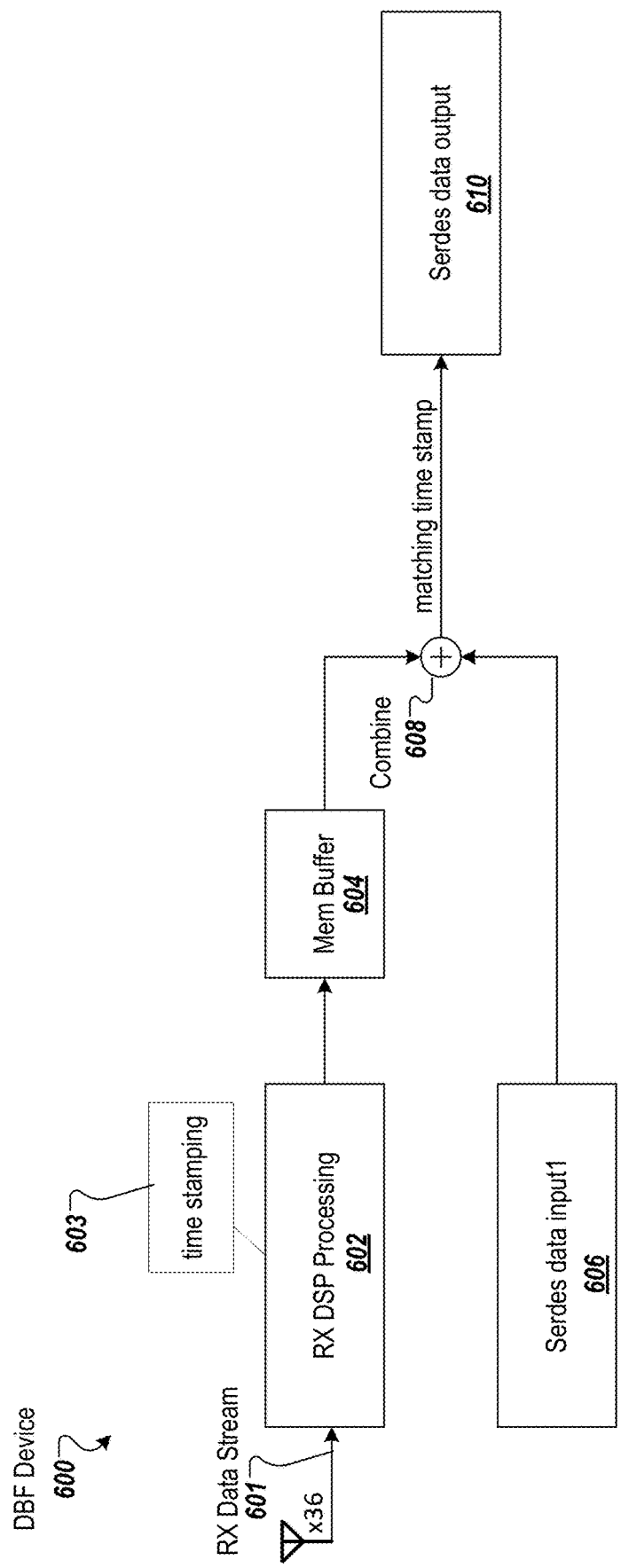
FIG. 6 is a block diagram of a RX data processing path according to one embodiment.

FIG. 6 is a block diagram of a RX data processing path according to one embodiment. As shown in FIGS. 4A-4B, there are DBF devices on the panel that receives more than one RX data stream for some modem group. These DBF devices are on the left and right edges of the panel, where RX data streams from different rows of DBF meet. The extreme cases are the modem entries where 3 RX data streams meet. The DBF devices in the middle of the panel usually only handle one incoming RX data stream, unless for a failure recovery reroute occurs. In this case, a RX DSP unit 602 of a DBF device 600 receives a RX data stream 601 from an antenna element via RFFE circuitry. The RX DSP unit 602 stores the RX data stream 601 with corresponding time stamp data 603 in a RX memory buffer 604. The DBF device 600 also receives SerDes data input 606 from a previous DBF device in a chain. The DBF device 600 combines 608 the RX data stream 601 with the corresponding time stamp data 603 to the SerDes data input 606 and outputs the SerDes data output 610 to a next DBF device in the chain.

At a given time, different RX data streams that meet at a single DBF may have different time stamps, meaning that they were received at different times. To combine them together, extra buffering is needed to align the different time stamps, as shown in FIG. 7 and FIG. 8.

FIG. 7 is a block diagram of a symmetrical RX data combining path of four streams according to one embodiment. In this case, a RX DSP unit 702 of a DBF device 700 receives a RX data stream 701 from an antenna element via RFFE circuitry. The RX DSP unit 702 stores the RX data stream 701 with time stamp data 703 in a first RX memory buffer 704. The DBF device 700 also receives first SerDes data input 706 from a first DBF device, second SerDes data input 714 from a second DBF device, and third SerDes data input 718 from a third DBF device. The DBF device 700 stores the first SerDes data input 706 in a second RX memory buffer 711, stores the second SerDes data input 714 in a third RX memory buffer 716, and stores the third SerDes data input 718 in a fourth RX memory buffer 720. The DBF device 700 combines 708 the RX data stream 701 with the matching time stamp data 703 to the first SerDes data input 706, the second SerDes data input 714, and the third SerDes data input 718 and outputs the SerDes data output 710 to a next DBF device, a modem entry, or a modem in the chain.

In FIG. 7, four stream of RX data are symmetrically combined. Alternatively, the RX data can be combined in a pipelined fashion as described and illustrated with respect to FIG. 8.

FIG. 8 is a block diagram of a pipelined RX data combining path of four streams according to one embodiment. In this case, a RX DSP unit 802 of a DBF device 800 receives a RX data stream 801 from an antenna element via RFFE circuitry. The RX DSP unit 802 stores the RX data stream 801 with corresponding time stamp data 803 in a first RX memory buffer 804. The DBF device 800 also receives first SerDes data input 806 from a first DBF device and combines 808 the RX data stream and the first SerDes data input 806 with matching time stamps in a second RX memory buffer 812. The DBF device 800 also receives second SerDes data input 814 from a second DBF device and combines 822 the combined data stored in the second RX memory buffer 812 with the second SerDes data input 814 with matching time stamps and stores the combined data into a third RX memory buffer 816. The DBF device 800 also receives third SerDes data input 818 from a third DBF device and combines 824 the combined data stored in the third RX memory buffer 816 with the third SerDes data input 818 with matching time stamps and outputs the SerDes data output 810 to a next DBF device, a modem entry, or a modem in the chain.

In these RX memory buffer approaches, either symmetrical combining as shown in FIG. 7 or pipelined combining as shown in FIG. 8 can result in extra processing on the DBF device, which can complicate its memory interface logic. Another approach is to delay RX data stream at a source DBF device to make sure when different data streams meet at a single DBF, their time stamps match. Local first-in-first-out (FIFO) buffering can be used to compensate for SerDes data flow jitter. With this delay-based approach, the combine process can be simplified as shown in FIG. 9.

FIG. 9 is a block diagram of a pre-balanced RX data combining path of four streams according to one embodiment. In this case, a RX DSP unit 902 of a DBF device 900 receives a RX data stream 901 from an antenna element via RFFE circuitry. The RX DSP unit 902 stores the RX data stream 901 with time stamp data 903 in a first RX memory buffer 904. The DBF device 900 also receives first SerDes data input 906 from a first DBF device, second SerDes data input 914 from a second DBF device, and third SerDes data input 918 from a third DBF device. As noted above, the RX data streams can be delayed by the source DBF devices so that the data streams meet at the DBF device 800 such that the time stamps match. The DBF device 900 combines 908 the RX data stream 901 with the matching time stamp data 903 to the first SerDes data input 906, the second SerDes data input 914, and the third SerDes data input 918 and outputs the SerDes data output 910 to a next DBF device, a modem entry, or a modem in the chain.

It should be noted that the pre-balanced RX data combining approach is the exact reverse of TX data distribution on a TX panel, thus the TX memory buffer size formula described above applied here, with two exceptions, the data rate M and there's no need to store an entire symbol for RX since the processing is done in TD. M can be expressed as follows:

$$M = 10.368 * 4 \text{ Gbps}$$

Give these conditions, for entry configuration in FIGS. 4A-4B, the minimum memory buffer size, B, is expressed as follows:

$$B = 32.4 \text{ kB}$$

Figure 10:
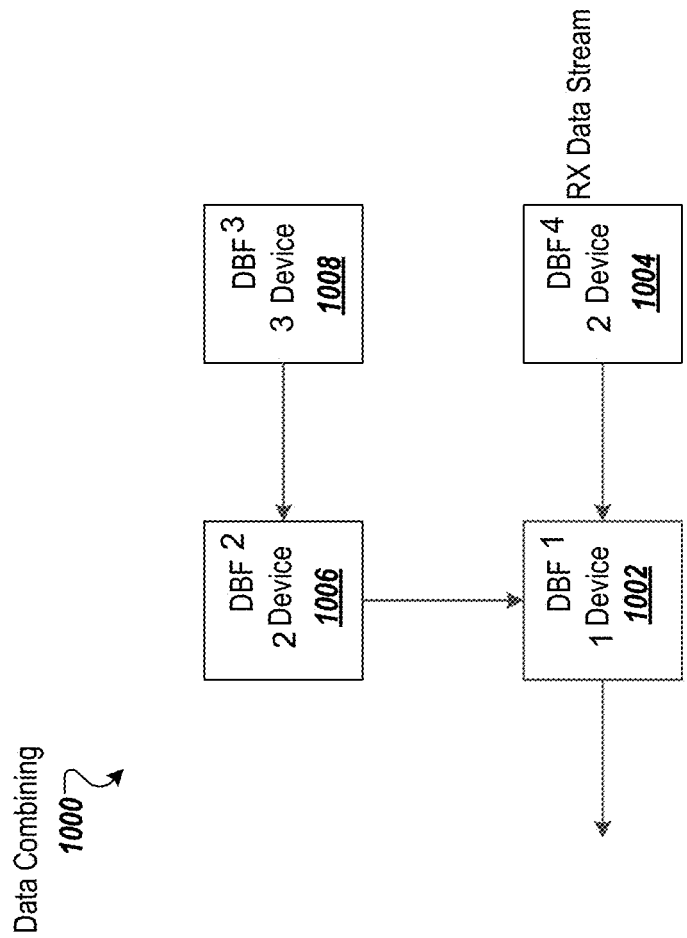
FIG. 10 is a block diagram of a data combining of four DBF devices according to one embodiment.

FIG. 10 is a block diagram of a data combining 1000 of four DBF devices according to one embodiment. The four DBF devices 1002, 1004, 1006, and 1008 use the same convention used in previous figures where each box represents one DBF device and the first DBF device 1002 represents a modem entry, where arrows represent data streams, where numbers in the up-right corners are DBF indices, and where numbers of the left side of the box are number of hops from a modem. Using the pre-balanced approach, memory buffers only need to buffer their own data, and sizes for each DBF are expressed as follows:

$(3-1)*L*M = 2LM$      DBF #1.

$(3-2)*L*M = LM$      DBF #2.

$(3-3)*L*M = 0$      DBF #3.

$(3-2)*L*M = LM,$      DBF #4.

where L is hop latency and M is the stream data rate as defined before. In this case, the minimum memory size is 2LM for this example at DBF device 1002 (DBF #1).

Using the pipelined approach, memory buffers needed in each DBF are expressed as follows:

DBF #1.

a. $(2-1)*L*M = LM$: $1^{st}$ buffer own data before combining data from DBF #4 b. $(3-2)*L*M = LM$: $2^{nd}$ buffer before combining data from DBF #2 c. Total $2LM$ $(3-2)*L*M = LM$      DBF #2.

$0*L*M = 0$      DBF #3.

$0*L*M = 0$      DBF #4.

In this case, the minimum memory size is still 2LM at DBF device 1002 (DBF #1).

Using the symmetrical approach, memory buffers needed in each DBF device are expressed as follows:

DBF #1.

a. $(3-1)*L*M = 2LM$: buffer for own data b. 0: buffer for data from DBF #2 c. $(3-2)*L*M = LM$: buffer for data from DBF #4 d. Total $3LM$ $(3-2)*L*M = LM$      DBF #2.

$0*L*M = 0$      DBF #3.

$0*L*M = 0$      DBF #4.

In this case, the minimum memory size is 3LM at DBF device 1002 (DBF #1). This approach has the highest minimum buffer size requirement since it buffers stream data before combining the data.

In general, data buffer size requirements for stream merging data from multiple DBF devices are the same between pre-balanced and pipelined approaches, since the buffer is used to hold combined streams long enough to compensate for stream with longest hop latency.

In the SerDes connection network there can be failures. For example, a DBF device may stop responding on a response channel. That is, one DBF device can send SerDes data on a SerDes link to another DBF device. The other DBF device can respond with an acknowledgement or can send a status report. In the event that one DBF device does not receive the acknowledgement or the status report, the other DBF device can be considered non-responsive or failed. Aspects of the present disclosure proposes some failure recovery approaches given the SerDes connection network. Failure recovery refers to rerouting of modem data streams when one or more of the DBF devices on the SerDes network are down or malfunctioning. Certainly some level of scavenging work could be done to the failed DBF depending on the situation, for simplicity in the scope of the present disclosure, a failed DBF device is regarded as a dead node on the SerDes network that is completely non-responsive, same as being cut off from the SerDes network. Data stream rerouting involves activating some of the backup SerDes links and route through them the blocked modem groups data streams or branches of the streams. The physical SerDes links form a mesh network, and there are many ways of rerouting to bypass a dead node. There might even be even than one rerouting solution. In some cases, the approach to rerouting has a goal to use a least amount of backup links as possible to save power, while keeping maximum number of hops in check to save memory.

Figure 11:
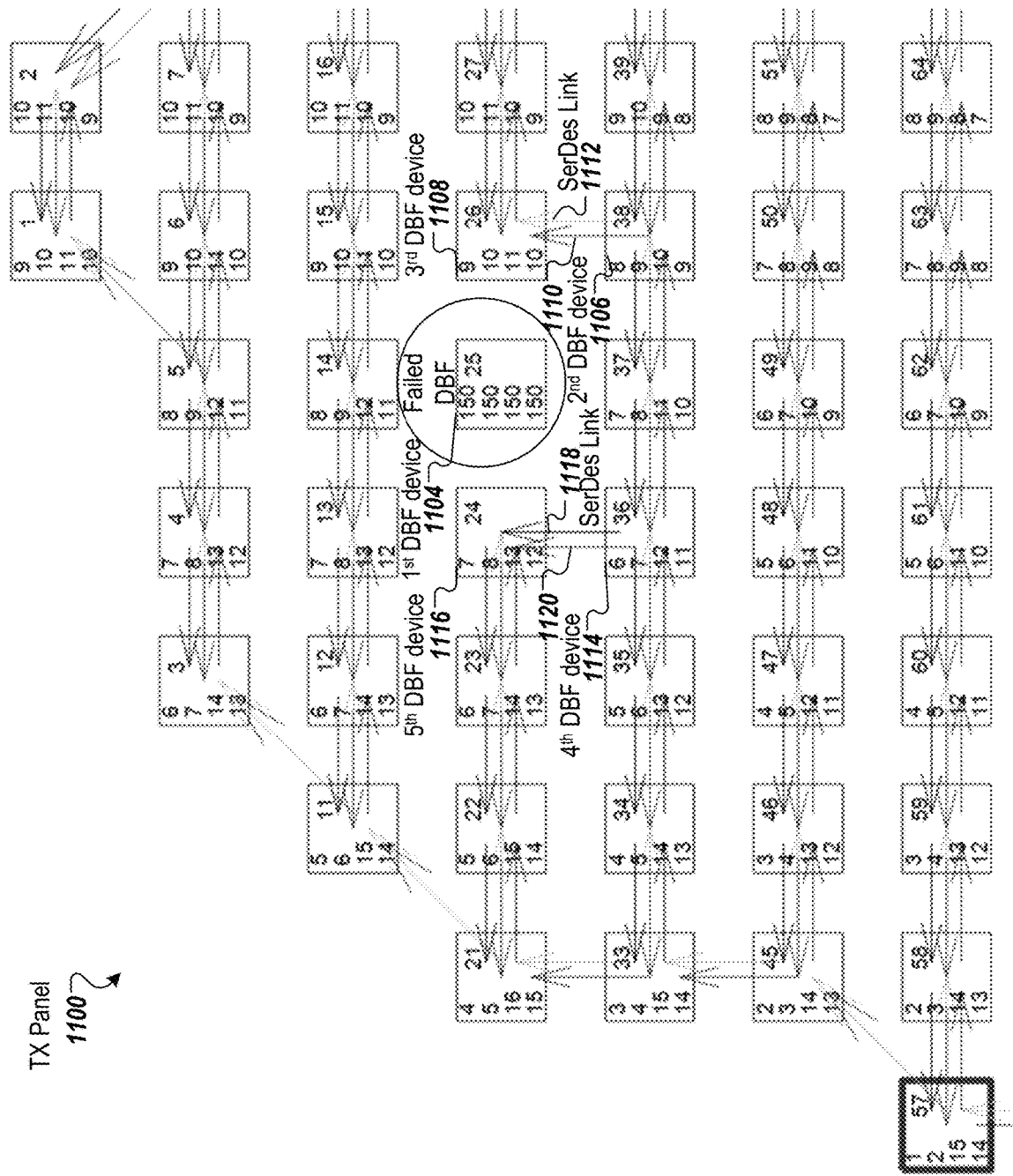
FIG. 11 illustrates a TX panel with SerDes re-routing according to one embodiment.

FIG. 11 illustrates a TX panel 1100 with SerDes rerouting according to one embodiment. The TX panel 1100 initially has the SerDes routing illustrated in the TX panel 300 of FIG. 3A. In this scenario, a first DBF device 1104 (#25) with a DBF index number of 25 fails. All the SerDes links (SerDes connections) to the first DBF device 1104 are stopped. In this scenario, a second DBF device 1106 (#38) is configured to send a first RX data stream over a SerDes link 1110 between the second DBF device 1106 (#38) and a third DBF device 1108 (#26). The second DBF device 1106 (#38) is also configured to send a third RX data stream over a SerDes link 1112 between the second DBF device 1106 (#38) and the third DBF device 1108 (#26). In the other direction, a fourth DBF device 1114 (#36) is configured to send a second RX data stream over a SerDes link 1118 between the fourth DBF device 1114 (#36) and a fifth DBF device 1116 (#24). The fourth DBF device 1114 (#36) is also configured to send a fourth RX data stream over a SerDes link 1120 between the fourth DBF device 1114 (#36) and the fifth DBF device 1116 (#24).

FIG. 11 shows an example of a single DBF failure recovery on a TX panel 1100. Failure recovery for this case keeps the same memory buffer size requirement, and the same amount of active SerDes links (minus the ones to the failed DBF device). The TX panel 1100 can operate with a single DBF failure. Multiple DBF failure cases are still recoverable, but are not illustrated and described herein.

In general, for each entry configuration, there are 136 single DBF failure cases (140 DBF—4 entries). Entry failure with backup entry can be covered as a single DBF failure in a different entry configuration (not left-right symmetrical). To simplify the description, only a few entry configurations are studied: first are symmetrical entry configurations as illustrated in FIG. 12, then corresponding entry failure with backup cases.

Figure 12:
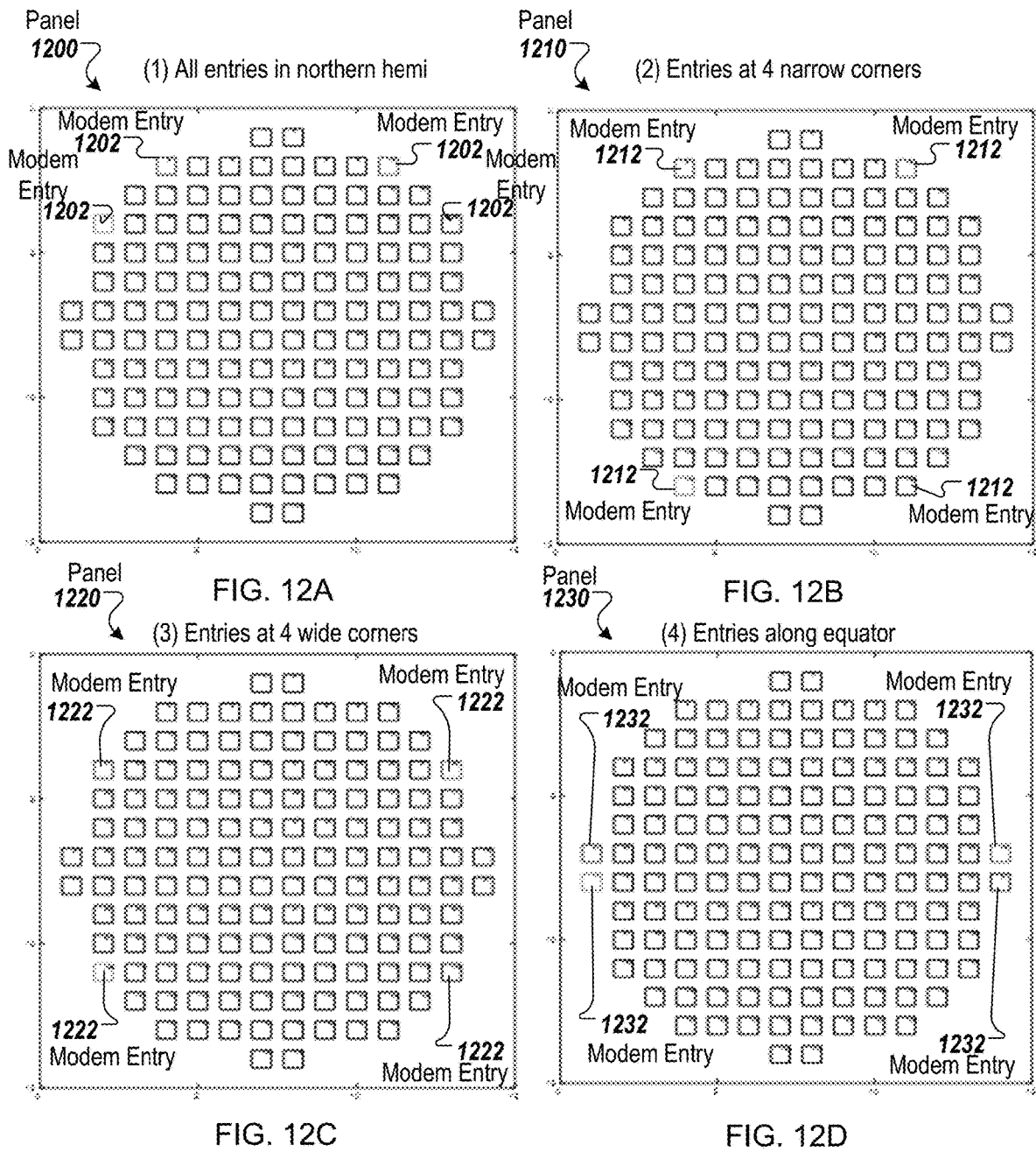
FIGS. 12A-12D illustrate four panel entry point configurations according to various embodiments.

FIGS. 12A-12D illustrate four panel entry point configurations according to various embodiments. In FIG. 12A, all modem entries 1202 are in a northern hemisphere above an equator of a panel 1200. In FIG. 12B, all modem entries 1212 are at 4 narrow corners of a panel 1210. In FIG. 12 C, all modem entries 1222 are at 4 wide corners of a panel 1220. In FIG. 12D, all modem entries 1232 are along an equator of a panel 1230.

In some panels, there are 4320 elements on a RX panel, also referred to as a 4k RX panel. There can be 120 tiles of 36 antenna elements each. Each of the 120 tiles includes a DBF device as described herein. Various entry point configurations are possible for the 4k RX panel, such as illustrated in FIGS. 12A-12D. The following describes SerDes connections and routing examples of a four-quadrant TX panel, a four-quadrant X-cut TX panel with triangular lattice, an H-cut TX panel, a T-cut TX panel, a V-cut TX panel, as well as a RX panel with triangular lattice.

Figure 13:
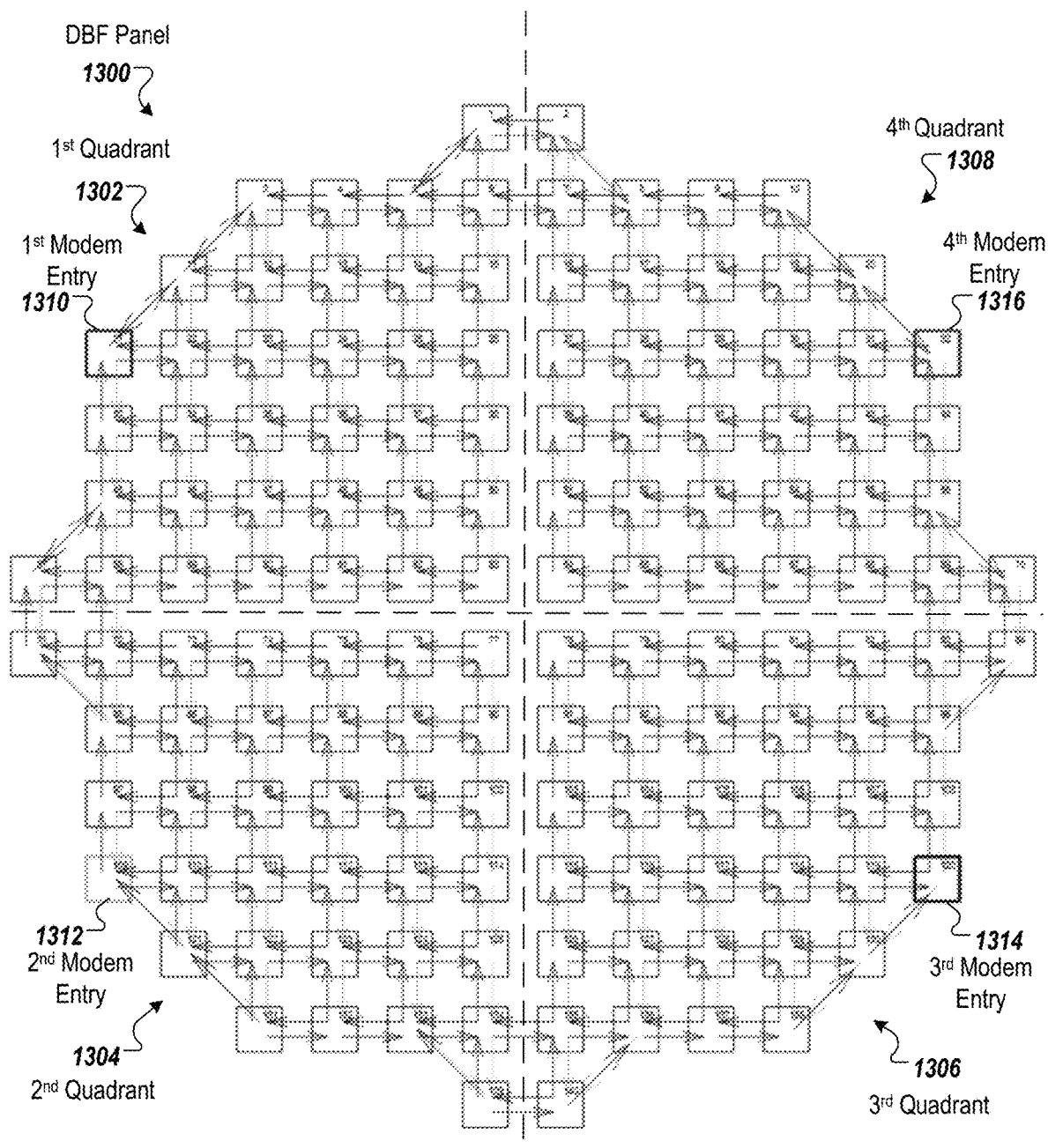
FIG. 13 illustrates a connection network of SerDes links of a DBF panel having four quadrants according to one embodiment.

FIG. 13 illustrates a connection network of SerDes links of a DBF panel 1300 having four quadrants 1302-1308 according to one embodiment. Each quadrant can include a separate circuit board or other support structure upon which antenna elements are disposed. Each quadrant includes a modem entry, including a first modem entry 1310 in a first quadrant 1302, a second modem entry 1312 in a second quadrant 1304, a third modem entry 1314 in a third quadrant 1306, and a fourth modem entry 1316 in a fourth quadrant 1308. The quadrants are coupled over SerDes links at the outer edges of the DBF panel 1300, as illustrated at DBFs #1 and #2, DBFs #37 and #71, DBFs #70 and #84, and #139 and #140. This positions the physical connections between the circuit boards at edges of the DBF panel 1300.

Figure 14:
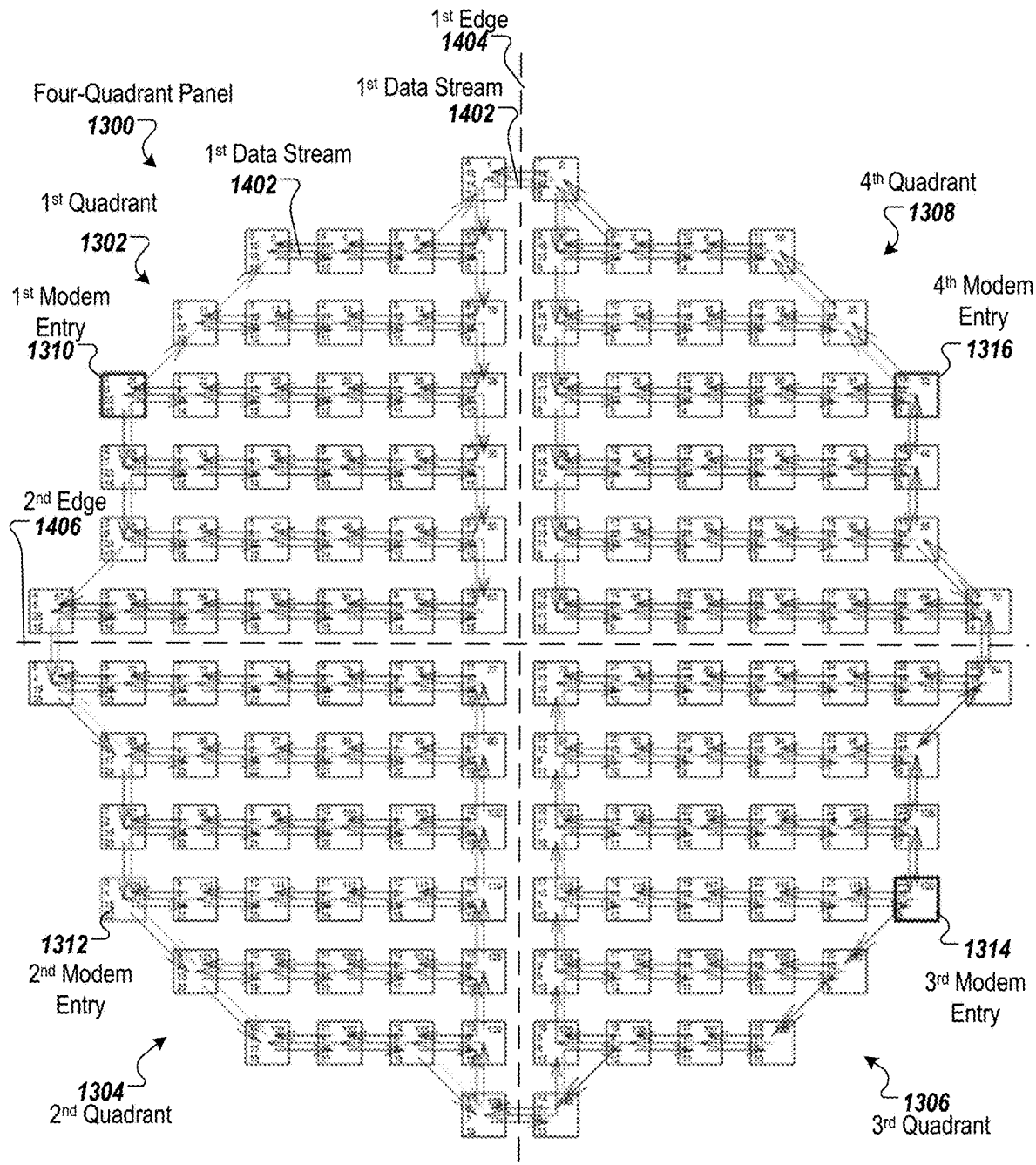
FIG. 14 illustrates SerDes routing for the four-quadrant TX panel of FIG. 13 according to one embodiment.

FIG. 14 illustrates SerDes routing for the four-quadrant TX panel of FIG. 13 according to one embodiment. The four TX data streams originate from each of the respective modem entries 1310-1316. For example, a first TX data stream 1402 flows from the first modem entry 1310 (DBF #21) in a first branch to DBF #22 thru DBF #26, in a second branch to DBF #11 thru DBF #15, and a third branch to DBF #33 thru DBF #38. In the second branch, the first TX data stream 1402 flows from the DBF #11 to a fourth branch to DBF #3 thru DBF #6. In the third branch the first TX data stream 1402 flows from the DBF #33 to a fifth branch to DBF #45 thru DBF #50 and from DBF #50 to a sixth branch to DBF #63 to DBF #57. In the fourth branch, the first TX data stream 1402 flows from the DBF #6 to DBF #1 at a first edge 1404 of the first quadrant 1302. The first TX data stream 1402 flows to the fourth quadrant 1308 over the SerDes links at the first edge 1404 of the first quadrant 1302. The first TX data stream 1402 flows to the second quadrant 1304 over the SerDes links at a second edge 1406 of the first quadrant 1302. Similarly, the other TX data streams flow from the respective modem entries through the four quadrants 1302-1308.

Figure 15:
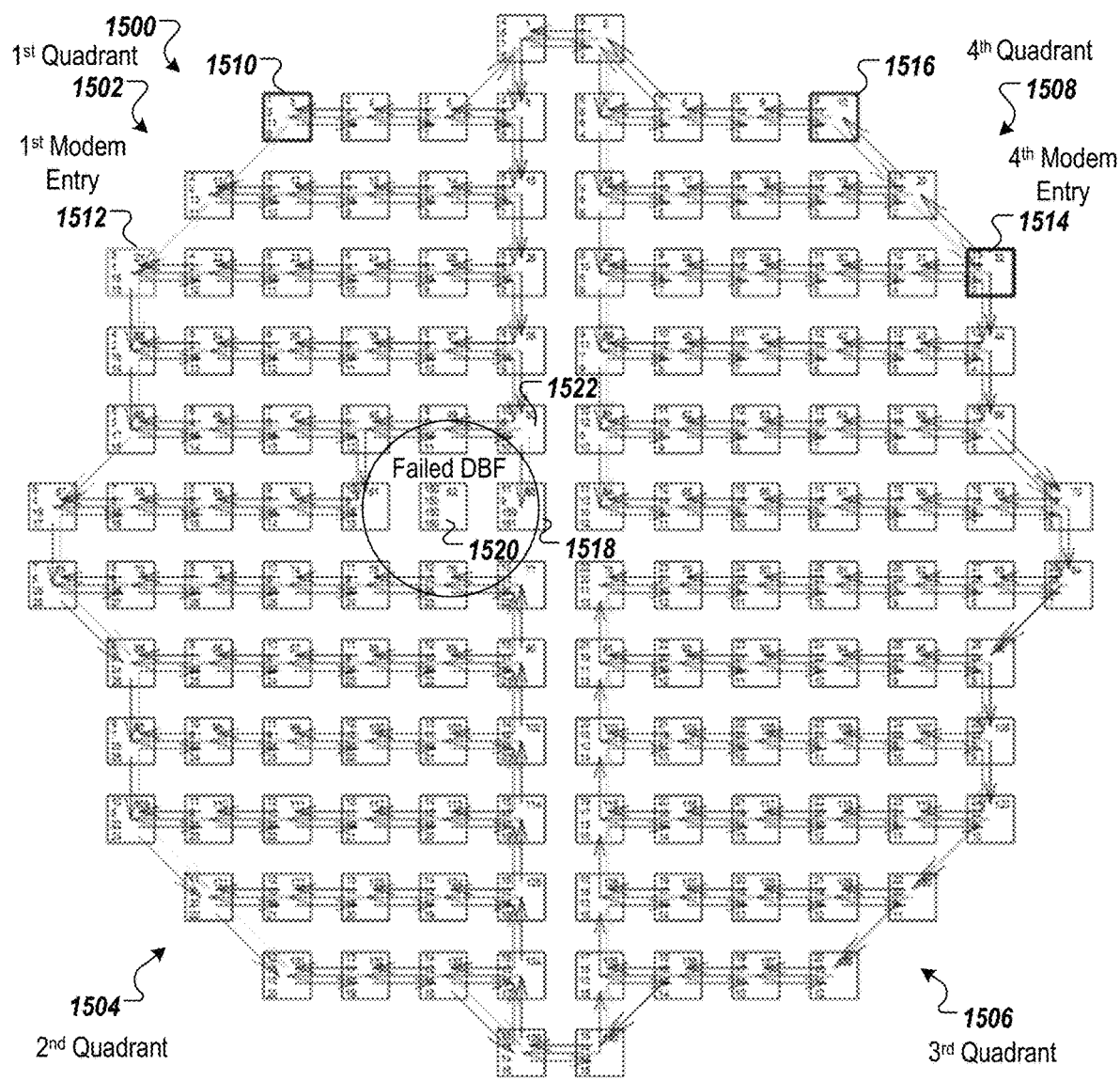
FIG. 15 illustrates a blocked DBF device by another DBF device on a four-quadrant TX panel according to one embodiment.

FIG. 15 illustrates a blocked DBF device 1518 by another DBF device 1520 on a four-quadrant TX panel 1500 according to one embodiment. Although the four-quadrant TX panel 1500 can have similar SerDes routing along branches within the quadrants as the four-quadrant TX panel 1400, the SerDes routing is not exact since the modem entries 1510-1518 of the four-quadrant TX panel 1500 are at different locations. The modem entries 1510-1518 are located in a first quadrant 1502 and a fourth quadrant 1508. In this case, the DBF device 1520 failed. Given that the DBF device 1518 is downstream from the failed DBF device 1520, the DBF device 1518 is blocked. For failure recovery, a DBF device 1522 on an adjacent branch can be configured to send the TX data stream to the blocked DBF device 1518.

Figure 16:
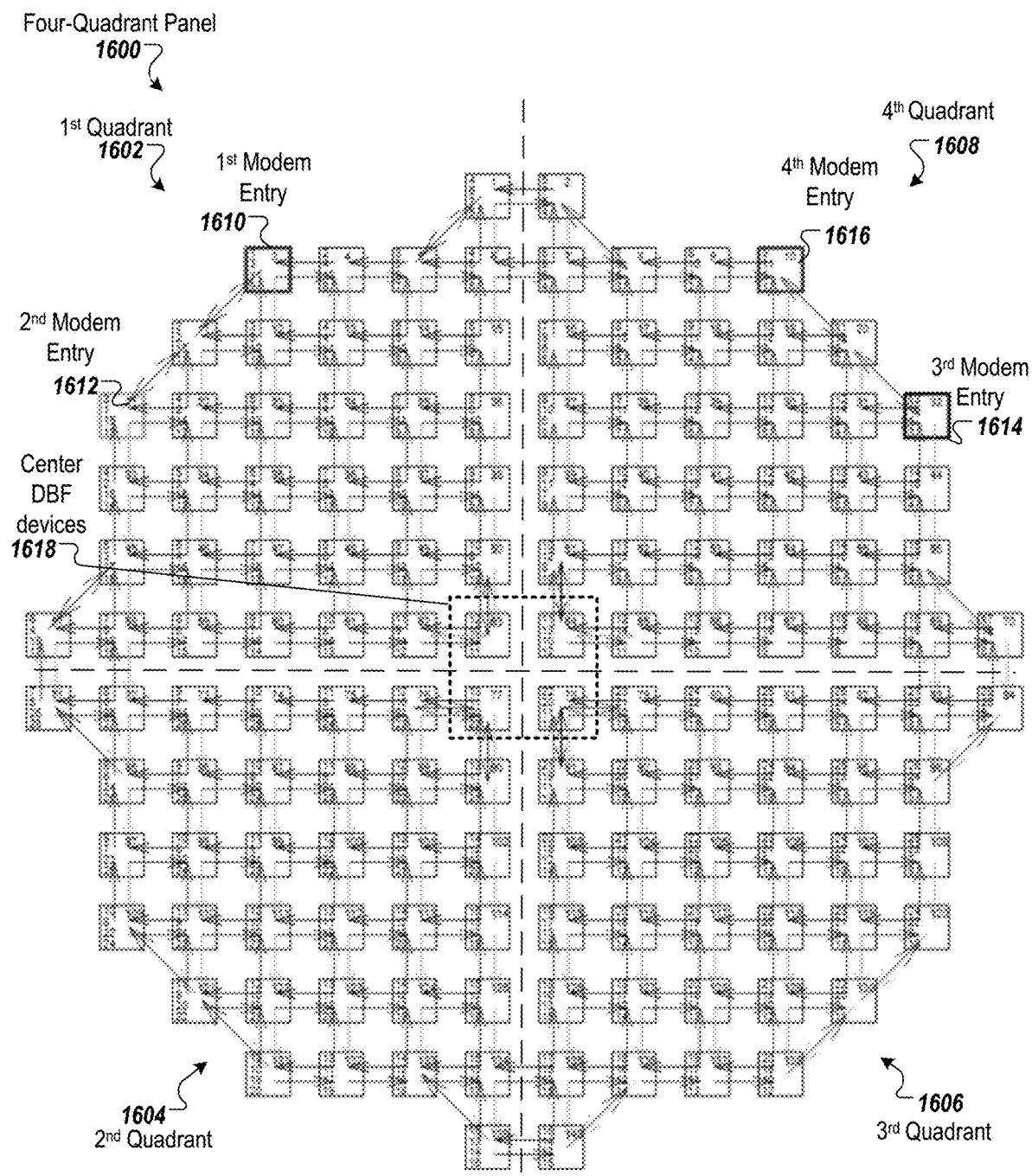
FIG. 16 illustrates a connection network of SerDes links of a four-quadrant TX panel having four quadrants and two extra SerDes links for each of the center DBF devices according to one embodiment.

FIG. 16 illustrates a connection network of SerDes links of a four-quadrant TX panel 1600 having four quadrants 1602-1608 and two extra SerDes links for each of the center DBF devices 1618 according to one embodiment. Each quadrant can include a separate circuit board or other support structure upon which antenna elements are disposed. Two quadrants 1602, 1608 each include two modem entries, a first modem entry 1610 and a second modem entry 1612 in a first quadrant 1602, and a third modem entry 1614 and a fourth modem entry 1616 in a fourth quadrant 1608. The quadrants are coupled over SerDes links at the outer edges of the four-quadrant TX panel 1600, as illustrated at DBFs #1 and #2, DBFs #37 and #71, DBFs #70 and #84, and #139 and #140. This positions the physical connections between the circuit boards at edges of the four-quadrant TX panel 1600. As noted above, the center DBF devices 1618 have two extra SerDes links between adjacent DBF devices. For example, a first center DBF device has three SerDes links to a second DBF device that is adjacent in a first direction (e.g., north in the first quadrant 1602) and three SerDes links to a third DBF device that is adjacent in a second direction (e.g., west in the first quadrant 1602). In comparison, the same center DBF device in the DBF panel 1300 of FIG. 13 includes two SerDes links between the same second DBF device that is adjacent in the first direction and two SerDes links between the same third DBF device that is adjacent in the second direction.

Figure 17:
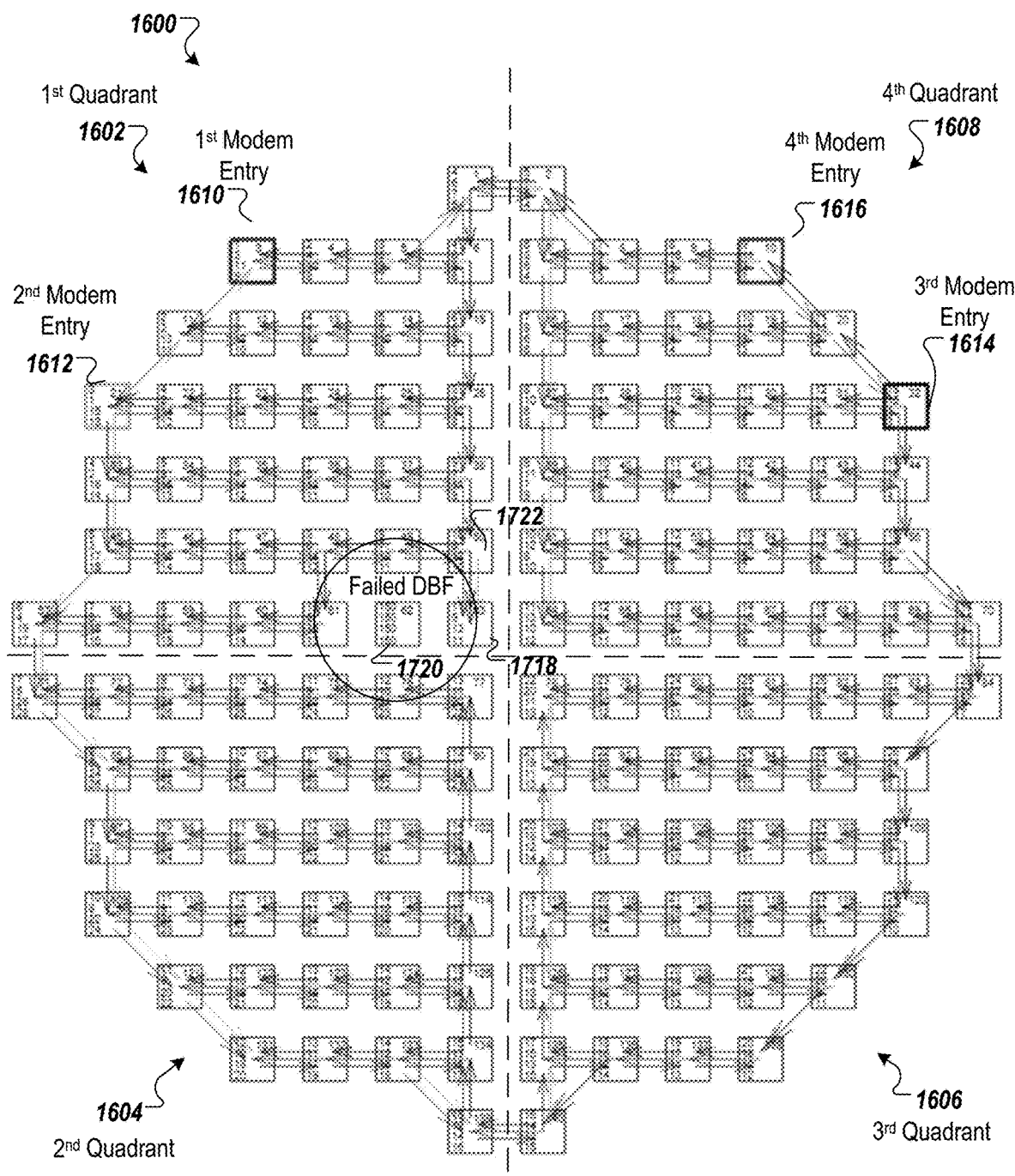
FIG. 17 illustrates an unblocked DBF device on a four-quadrant TX panel with the connection network of SerDes links of the DBF panel of FIG. 16 according to one embodiment.

FIG. 17 illustrates an unblocked DBF device on a four-quadrant TX panel with the connection network of SerDes links of the DBF panel of FIG. 16 according to one embodiment. Similar to the embodiment of FIG. 15, the DBF device 1720 failed. Given that there is an extra SerDes link between the DBF device 1718 and the DBF device 1722, it is unblocked by the failed DBF device 1720. The DBF device 1722 can send the TX data stream to the unblock DBF device 1718 by using the extra SerDes link.

Figure 18:
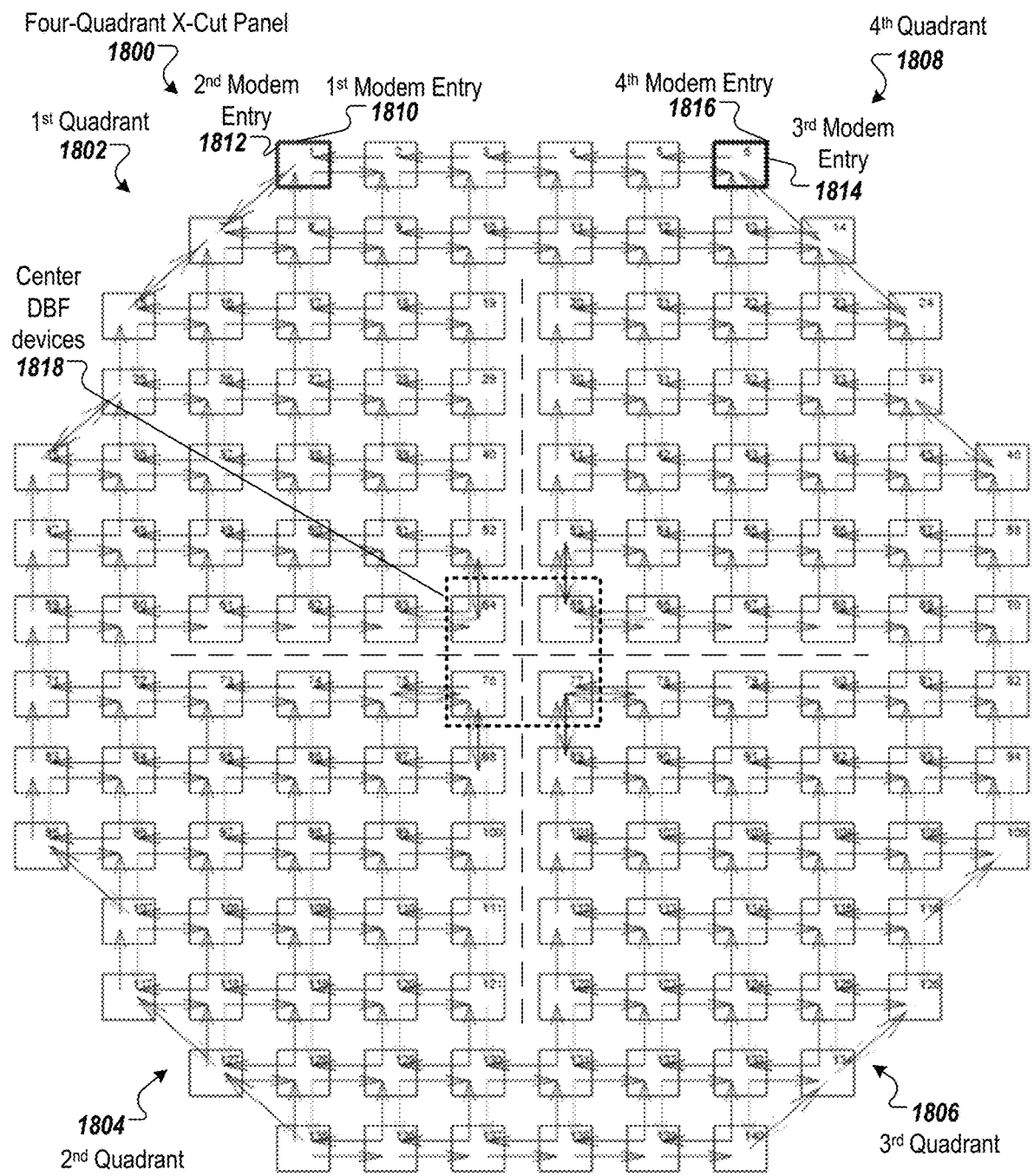
FIG. 18 illustrates a connection network of SerDes links of a four-quadrant X-cut TX panel with a triangular lattice according to one embodiment.

FIG. 18 illustrates a connection network of SerDes links of a four-quadrant X-cut TX panel 1800 with a triangular lattice according to one embodiment. Each quadrant can include a separate circuit board or other support structure upon which antenna elements are disposed. The connection network of the four-quadrant T-cut TX panel 1800 is similar to the four-quadrant TX panel 1600 of FIG. 16, except each of the modem entries 1810-1818 is located in one of the four quadrants 1802-1808. In the illustrated embodiment, the modem entries 1810 and 1812 can be the same device and the modem entries 1818 and 1814 can be the same device. Alternatively, the modem entries can be located in the four separate quadrants. Also, the X-cut permits two additional SerDes links, a total of 4 SerDes links, between two pairs of DBF devices at each of the first edge and the second edge of the quadrant, instead of two SerDes links between one pair of DBF devices at each of the first and second edges of the quadrant as in the four-quadrant X-cut TX panel 1800. The quadrants are coupled over SerDes links at the outer edges of the four-quadrant X-cut TX panel 1800, as illustrated at DBFs #3, #4, #10, #10, DBFs #59, #60, #71, #72, DBFs #130, #131, #137, #138, and DBFs #69, #70, #81, #82. This positions the physical connections between the circuit boards at edges of the four-quadrant X-cut TX panel 1800. As noted above, the center DBF devices 1818 have two extra SerDes links between adjacent DBF devices. For example, a first center DBF device has three SerDes links to a second DBF device that is adjacent in a first direction (e.g., north in the first quadrant 1802) and three SerDes links to a third DBF device that is adjacent in a second direction (e.g., west in the first quadrant 1802). In comparison, the same center DBF device in the DBF panel 1300 of FIG. 13 includes two SerDes links between the same second DBF device that is adjacent in the first direction and two SerDes links between the same third DBF device that is adjacent in the second direction. The maximum hop number in the four-quadrant X-cut TX panel 1800 is 26 when there are no failed DBF devices and 29 when there is a failure.

Figure 19:
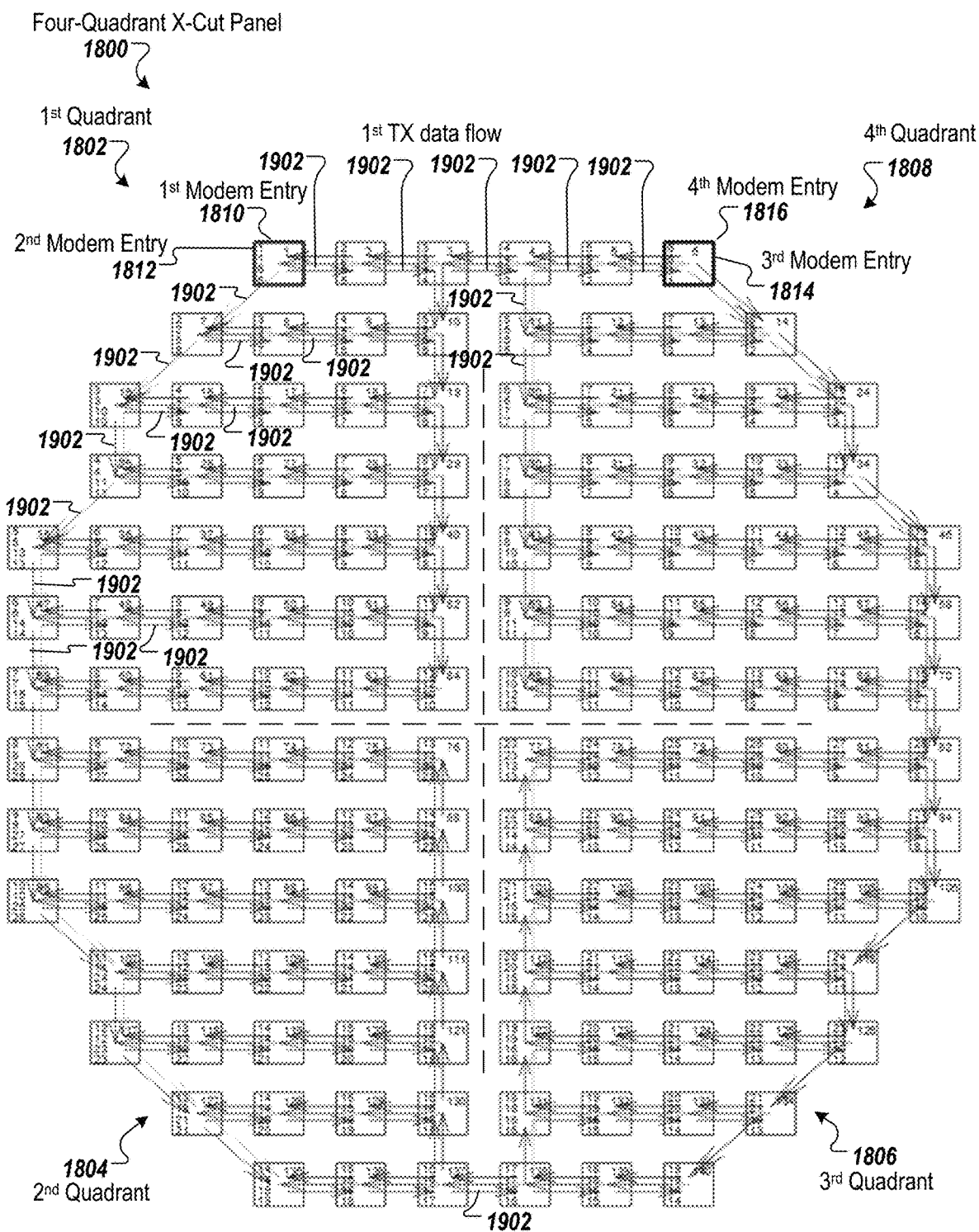
FIG. 19 illustrates SerDes routing for the four-quadrant X-cut TX panel of FIG. 18 according to one embodiment.

FIG. 19 illustrates SerDes routing for the four-quadrant X-cut TX panel 1800 of FIG. 18 according to one embodiment. The four TX data streams originate from each of the respective modem entries 1810-1816. For example, a first TX data stream 1902 flows from the first modem entry 1810 (DBF #1) in a first branch to DBF #6, flows from the first modem entry 1810 (DBF #1) to a second branch to DBF #7 thru DBF #10, which flows to a third branch to DBF #15 thru DBF #19, and so on. Similarly, the other TX data streams flow from the respective modem entries through the four quadrants 1802-1808.

Figure 20:
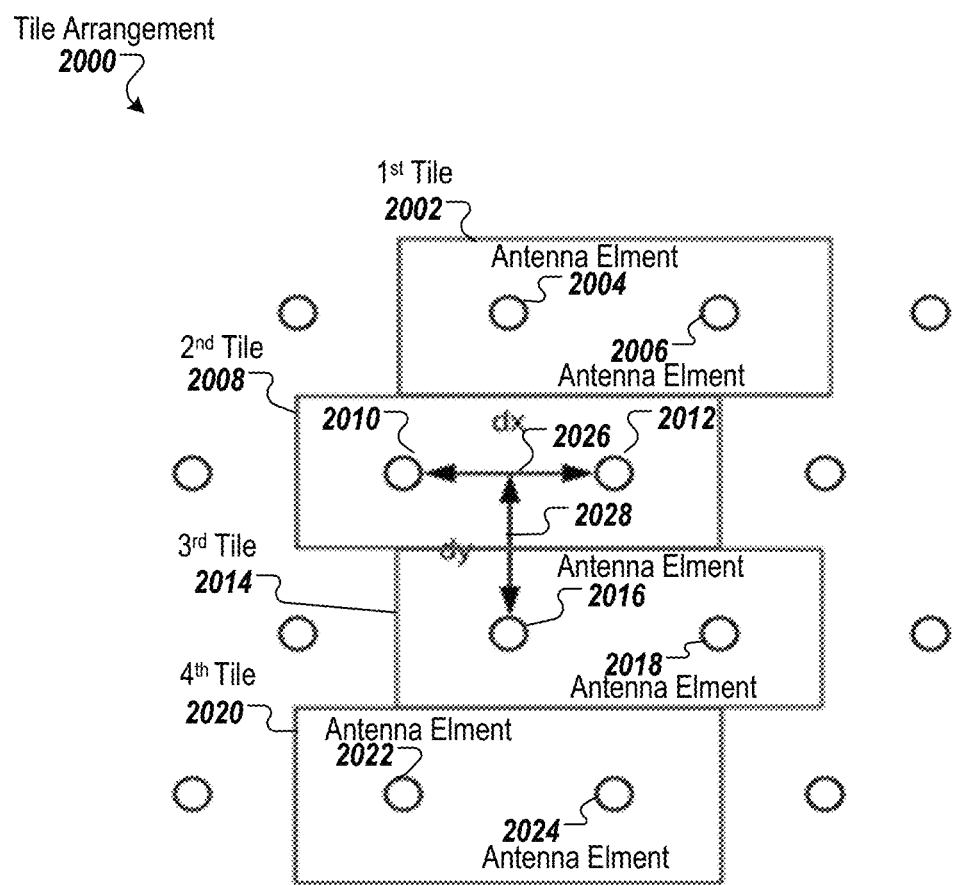
FIG. 20 illustrates a tile arrangement with multiple tiles, each tile having 2×1 elements according to one embodiment.

FIG. 20 illustrates a tile arrangement 2000 with multiple tiles, each tile having 2×1 elements according to one embodiment. A first tile 2002 of the tile arrangement 2000 can be a first antenna module that includes two antenna elements 2004, 2006. The first tile 2002 has a rectangular shape and can include a circuit board upon which the two antenna elements 2004, 2006 are located. The two antenna elements 2004, 2006 can be printed or otherwise disposed on or within the circuit board. The circuit board can have a rectangular shape and the two antenna elements 2004, 2006 can be located along a line of the circuit board. In the illustrated embodiment, the two antenna elements 2004, 2006 are disposed on a longitudinal center line of the circuit board. Alternatively, the two antenna elements 2004, 2006 can be disposed on the circuit board in other configurations. A second tile 2008 can be a second antenna module that includes two antenna elements 2010, 2012. A third tile 2014 can be a third antenna module that includes two antenna elements 2016, 2018. A fourth tile 2020 can be a fourth antenna module that includes two antenna elements 2022, 2024. The first tile 2002, the second tile 2008, the third tile 2014, and the fourth tile 2020 can be identical antenna modules. The second tile 2008 can be offset from the first tile 2002 such that the antenna elements 2004, 2010, and 2012 form a triangle, such an equidistant triangle. Similarly, the antenna elements 2004, 2006, and 2012 form a second triangle, as well as the other antenna elements 2016, 2018, 2022, 2024 with respective antenna elements. In the case of an equidistant triangle a first distance 2026, dx, is equal between each of the antenna elements. A second distance 2028, dy, can represent a distance between a first row of antenna elements and a second row of antenna elements. The third tile 2014 can be aligned with the first tile 2002, which results in the antenna element 2004 and the antenna element 2016 being aligned, as well as the antenna elements 2006 and 2018. Similarly, the fourth tile 2020 can be aligned with the second tile 2008, which results in the antenna element 2010 and the antenna element 2022 being aligned, as well as the antenna element 2012 and the antenna element 2024.

In the diagram, the first distance 2026 can be equal to a multiple of a wavelength, $\lambda$, and the second distance 2028 can be a multiple of the first distance 2026. The wavelength, $\lambda$, is the free-space wavelength at a high end of a frequency band of a panel. For example, the first distance 2026 can be 0.60174*$\lambda$ (dx=0.60174*$\lambda$), and the second distance 2028 can be equal to $\sqrt{3}/2$ times the first distance 20206 (dy=dx*$\sqrt{3}/2$). For instance, for 17.7 GHZ-18.2 GHz band, the wavelength of 18.2 GHz is 16.47211 mm, therefore the first distance 2026, dx is around 9.912 mm. The tile size can be (2dx−0.2 mm)*(dy−0.2 mm) for all tiles, with 0.2 mm as a gap between tiles.

Figure 21:
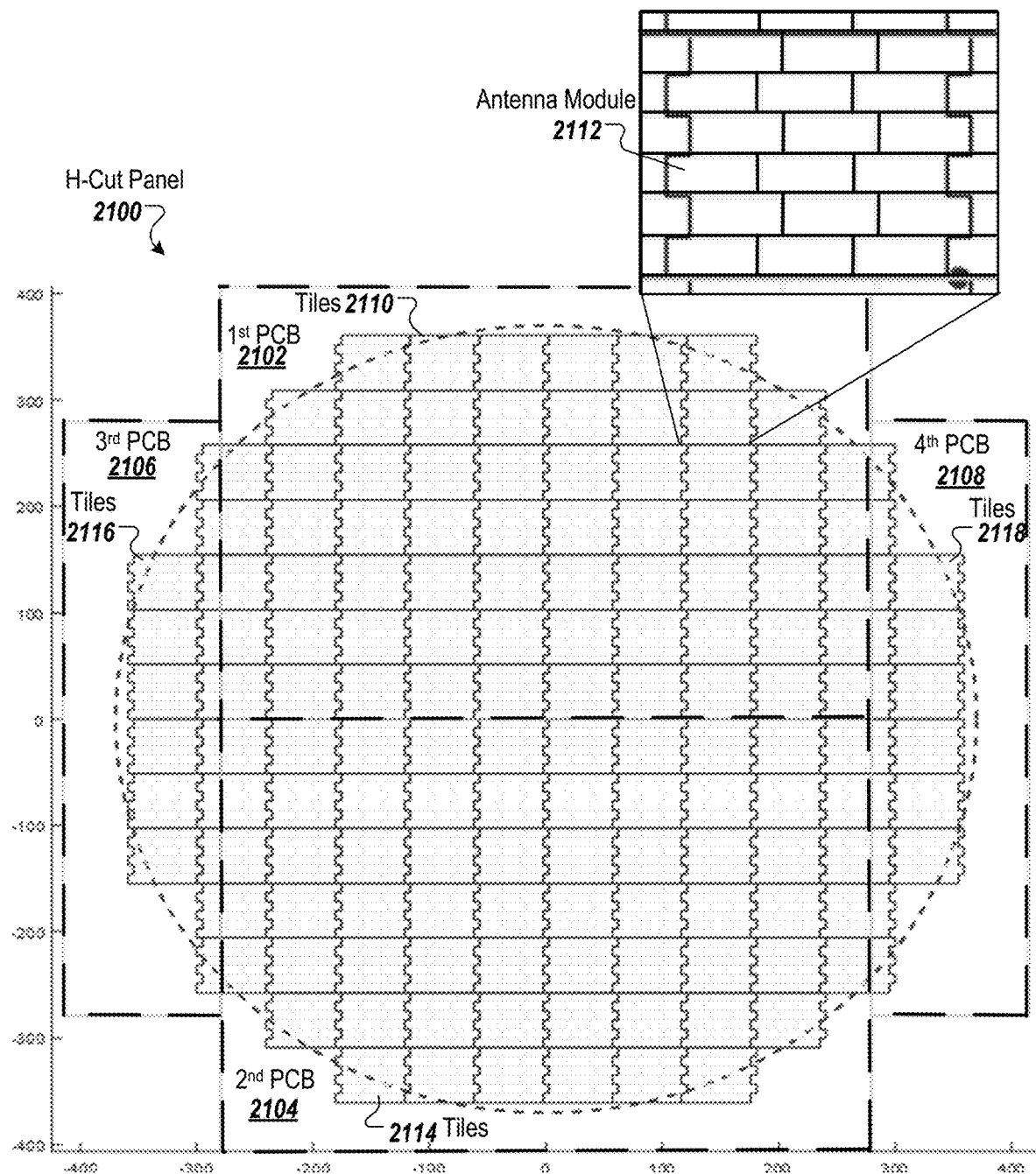
FIG. 21 illustrates an H-cut TX panel with multiple printed circuit boards (PCBs) according to one embodiment.

FIG. 21 illustrates an H-cut TX panel 2100 with multiple printed circuit boards (PCBs) according to one embodiment. The H-cut TX panel 2100 includes a first PCB 2102, a second PCB 2104 disposed adjacent to on opposite sides of an equator of the H-cut TX panel 2100 (e.g., north and south sides of the equator). The H-cut TX panel 2100 also includes a third PCB 2106 that is disposed adjacent to both the first PCB 2102 and the second PCB 2104 on a first side (e.g., west side) of the H-cut TX panel 2100 and a fourth PCB 2108 that is disposed adjacent to both the first PCB 2102 and the second PCB 2104 on a second side (e.g., east side) of the H-cut TX panel 2100. The multiple tiles 2110 are disposed on the first PCB 2102 and each of the multiple tiles 2110 includes multiple antenna modules 2112 that are placed in a similar manner as shown and described with respect to FIG. 20. Each antenna module 2112 includes two or more antenna elements. For example, each antenna module 2112 can include a pair of antenna elements as shown in FIG. 20. Tiles 2114 are disposed on the second PCB 2104, tiles 2116 are disposed on the third PCB 2106, and tiles 2118 are disposed on the fourth PCB 2108 in a similar manner.

In one embodiment, the PCB can be 16″×22″ for a TX panel that operates at 17.7 to 18.2 GHz for the H-cut TX panel 2100. The same size of PCB can be used for a H-cut TX panel 2100 that operates at 18.2 to 18.6 GHz, as well as at 18.8 to 19.3 GHz. Using the 2×1 tiling, the panel can include 5038 elements. In other DBF tiling, the panel can include 5040 elements with the PCBs of this size. Alternatively, other sizes of PCB can be used.

Figure 22:
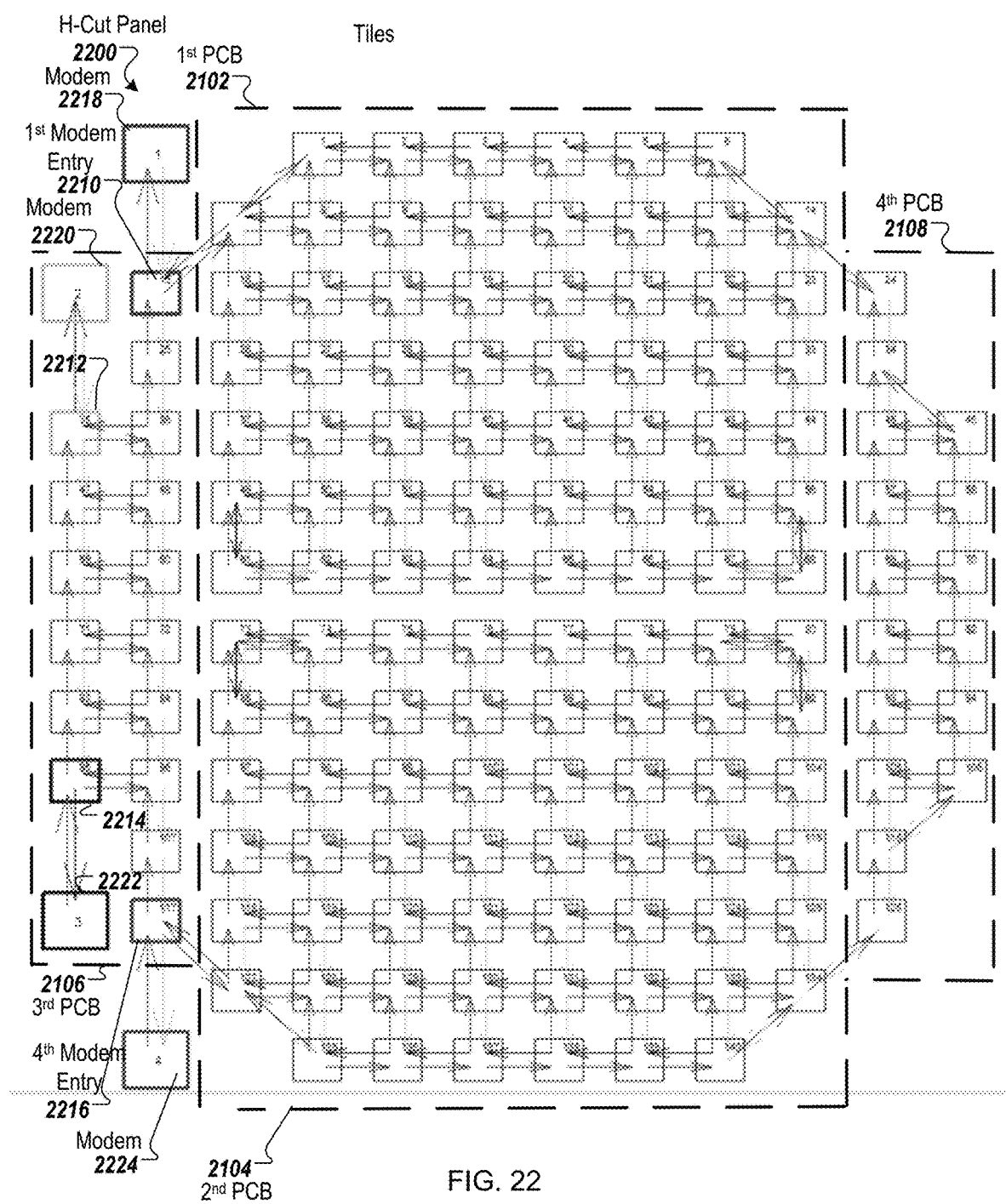
FIG. 22 illustrates a connection network of SerDes links of an H-cut TX panel with backup connections according to one embodiment.

FIG. 22 illustrates a connection network of SerDes links of an H-cut TX panel 2200 with backup connections according to one embodiment. Instead of four quadrants, the H-cut TX panel 2200 includes the four PCBs of two different sizes upon which the antenna modules are disposed. The third PCB can include the four modem entries 2210-2216. A first modem entry 2210 is coupled to a first modem 2218, a second modem entry 2212 is coupled to a second modem 2220, a third modem entry 2214 is coupled to a third modem 2222, and a fourth modem entry 2216 is coupled to a fourth modem 2224. In the illustrated embodiment, the second and third modems are disposed on the third PCB 2106. In another embodiment, all four of the modems are disposed on the third PCB 2106. Alternatively, the four modems are located elsewhere, such as on the other circuit boards or other locations within the H-cut TX panel 2200.

Serdes links can be made between pairs of DBFs of two adjacent PCBs, as illustrated. This positions the physical connections between the circuit boards at edges of the DBF panel 2200. The H-cut TX panel 2200 can also include some backup connections. The SerDes routing can be either vertical or horizontal as illustrated in FIGS. 23-24.

Figure 23:
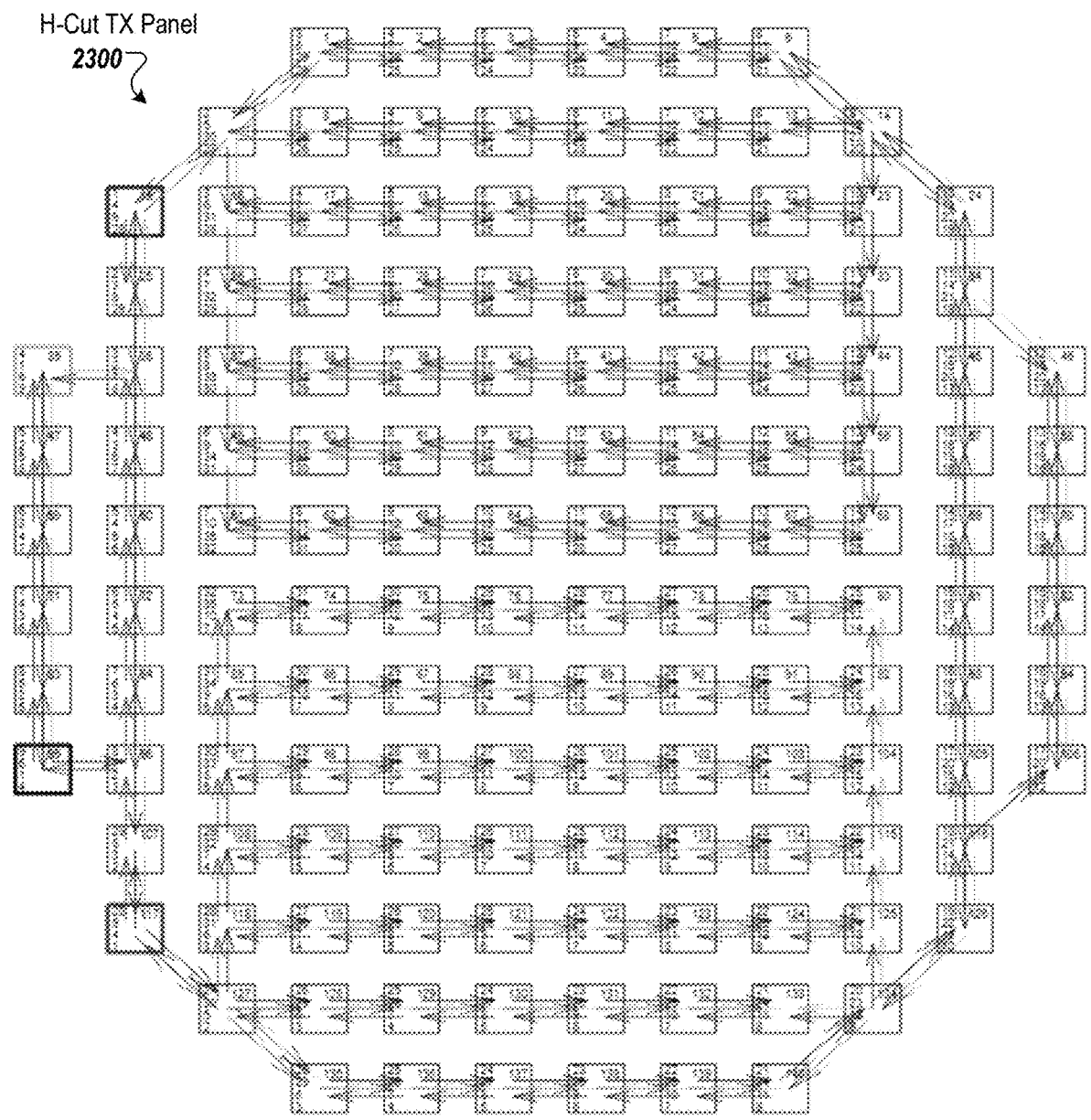
FIG. 23 illustrates SerDes routing for a vertical routing, H-cut TX panel according to one embodiment.

FIG. 23 illustrates SerDes routing for a vertical routing, H-cut TX panel 2300 according to one embodiment. The maximum hop number in the vertical routing, H-cut TX panel 2300 is 35 when there are no failed DBF devices. The maximum hop number in the vertical routing, H-cut TX panel 2300 is 35 when there are no failed.

Figure 24:
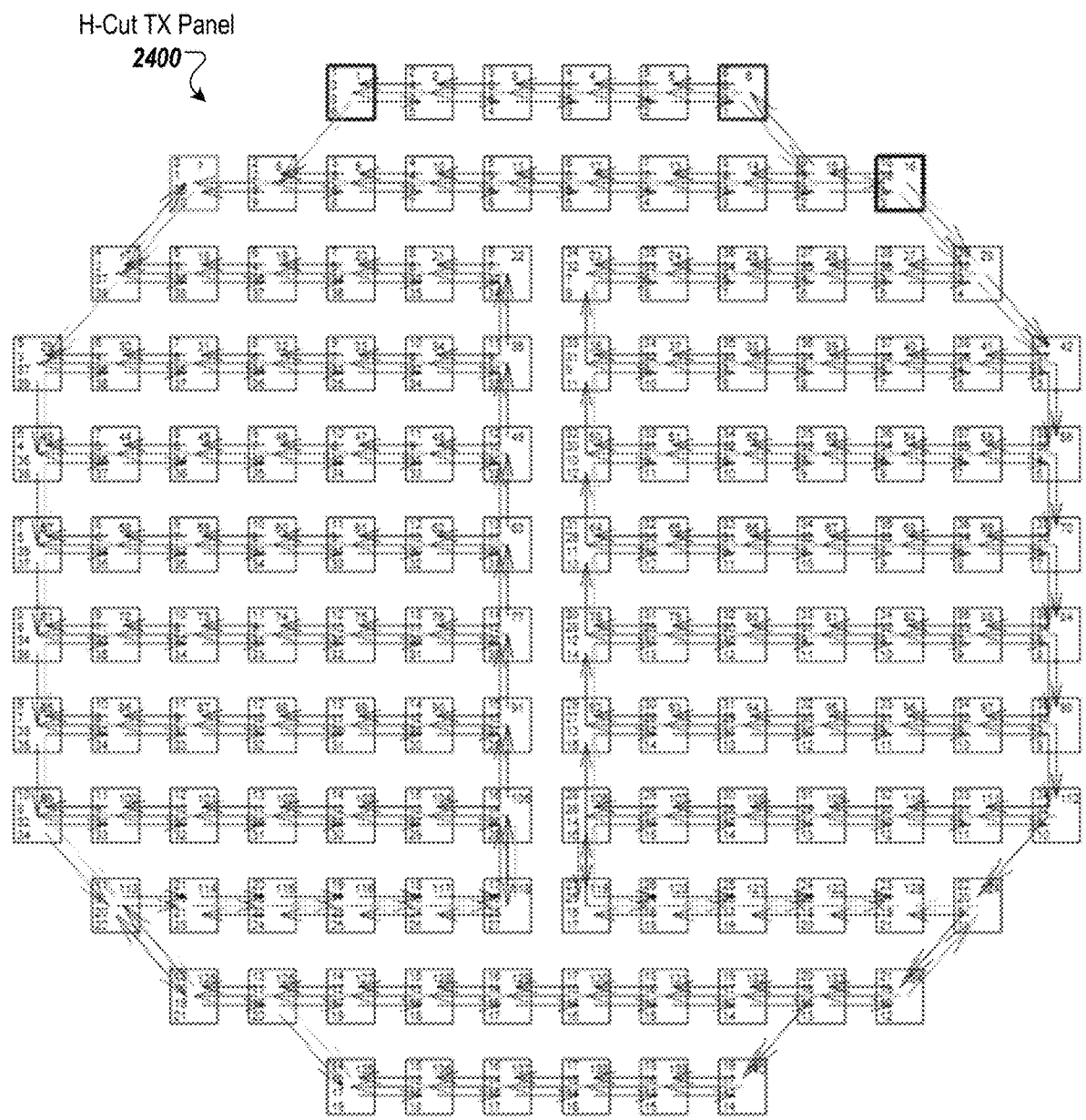
FIG. 24 illustrates SerDes routing for a horizontal routing, H-cut TX panel according to one embodiment.

FIG. 24 illustrates SerDes routing for a horizontal routing, H-cut TX panel 2400 according to one embodiment. The maximum hop number in the horizontal routing, H-cut TX panel 2400 is 39 when there are no failed DBF devices. The maximum number of hops can be 39. It should be noted that the SerDes connections for the first modem entry and the fourth modem entry in FIG. 24 are slightly different from those in FIG. 23. In FIG. 23, the DBFs #8 and ***15 are considered to be both backup entries and backup sector connection points. In those cases, the maximum number of hops can be 40. It should be noted that for H-cut panels, the backup sector connections might not be feasible due to the routing distances.

Figure 25:
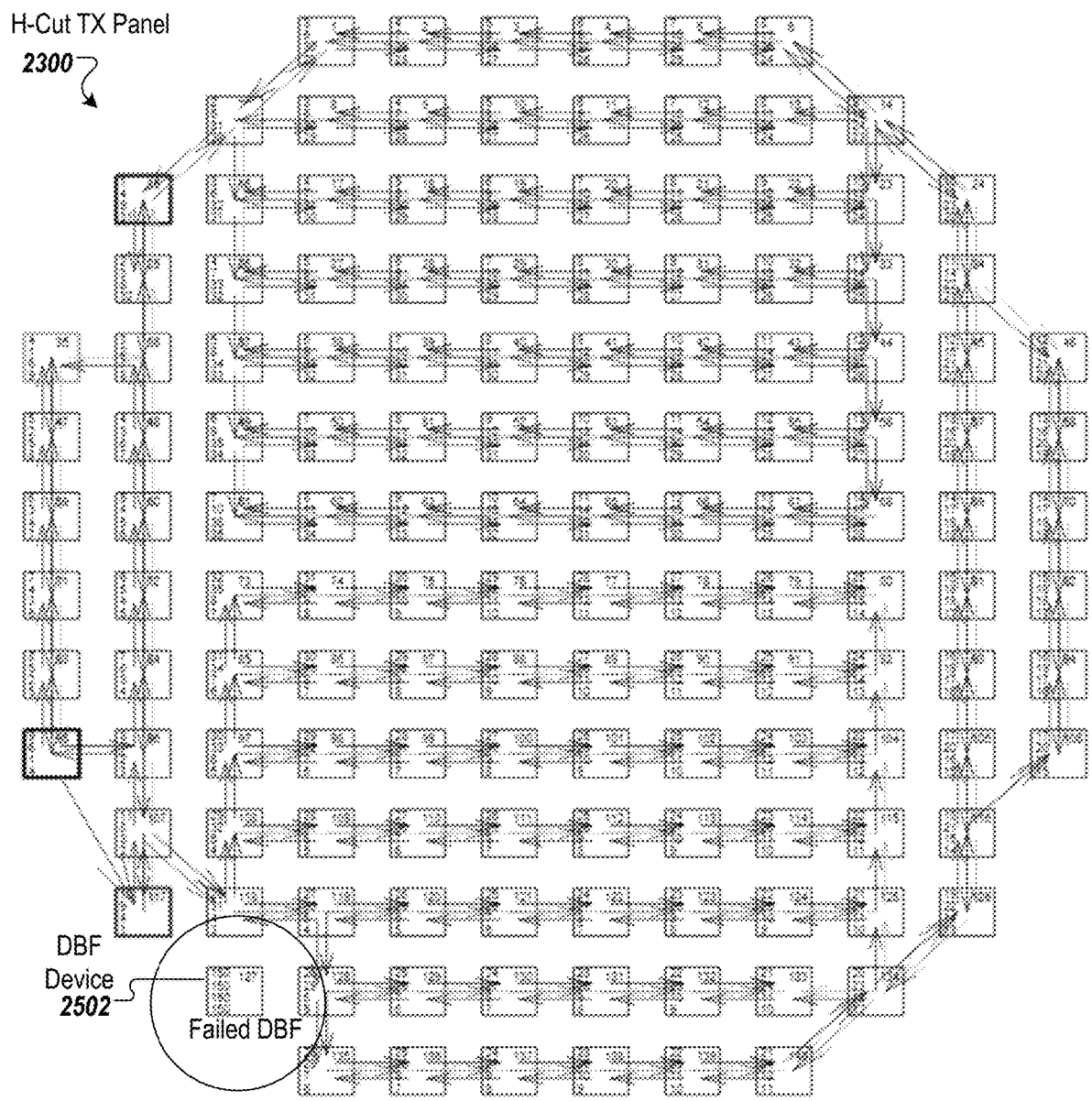
FIG. 25 illustrates failure recovery with SerDes re-routing for the vertical routing, H-cut TX panel of FIG. 23 according to one embodiment.

FIG. 25 illustrates failure recovery with SerDes re-routing for the vertical routing, H-cut TX panel 2300 of FIG. 23 according to one embodiment. In this case, a DBF device 2502 failed. The failure recovery includes re-routing the SerDes links through adjacent DBF devices as illustrated in FIG. 25. In this failure recovery example, the maximum number of hops is 40.

Figure 26:
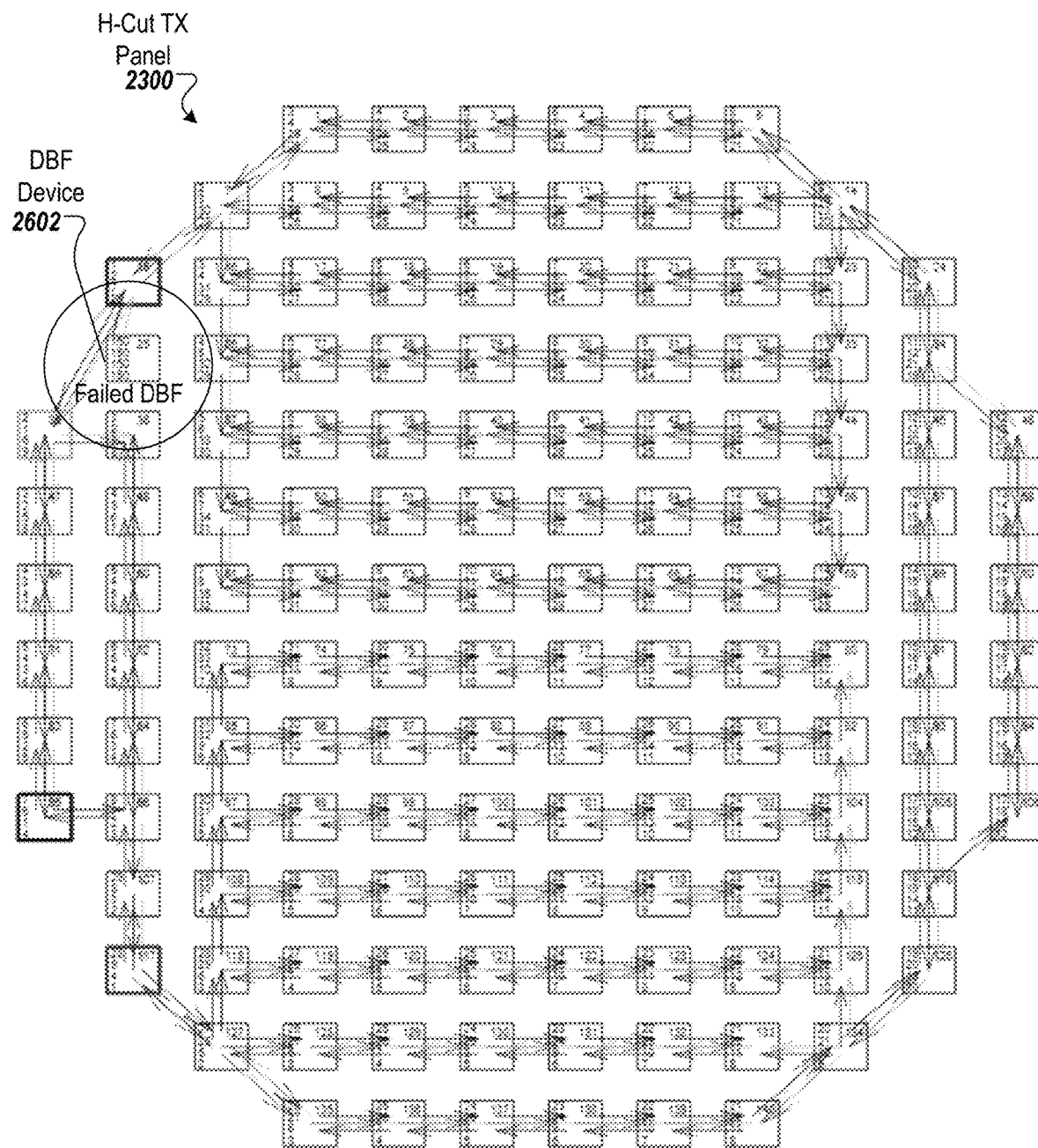
FIG. 26 illustrates failure recovery with SerDes re-routing for the vertical routing, H-cut TX panel of FIG. 23 according to another embodiment.

FIG. 26 illustrates failure recovery with SerDes re-routing for the vertical routing, H-cut TX panel 2300 of FIG. 23 according to another embodiment. In this case, a DBF device 2602 failed. The failure recovery includes re-routing the SerDes links through adjacent DBF devices as illustrated in FIG. 25.

Figure 27:
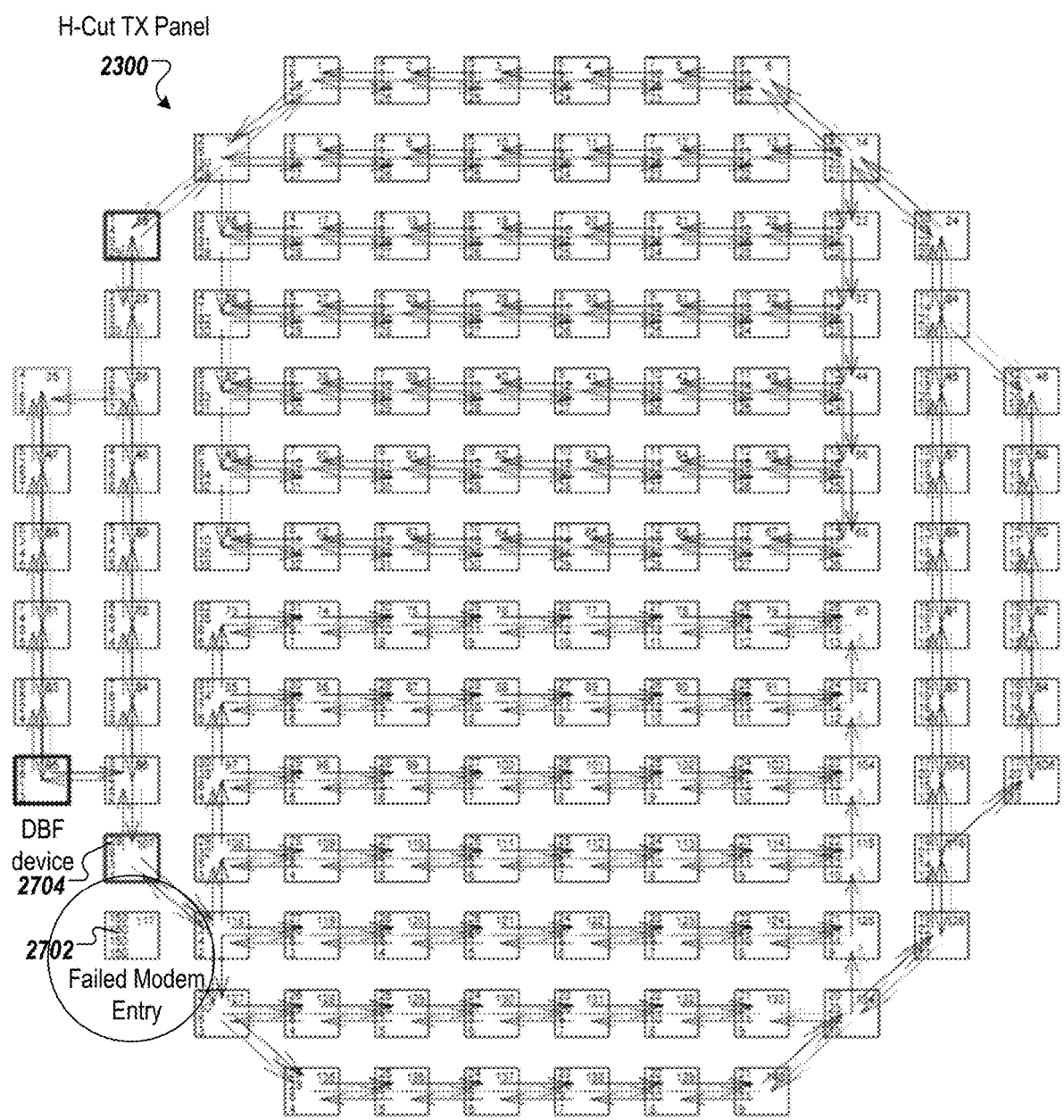
FIG. 27 illustrates entry failure recovery for the vertical routing, H-cut TX panel of FIG. 23 according to one embodiment.

FIG. 27 illustrates entry failure recovery for the vertical routing, H-cut TX panel of FIG. 23 according to one embodiment. In this case, modem entry 2702 failed. The entry failure recovery designates the DBF 2704 as the new modem entry and the SerDes links are re-routed accordingly as illustrated in FIG. 27.

Figure 28:
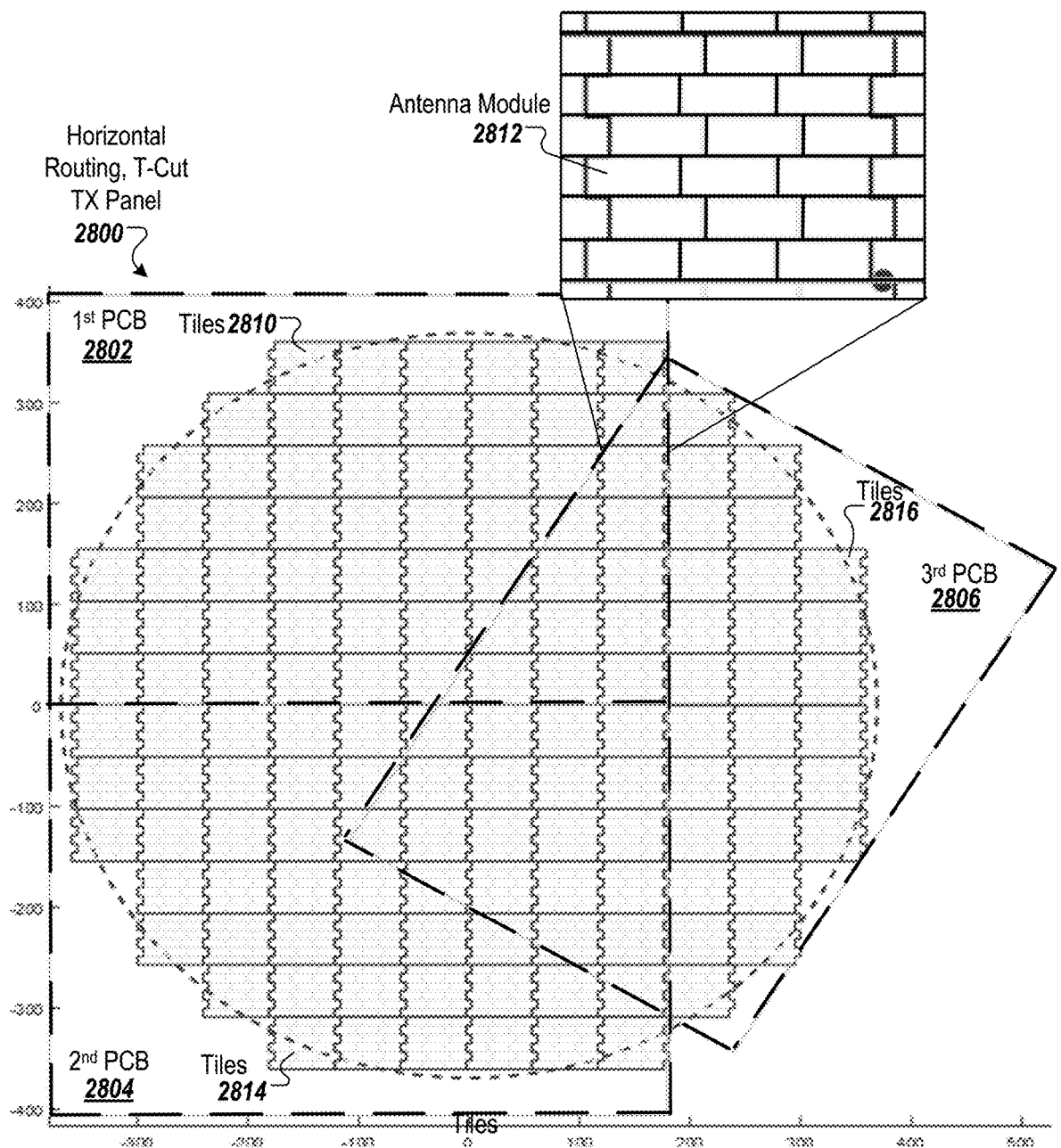
FIG. 28 illustrates a horizontal routing, T-cut TX panel with multiple PCBs according to one embodiment.

FIG. 28 illustrates a horizontal routing, T-cut TX panel 2800 with multiple PCBs according to one embodiment. The horizontal routing, T-cut TX panel 2800 includes a first PCB 2802, a second PCB 2804 disposed adjacent to on opposite sides of an equator of the horizontal routing, T-cut TX panel 2800 (e.g., north and south sides of the equator). The horizontal routing, T-cut TX panel 2800 also includes a third PCB 2806 that is disposed at an angle from the equator and overlaps at least a portion of the first PCB 2802 and the second PCB 2804. The multiple tiles 2810 are disposed on the first PCB 2802 and each of the multiple tiles 2810 includes multiple antenna modules 2812 that are placed in a similar manner as shown and described with respect to FIG. 20. Each antenna module 2812 includes two or more antenna elements. For example, each antenna module 2812 can include a pair of antenna elements as shown in FIG. 20. Tiles 2814 are disposed on the second PCB 2804 and tiles 2816 are disposed on the third PCB 2806 in a similar manner.

In one embodiment, the PCB can be 16"×22" for the horizontal routing, T-cut TX panel 2800 that operates at 17.7 to 18.2 GHz. The same size of PCB can be used for the horizontal routing, T-cut TX panel 2800 that operates at 18.8 to 19.3 GHz with the PCB size of 16"×22", as well as a horizontal routing, T-cut TX panel 2800 at 17.7 to 18.2 GHz or 17.7 to 18.2 with the PCB size of 19"×22". Alternatively, other sizes of PCB can be used.

Figure 29:
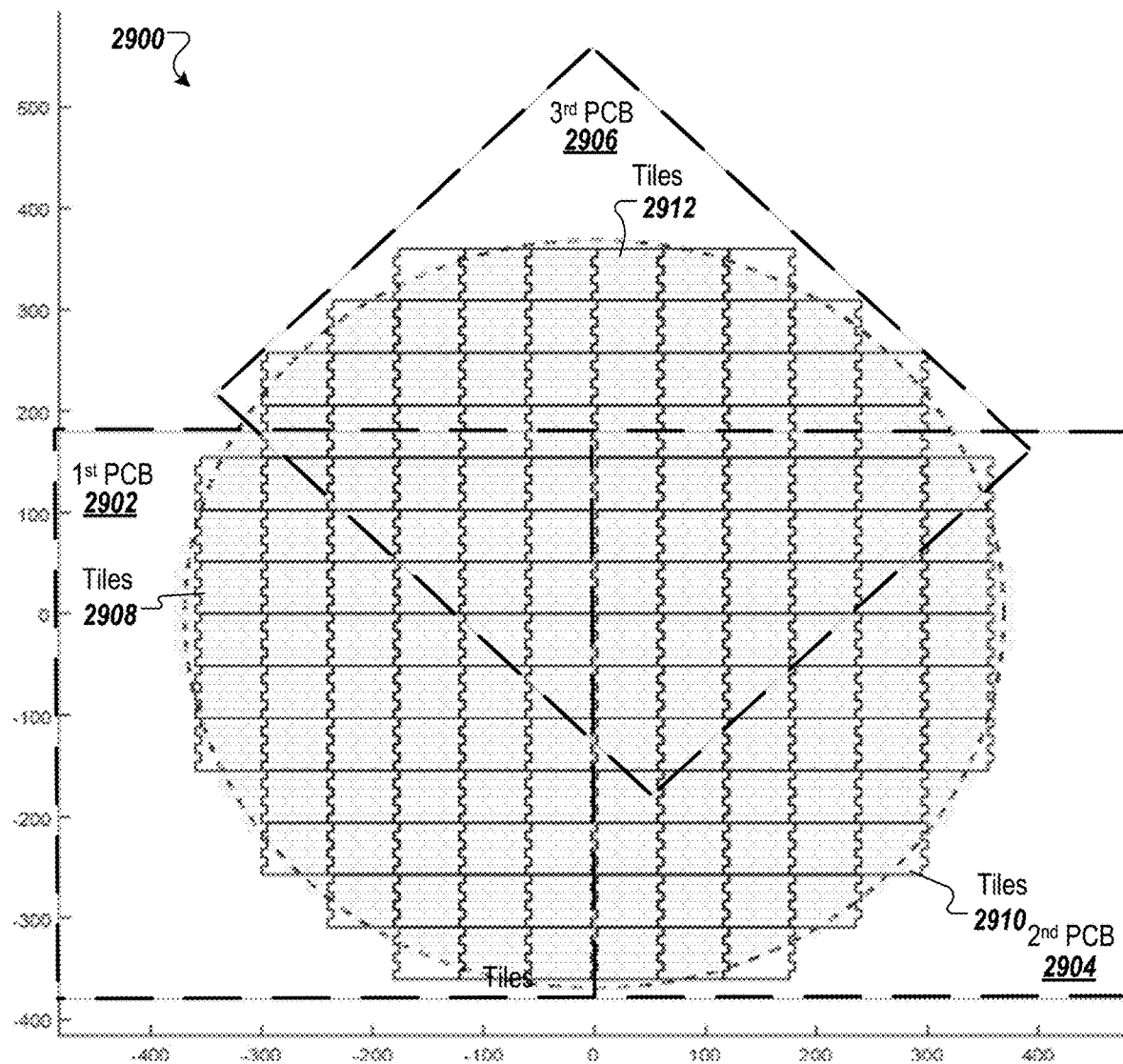
FIG. 29 illustrates a vertical routing, T-cut TX panel with multiple PCBs according to one embodiment.

FIG. 29 illustrates a vertical routing, T-cut TX panel 2900 with multiple PCBs according to one embodiment. The vertical routing, T-cut TX panel 2900 includes a first PCB 2902, a second PCB 2904 disposed adjacent to on opposite sides of an center line of the vertical routing, T-cut TX panel 2900 (e.g., west and east sides of the center line). The vertical routing, T-cut TX panel 2900 also includes a third PCB 2906 that is disposed at an angle from the equator and overlaps at least a portion of the first PCB 2902 and the second PCB 2904. The multiple tiles 2910 are disposed on the first PCB 2902 and each of the multiple tiles 2910 includes multiple antenna modules 2912 that are placed in a similar manner as shown and described with respect to FIG. 20. Each antenna module 2912 includes two or more antenna elements. For example, each antenna module 2912 can include a pair of antenna elements as shown in FIG. 20. Tiles 2914 are disposed on the second PCB 2904 and tiles 2916 are disposed on the third PCB 2906 in a similar manner.

In one embodiment, the PCB can be 16"×22" for the vertical routing, T-cut TX panel 2900 that operates at 17.7 to 18.2 GHz. The same size of PCB can be used for the vertical routing, T-cut TX panel 2900 that operates at 18.8 to 19.3 GHz with the PCB size of 16"×22", as well as a vertical routing, T-cut TX panel 2900 at 17.7 to 18.2 GHz or 17.7 to 18.2 with the PCB size of 19"×22". Alternatively, other sizes of PCB can be used.

Figure 30:
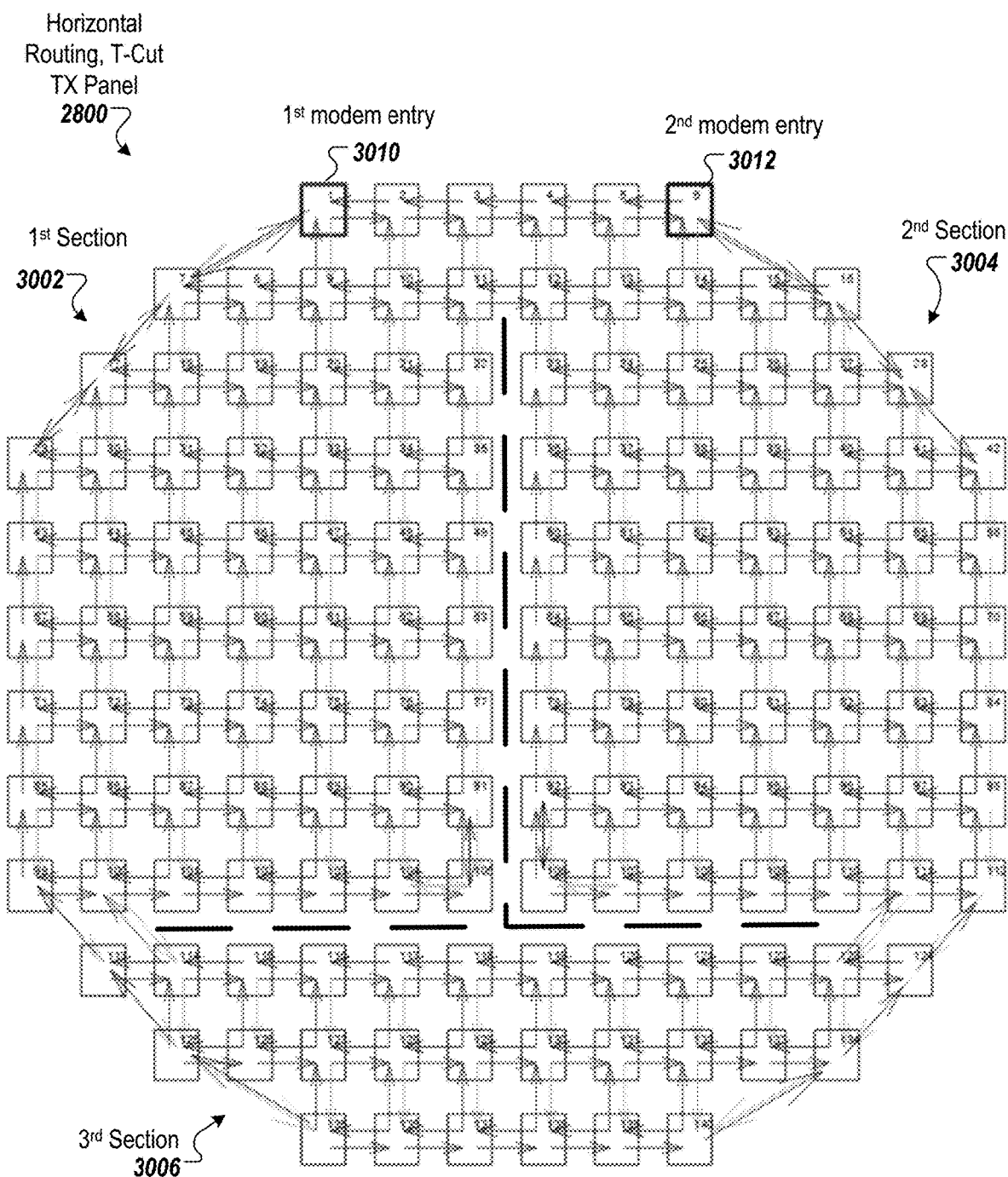
FIG. 30 illustrates a connection network of SerDes links for the horizontal routing, T-cut TX panel of FIG. 28 according to one embodiment.

FIG. 30 illustrates a connection network of SerDes links for the horizontal routing, T-cut TX panel 2800 of FIG. 28 according to one embodiment. Instead of four quadrants or the H-cut, the horizontal routing, T-cut TX panel 2800 includes the three PCBs of similar or same size upon which the antenna modules are disposed. The modems can be disposed on any one or more of the PCBs. In the illustrated embodiment, a first modem entry 3010 is coupled to a first modem in a first section 3002 of the horizontal routing, T-cut TX panel 2800 and a second modem entry 3012 is coupled to a second modem in a second section 3004 of the horizontal routing, T-cut TX panel 2800. Optionally third and fourth modem entries can be disposed in the first section 3002, the second section 3004, or a third section 3006.

Serdes links can be made between pairs of DBFs of two adjacent PCBs, as illustrated. This positions the physical connections between the circuit boards at edges of the horizontal routing, T-cut TX panel 2800. The horizontal routing, T-cut TX panel 2800 can also include some backup connections. The SerDes routing can be either vertical, horizontal, or diagonal.

Figure 31:
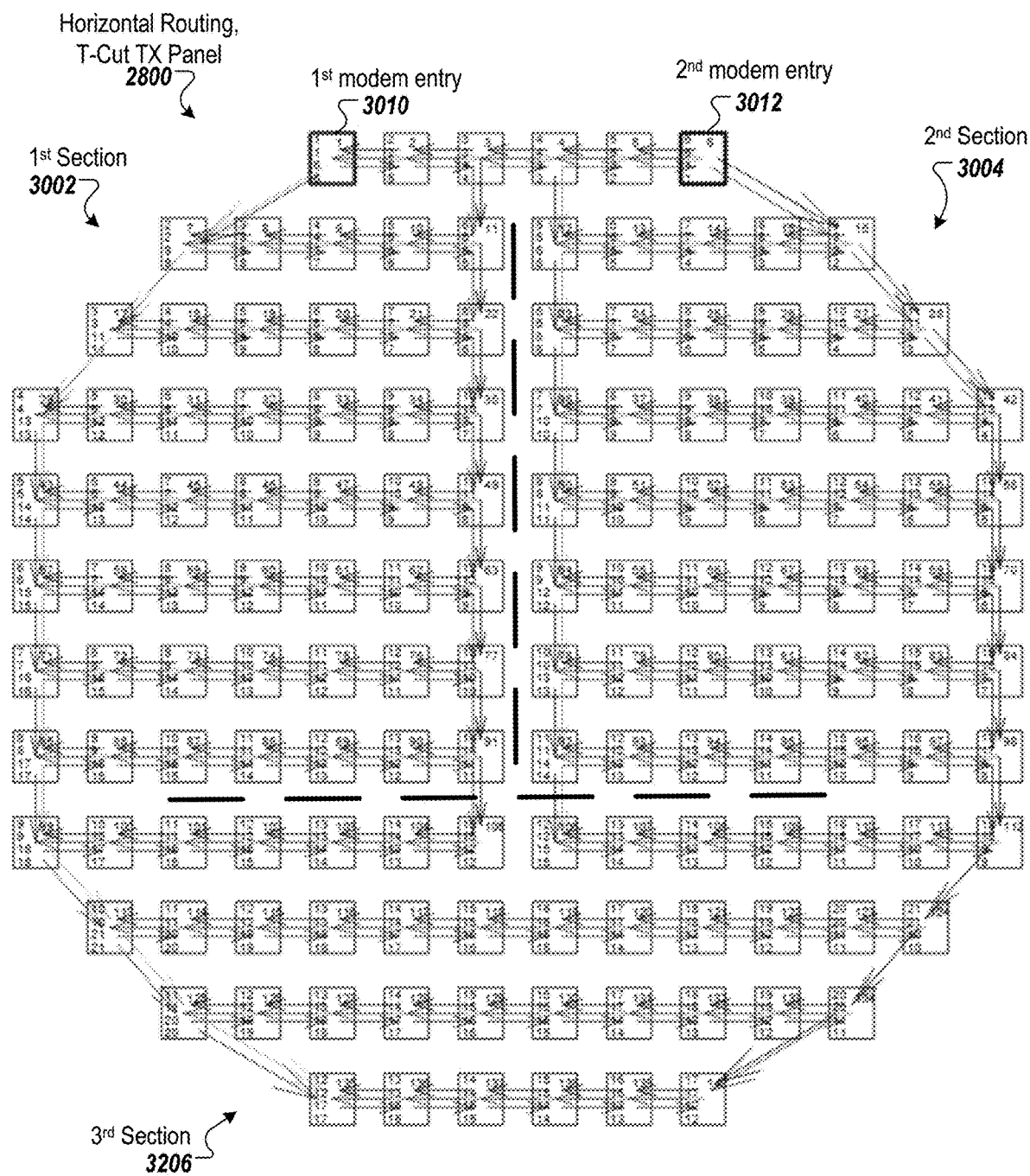
FIG. 31 illustrates SerDes routing for the horizontal routing, T-cut TX panel of FIG. 28 according to one embodiment.

FIG. 31 illustrates SerDes routing for the horizontal routing, T-cut TX panel 2800 of FIG. 28 according to one embodiment. The maximum hop number in the horizontal routing, T-cut TX panel 2800 is 21 when there are no failed DBF devices.

Figure 32:
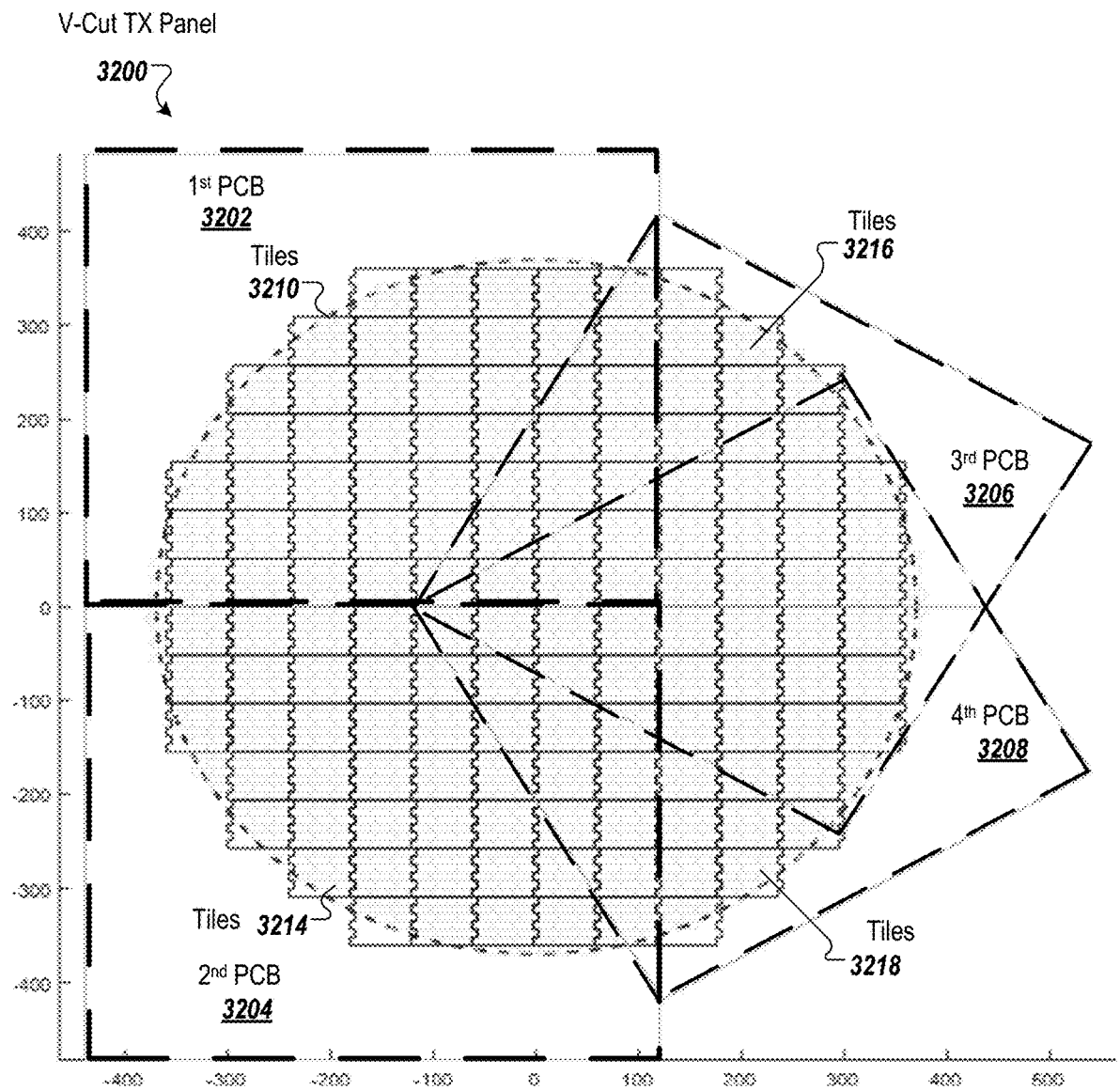
FIG. 32 illustrates a V-cut TX panel with multiple PCBs according to one embodiment.

FIG. 32 illustrates a V-cut TX panel 3200 with multiple PCBs according to one embodiment. The V-cut TX panel 3200 includes a first PCB 3202, a second PCB 3204 disposed adjacent to on opposite sides of an equator of the V-cut TX panel 3200 (e.g., north and south sides of the equator). The V-cut TX panel 3200 also includes a third PCB 3206 that is disposed a first angle from the equator and overlaps at least a portion of the first PCB 3202 and the second PCB 2404 adjacent to both the first PCB 3202 and the second PCB 3204 on a first side (e.g., west side) of the V-cut TX panel 3200. The V-cut TX panel 3200 also includes a fourth PCB 3208 that is disposed a second angle from the equator and overlaps at least a portion of the first PCB 3202 and the second PCB 3204. The multiple tiles 3210 are disposed on the first PCB 3202 and each of the multiple tiles 3210 includes multiple antenna modules that are placed in a similar manner as shown and described with respect to FIG. 20. Each antenna module includes two or more antenna elements. For example, each antenna module can include a pair of antenna elements as shown in FIG. 20. Tiles 3214 are disposed on the second PCB 3204, tiles 3216 are disposed on the third PCB 3206, and tiles 2328 are disposed on the fourth PCB 3208 in a similar manner.

In one embodiment, the PCB can be 19"×22" or 16"×22" for a TX panel that operates at 17.7 to 18.2 GHz for the V-cut TX panel 3200. The same sizes of PCB can be used for a V-cut TX panel 3200 that operates at 18.2 to 18.6 GHz, as well as at 18.8 to 19.3 GHz. Alternatively, other sizes of PCB can be used. Various embodiments described above are illustrates as TX panels. The RX panels can include similar configurations, such as illustrated in FIG. 33.

Figure 33:
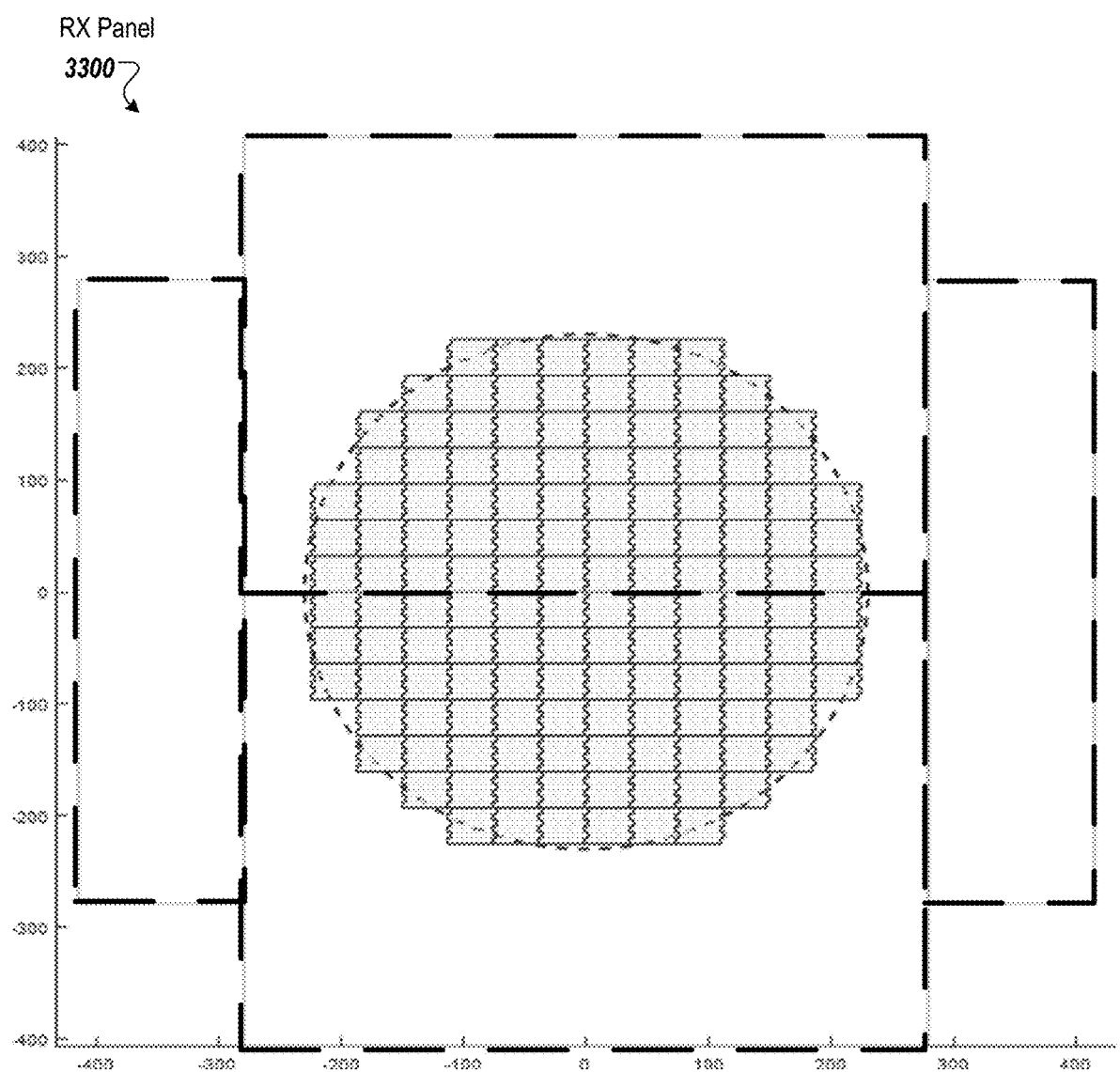
FIG. 33 illustrates an RX panel with a triangular lattice according to one embodiment.

FIG. 33 illustrates an RX panel 3300 with a triangular lattice according to one embodiment. The RX panel 3300 is an H-cut panel. Alternatively, the RX panel 3300 can be other types of cuts as described herein.

Also, as described herein, the TX and RX panels can include four modem entries, two modem entries, or the like. The modem entries can be symmetrical about various axes, as well. Also, the panels can include coefficient links. Coefficient links for a RX panel share the same active links as the modem streams. This is different on a RX panel since coefficient streams go in a reverse direction as modem streams, such as illustrated in FIG. 34.

Figure 34:
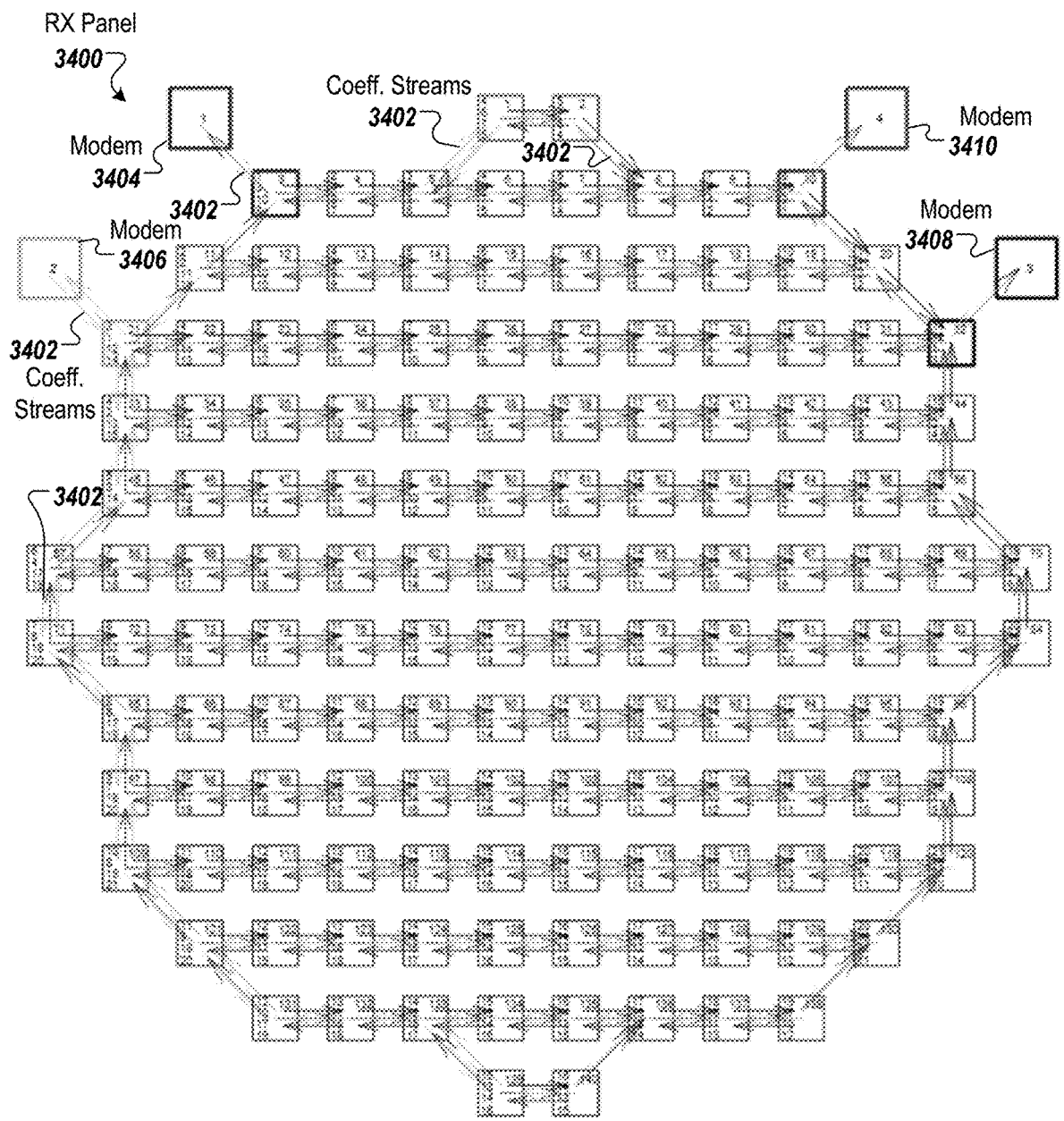
FIG. 34 illustrates coefficient stream links on a RX panel according to one embodiment.

FIG. 34 illustrates coefficient stream links on a RX panel 3400 according to one embodiment. The coefficient streams 3402 are labeled with arrows and are in an opposite direction as the RX data streams. FIG. 34 also shows four modem groups represented with the four large boxes 3404-3410 and the links between modem groups and modem entries. A total of 26 half links can be activated for coefficient streams. With single DBF failures, this number can increase to 28 or 29.

Figure 35:
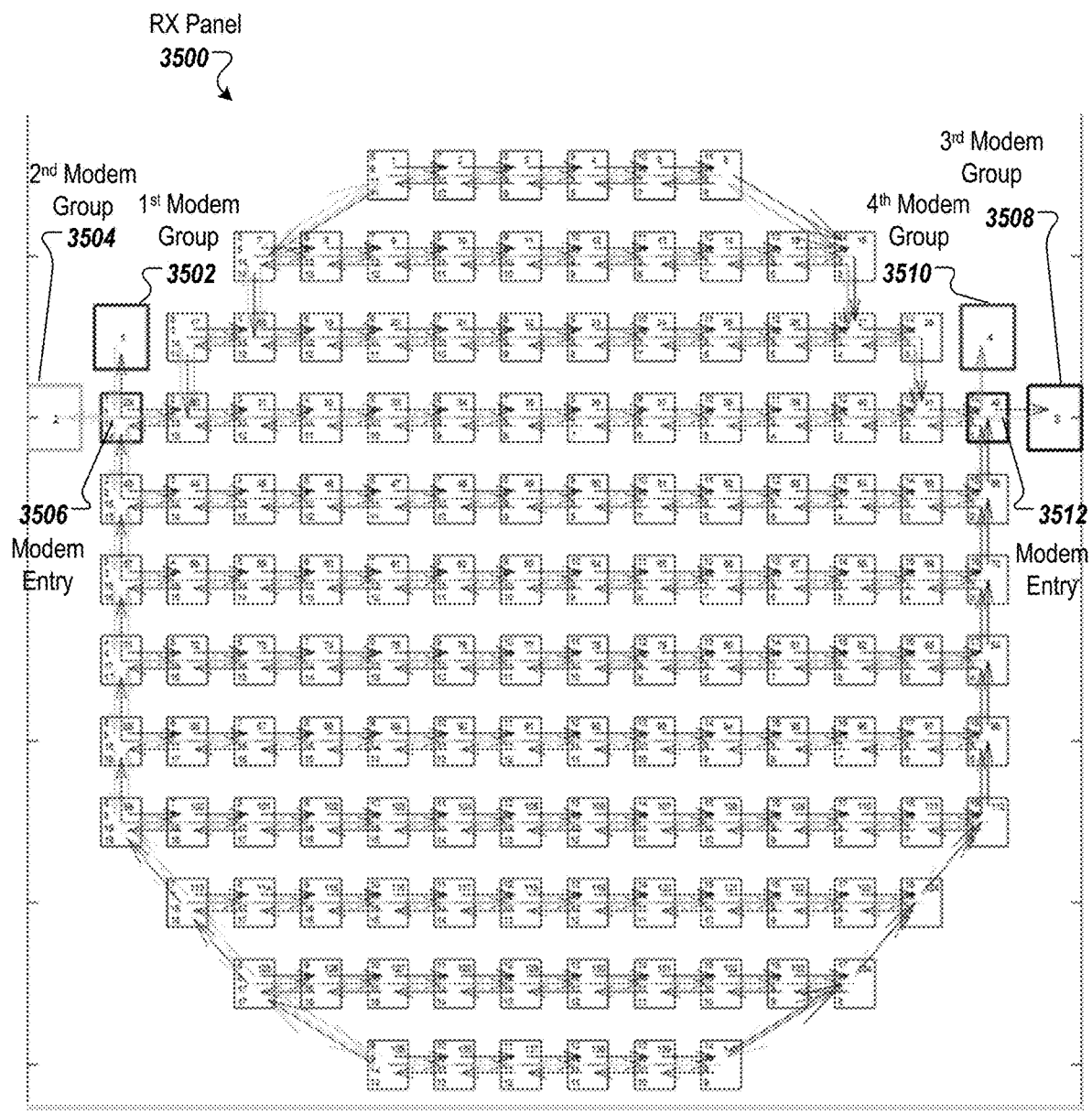
FIG. 35 illustrates two-entry SerDes connections of an RX panel with four modem groups according to one embodiment.

FIG. 35 illustrates two-entry SerDes connections of an RX panel 3500 with four modem groups according to one embodiment. The RX panel 3500 includes a first modem group 3502 and a second modem group 3504 that are both coupled to a modem entry 3506. The RX panel 3500 also includes a third modem group 3508 and a fourth modem group 3510 that are both coupled to a modem entry 2512. This is considered a 2-entry RX panel. The RX panel 3500 can include coefficient links in the opposite direction as the RX data streams illustrated in FIG. 35.

Figure 36:
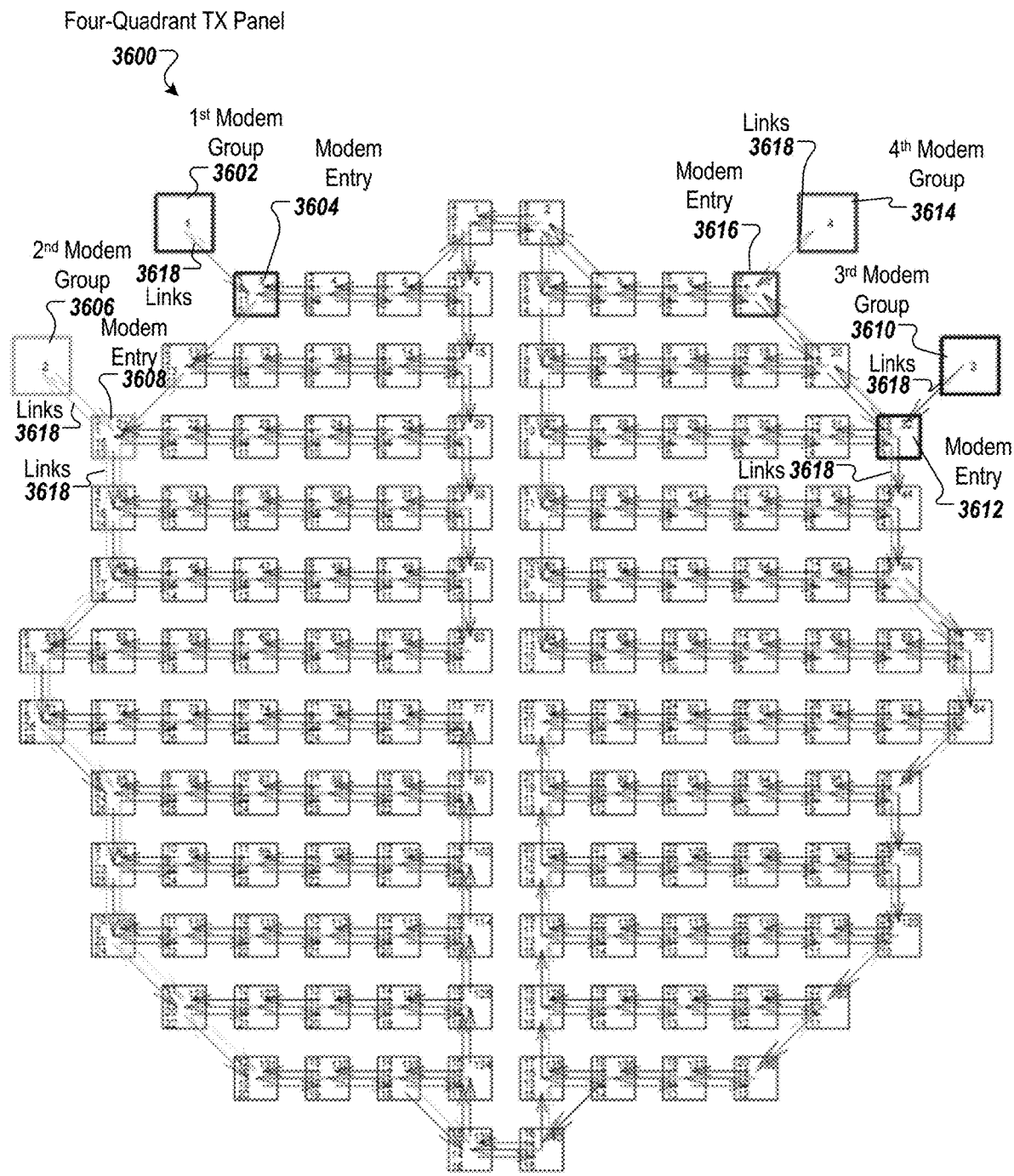
FIG. 36 illustrates response stream links on a four-quadrant TX panel according to one embodiment.

Response links for TX panel are similar to coefficient streams on RX panel as they go in reverse direction as modem streams, such as illustrated in FIG. 36.

FIG. 36 illustrates response stream links on a four-quadrant TX panel 3600 according to one embodiment. The four-quadrant TX panel 3600 includes a first modem group 3602 coupled to a first modem entry 3604, a second modem group 3606 coupled to a second modem entry 3608, a third modem group 3610 coupled to a third modem entry 3612, and a fourth modem group 3614 coupled to a fourth modem entry 3616. This is considered a 4-entry TX panel. The four-quadrant TX panel 3600 can include response links 3618 in the opposite direction as the TX data streams illustrated in FIG. 36. A total of 22 half links are activated for response streams. With single DBF failures, this number goes up to 28 and can be manually reduced if latency is not an issue. It should be noted that the response links 3618 are not needed for regular operations, which is different from coefficient links, and can be put into low power mode most of the time.

Figure 37:
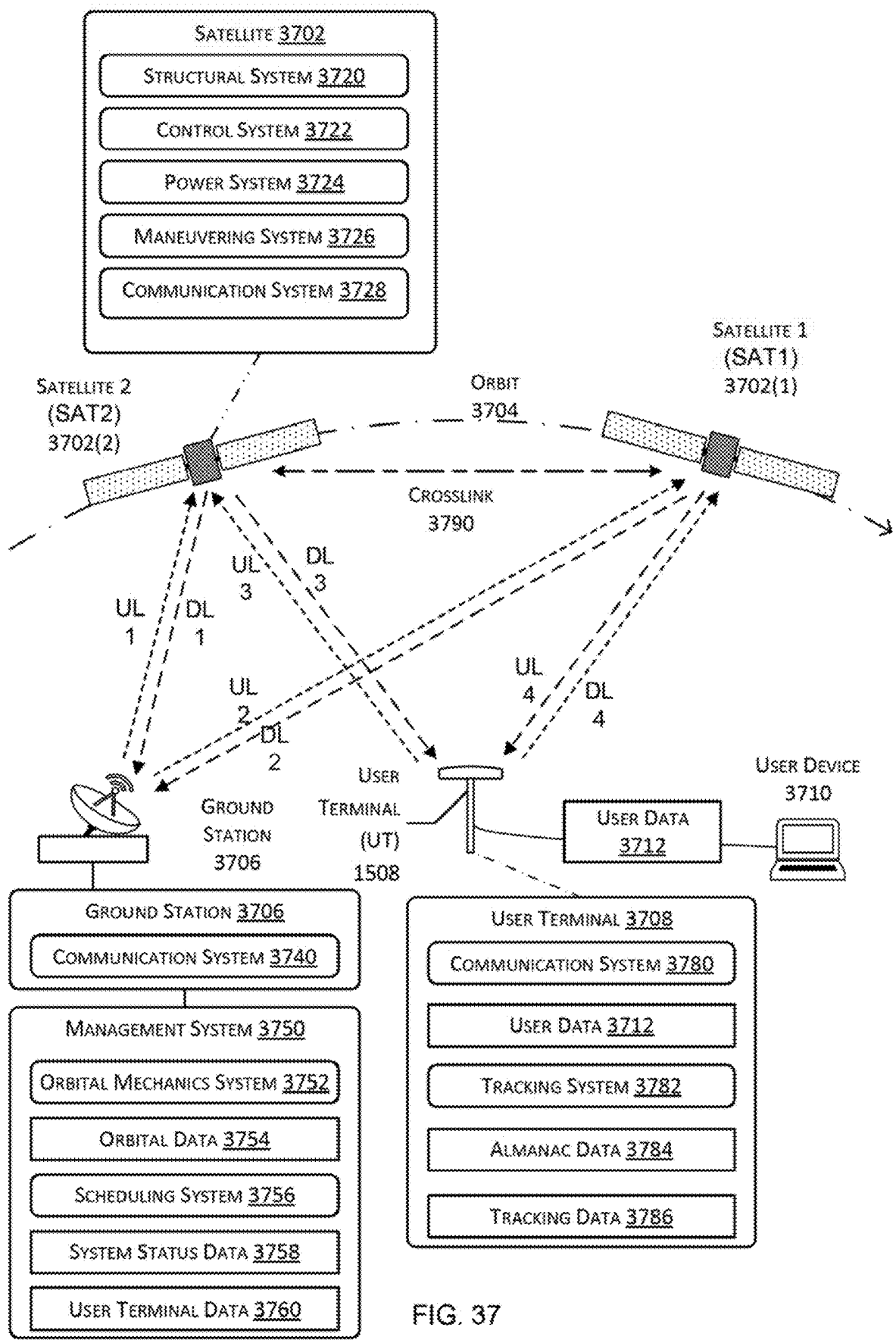
FIG. 37 illustrates a system including a constellation of satellites, each satellite being in orbit according to one embodiment.

FIG. 37 illustrates a system 3700 including a constellation of satellites 3702(1), 3702(2), . . . , 3702(S), each satellite 3702 being in orbit 3704 according to one embodiment. The system 3700 shown here comprises a plurality (or "constellation") of satellites 3702(1), 3702(2), . . . , 3702(S), each satellite 3702 being in orbit 3704. Any of the satellites 3702 can include the DBF panel 100 of FIG. 1 or the various panels described herein. Also shown is a ground station 3706, user terminal (UT) 3708, and a user device 3710.

The constellation may comprise hundreds or thousands of satellites 3702, in various orbits 3704. For example, one or more of these satellites 3702 may be in non-geosynchronous orbits (NGOs) in which they are in constant motion with respect to the Earth. For example, the orbit 3704 is a low earth orbit (LEO). In this illustration, orbit 3704 is depicted with an arc pointed to the right. A first satellite (SAT1) 3702(1) is leading (ahead of) a second satellite (SAT2) 3702(2) in the orbit 3704.

The satellite 3702 may comprise a structural system 3720, a control system 3722, a power system 3724, a maneuvering system 3726, and a communication system 3728 described herein. In other implementations, some systems may be omitted or other systems added. One or more of these systems may be communicatively coupled with one another in various combinations.

The structural system 3720 comprises one or more structural elements to support operation of the satellite 3702. For example, the structural system 3720 may include trusses, struts, panels, and so forth. The components of other systems may be affixed to, or housed by, the structural system 3720. For example, the structural system 3720 may provide mechanical mounting and support for solar panels in the power system 3724. The structural system 3720 may also provide for thermal control to maintain components of the satellite 3702 within operational temperature ranges. For example, the structural system 3720 may include louvers, heat sinks, radiators, and so forth.

The control system 3722 provides various services, such as operating the onboard systems, resource management, providing telemetry, processing commands, and so forth. For example, the control system 3722 may direct operation of the communication system 3728.

The power system 3724 provides electrical power for operation of the components onboard the satellite 3702. The power system 3724 may include components to generate electrical energy. For example, the power system 3724 may comprise one or more photovoltaic cells, thermoelectric devices, fuel cells, and so forth. The power system 3724 may include components to store electrical energy. For example, the power system 3724 may comprise one or more batteries, fuel cells, and so forth.

The maneuvering system 3726 maintains the satellite 3702 in one or more of a specified orientation or orbit 3704. For example, the maneuvering system 3726 may stabilize the satellite 3702 with respect to one or more axis. In another example, the maneuvering system 3726 may move the satellite 3702 to a specified orbit 3704. The maneuvering system 3726 may include one or more computing devices, sensors, thrusters, momentum wheels, solar sails, drag devices, and so forth. For example, the sensors of the maneuvering system 3726 may include one or more global navigation satellite system (GNSS) receivers, such as global positioning system (GPS) receivers, to provide information about the position and orientation of the satellite 3702 relative to Earth. In another example, the sensors of the maneuvering system 3726 may include one or more star trackers, horizon detectors, and so forth. The thrusters may include, but are not limited to, cold gas thrusters, hypergolic thrusters, solid-fuel thrusters, ion thrusters, arcjet thrusters, electrothermal thrusters, and so forth.

The communication system 3728 provides communication with one or more other devices, such as other satellites 3702, ground stations 3706, user terminals 3708, and so forth. The communication system 3728 may include one or more modems, digital signal processors, power amplifiers, antennas (including at least one antenna that implements multiple antenna elements, such as a phased array antenna, and including an embedded calibration antenna, such as the panels as described herein), processors, memories, storage devices, communications peripherals, interface buses, and so forth. Such components support communications with other satellites 3702, ground stations 3706, user terminals 3708, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 3728 may be output to other systems, such as to the control system 3722, for further processing. Output from a system, such as the control system 3722, may be provided to the communication system 3728 for transmission.

One or more ground stations 3706 are in communication with one or more satellites 3702. The ground stations 3706 may pass data between the satellites 3702, a management system 3750, networks such as the Internet, and so forth. The ground stations 3706 may be emplaced on land, on vehicles, at sea, and so forth. Each ground station 3706 may comprise a communication system 3740. Each ground station 3706 may use the communication system 3740 to establish communication with one or more satellites 3702, other ground stations 3706, and so forth. The ground station 3706 may also be connected to one or more communication networks. For example, the ground station 3706 may connect to a terrestrial fiber optic communication network. The ground station 3706 may act as a network gateway, passing user data 3712 or other data between the one or more communication networks and the satellites 3702. Such data may be processed by the ground station 3706 and communicated via the communication system 3740. The communication system 3740 of a ground station may include components similar to those of the communication system 3728 of a satellite 3702 and may perform similar communication functionalities. For example, the communication system 3740 may include one or more modems, digital signal processors, power amplifiers, antennas (including at least one antenna that implements multiple antenna elements, such as a phased array antenna), processors, memories, storage devices, communications peripherals, interface buses, and so forth.

The ground stations 3706 are in communication with a management system 3750. The management system 3750 is also in communication, via the ground stations 3706, with the satellites 3702 and the UTs 3708. The management system 3750 coordinates operation of the satellites 3702, ground stations 3706, UTs 3708, and other resources of the system 3700. The management system 3750 may comprise one or more of an orbital mechanics system 3752 or a scheduling system 3756.

The orbital mechanics system 3752 determines orbital data 3754 that is indicative of a state of a particular satellite 3702 at a specified time. In one implementation, the orbital mechanics system 3752 may use orbital elements that represent characteristics of the orbit 3704 of the satellites 3702 in the constellation to determine the orbital data 3754 that predicts location, velocity, and so forth of particular satellites 3702 at particular times or time intervals. For example, the orbital mechanics system 3752 may use data obtained from actual observations from tracking stations, data from the satellites 3702, scheduled maneuvers, and so forth to determine the orbital elements. The orbital mechanics system 3752 may also consider other data, such as space weather, collision mitigation, orbital elements of known debris, and so forth.

The scheduling system 3756 schedules resources to provide communication to the UTs 3708. For example, the scheduling system 3756 may determine handover data that indicates when communication is to be transferred from the first satellite 3702(1) to the second satellite 3702(2). Continuing the example, the scheduling system 3756 may also specify communication parameters such as frequency, timeslot, and so forth. During operation, the scheduling system 3756 may use information such as the orbital data 3754, system status data 3758, user terminal data 3760, and so forth.

The system status data 3758 may comprise information such as which UTs 3708 are currently transferring data, satellite availability, current satellites 3702 in use by respective UTs 3708, capacity available at particular ground stations 3706, and so forth. For example, the satellite availability may comprise information indicative of satellites 3702 that are available to provide communication service or those satellites 3702 that are unavailable for communication service. Continuing the example, a satellite 3702 may be unavailable due to malfunction, previous tasking, maneuvering, and so forth. The system status data 3758 may be indicative of past status, predictions of future status, and so forth. For example, the system status data 3758 may include information such as projected data traffic for a specified interval of time based on previous transfers of user data 3712. In another example, the system status data 3758 may be indicative of future status, such as a satellite 3702 being unavailable to provide communication service due to scheduled maneuvering, scheduled maintenance, scheduled decommissioning, and so forth.

The user terminal data 3760 may comprise information such a location of a particular UT 3708. The user terminal data 3760 may also include other information such as a priority assigned to user data 3712 associated with that UT 3708, information about the communication capabilities of that particular UT 3708, and so forth. For example, a particular UT 3708 in use by a business may be assigned a higher priority relative to a UT 3708 operated in a residential setting. Over time, different versions of UTs 3708 may be deployed, having different communication capabilities such as being able to operate at particular frequencies, supporting different signal encoding schemes, having different antenna configurations, and so forth.

The UT 3708 includes a communication system 3780 to establish communication with one or more satellites 3702. The communication system 3780 of the UT 3708 may include components similar to those of the communication system 3728 of a satellite 3702 and may perform similar communication functionalities. For example, the communication system 3780 may include one or more modems, digital signal processors, power amplifiers, antennas (including at least one antenna that implements multiple antenna elements, such as a phased array antenna), processors, memories, storage devices, communications peripherals, interface buses, and so forth. The UT 3708 passes user data 3712 between the constellation of satellites 3702 and the user device 3710. The user data 3712 includes data originated by the user device 3710 or addressed to the user device 3710. The UT 3708 may be fixed or in motion. For example, the UT 3708 may be used at a residence, or on a vehicle such as a car, boat, aerostat, drone, airplane, and so forth.

The UT 3708 includes a tracking system 3782. The tracking system 3782 uses almanac data 3784 to determine tracking data 3786. The almanac data 3784 provides information indicative of orbital elements of the orbit 3704 of one or more satellites 3702. For example, the almanac data 3784 may comprise orbital elements such as "two-line element" data for the satellites 3702 in the constellation that are broadcast or otherwise sent to the UTs 3708 using the communication system 3780.

The tracking system 3782 may use the current location of the UT 3708 and the almanac data 3784 to determine the tracking data 3786 for the satellite 3702. For example, based on the current location of the UT 3708 and the predicted position and movement of the satellites 3702, the tracking system 3782 is able to calculate the tracking data 3786. The tracking data 3786 may include information indicative of azimuth, elevation, distance to the second satellite, time of flight correction, or other information at a specified time. The determination of the tracking data 3786 may be ongoing. For example, the first UT 3708 may determine tracking data 3786 every 400 ms, every second, every five seconds, or at other intervals.

With regard to FIG. 37, an uplink is a communication link which allows data to be sent to a satellite 3702 from a ground station 3706, UT 3708, or device other than another satellite 3702. Uplinks are designated as UL1, UL2, UL3 and so forth. For example, UL1 is a first uplink from the ground station 3706 to the second satellite 3702(2). In comparison, a downlink is a communication link which allows data to be sent from the satellite 3702 to a ground station 3706, UT 3708, or device other than another satellite 3702. For example, DL1 is a first downlink from the second satellite 3702(2) to the ground station 3706. The satellites 3702 may also be in communication with one another. For example, a crosslink 3790 provides for communication between satellites 3702 in the constellation.

The satellite 3702, the ground station 3706, the user terminal 3708, the user device 3710, the management system 3750, or other systems described herein may include one or more computer devices or computer systems comprising one or more hardware processors, computer-readable storage media, and so forth. For example, the hardware processors may include application specific integrated circuits (ASICs), field-programmable gate arrays (FPGAs), microcontrollers, digital signal processors (DSPs), and so forth. The computer-readable storage media can include system memory, which may correspond to any combination of volatile and/or non-volatile memory or storage technologies. The system memory can store information that provides an operating system, various program modules, program data, and/or other software or firmware components. In one embodiment, the system memory stores instructions of methods to control operation of the electronic device. The electronic device performs functions by using the processor(s) to execute instructions provided by the system memory. Embodiments may be provided as a software program or computer program including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Figure 38:
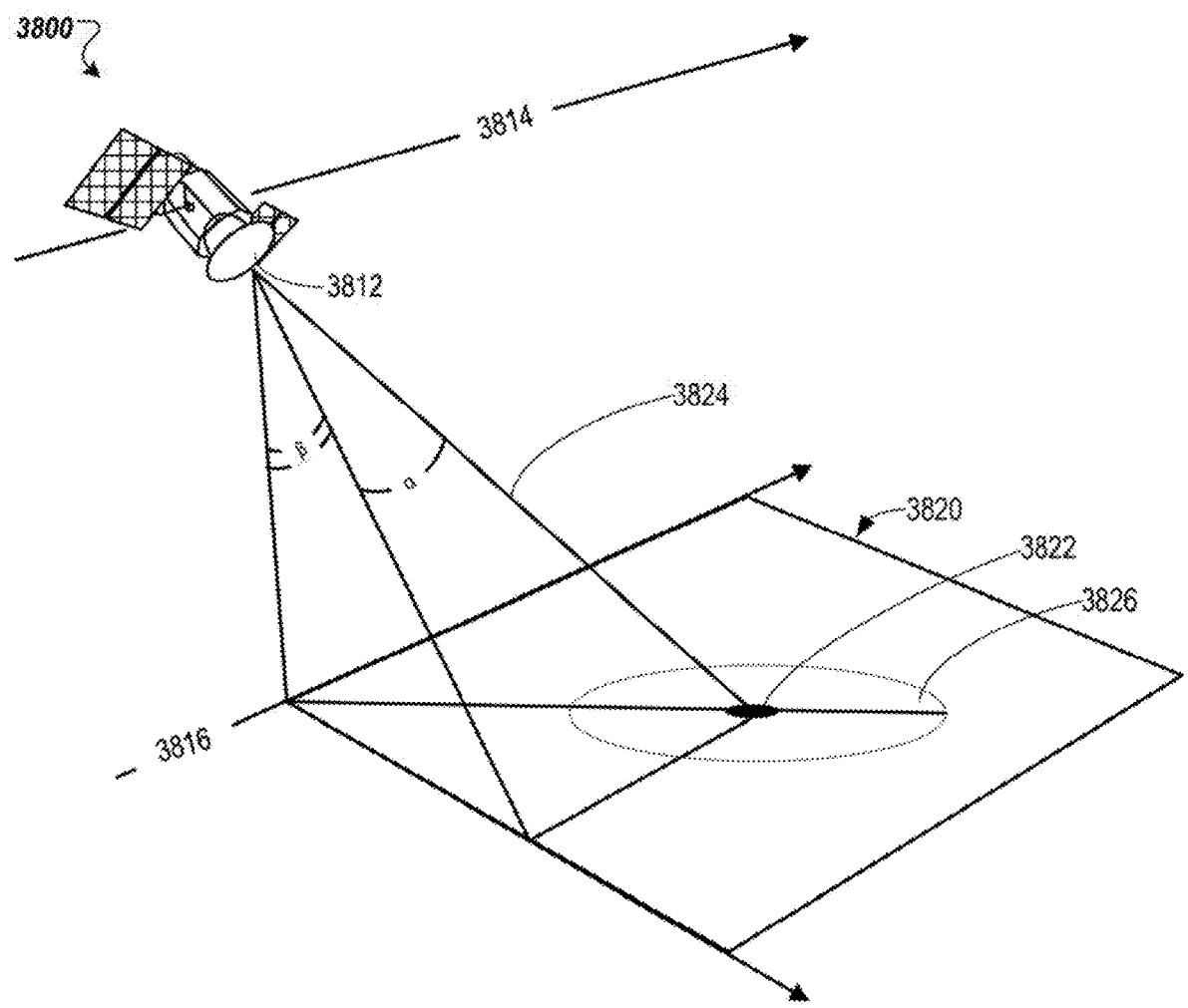
FIG. 38 illustrates the satellite including an antenna system that is steerable according to one embodiment.

FIG. 38 illustrates the satellite 3800 including an antenna system 3812 that is steerable according to one embodiment. The satellite 3800 can include the communication system 3728 of FIG. 37. The antenna system 3812 may include multiple antenna elements that form an antenna and that can be mechanically or electrically steered individually, collectively, or a combination thereof. In an example, the antenna is a phased array antenna.

In orbit 3704, the satellite 3800 follows a path 3814, the projection of which onto the surface of the Earth forms a ground path 3816. In the example illustrated in FIG. 38, the ground path 3816 and a projected axis extending orthogonally from the ground path 3816 at the position of the satellite 3800, together define a region 3820 of the surface of the Earth. In this example, the satellite 3800 is capable of establishing uplink and downlink communications with one or more of ground stations, user terminals, or other devices within the region 3820, including a ground station 3706 and a user terminal 3708 of FIG. 37. In some embodiments, the region 3820 may be located in a different relative position to the ground path 3816 and the position of the satellite 3800. For example, the region 3820 may describe a region of the surface of the Earth directly below the satellite 3800. Furthermore, embodiments may include communications between the satellite 3800, an airborne communications system, and so forth.

As shown in FIG. 38, a communication target 3822 (e.g., a ground station, a user terminal, or a CT (such as an HD CT)) is located within the region 3820. The satellite 3800 controls the antenna system 3812 to steer transmission and reception of communications signals to selectively communicate with the communication target 3822. For example, in a downlink transmission from the satellite 3800 to the communication target 3822, a signal beam 3824 emitted by the antenna system 3812 is steerable within an area 3826 of the region 3820. In some implementations, the signal beam 3824 may comprise a plurality of subbeams. The extents of the area 3826 define an angular range within which the signal beam 3824 is steerable, where the direction of the signal beam 3824 is described by a beam angle "α" relative to a surface normal vector of the antenna system 3812. In two-dimensional phased array antennas, the signal beam 3824 is steerable in two dimensions, described in FIG. 38 by a second angle "β" orthogonal to the beam angle α. In this way, the area 3826 is a two-dimensional area within the region 3820, rather than a linear track at a fixed angle determined by the orientation of the antenna system 3812 relative to the ground path 3816.

In FIG. 38, as the satellite 3800 follows the path 3814, the area 3826 tracks along the surface of the Earth. In this way, the communication target 3822, which is shown centered in the area 3826 for clarity, is within the angular range of the antenna system 3812 for a period of time. During that time, signals communicated between the satellite 3800 and the communication target 3822 are subject to bandwidth constraints, including but not limited to signal strength and calibration of the signal beam 3824. In an example, for phased array antenna systems, the signal beam 3824 is generated by an array of mutually coupled antenna elements, wherein constructive and destructive interference produce a directional beam. Among other factors, phase drift, amplitude drift (e.g., of a transmitted signal in a transmitter array), and so forth affect the interference properties and thus the resultant directional beam or subbeam.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is used herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "sending," "receiving," "scheduling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, Read-Only Memories (ROMs), compact disc ROMs (CD-ROMs) and magnetic-optical disks, Random Access Memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A panel for a phased array antenna of a satellite, the panel comprising:
   a first modem;
   a second modem;
   a first chain of digital beam forming (DBF) devices, the first chain comprising:
      a first digital beam forming (DBF) device coupled to the first modem over a first Serializer/Deserializer (SerDes) link, wherein the first DBF device is coupled to a first set of radio frequency front-end (RFFE) circuits, each RFFE circuit of the first set of RFFE circuits being coupled to at least one antenna element of the phased array antenna; and
      a first set of DBF devices coupled in a series with a respective SerDes link between each pair of DBF devices in the series, wherein the first set of DBF devices comprises a second DBF device that is coupled to the first DBF device over a second SerDes link, wherein each DBF device of the first set is coupled to a respective set of RFFE circuits that is each coupled to at least one antenna element of the phased array antenna; and
   a second chain of DBF devices, the second chain comprising:
      a third DBF device coupled to the second modem over a third SerDes link, wherein the third DBF device is coupled to a second set of RFFE circuits, each RFFE circuit of the second set of RFFE circuits being coupled to at least one antenna element of the phased array antenna; and
      a second set of DBF devices coupled in a series with a respective SerDes link between each pair of DBF devices in the series, wherein the second set of DBF devices comprises a fourth DBF device that is coupled to the third DBF device over a third SerDes link, wherein each DBF device of the second set is coupled to a respective set of RFFE circuits that is each coupled to at least one antenna element of the phased array antenna, and wherein the DBF devices of the first chain and the DBF devices of the second chain are symmetrically located on the panel.

2. The panel of claim 1, further comprising:
three circuit boards, wherein antenna elements of the phased array antenna are located on a first side of each of the three circuit boards, and wherein the DBF devices of the first chain and the DBF devices of the second chain are located on a second side of each of the three circuit boards, wherein the three circuit boards are part of at least one of a four-quadrant panel, a four-quadrant X-cut panel, an H-cut panel, a T-cut panel, or a V-cut panel.

3. The panel of claim 1, wherein the first DBF device comprises:
a digital signal processing (DSP) unit; and
a memory device coupled to the DSP unit, wherein the DSP unit:
receives a first data stream from a first antenna element;
processes the first data stream;
stores the first data stream with a first time stamp in the memory device;
receives a second data stream from the second DBF device over the second SerDes link;
combines the second data stream with the first data stream to generate a combined data stream, wherein the second data stream has a second time stamp that matches the first time stamp; and
outputs the combined data stream to the first modem over the first SerDes link.

4. A communication system comprising:
a first modem;
a first digital beam forming (DBF) device coupled to the first modem over a first Serializer/Deserializer (SerDes) link and coupled to a first set of radio frequency front-end (RFFE) circuits;
a second DBF device coupled to the first DBF device over a second SerDes link and coupled to a second set of RFFE circuits;
a first set of antenna elements coupled to a first RFFE circuit of the first set of RFFE circuits;
a second set of antenna elements coupled to a second RFFE circuit of the first set of RFFE circuits; and
a third set of antenna elements coupled to a first RFFE circuit of the second set of RFFE circuits.

5. The communication system of claim 4, wherein the first DBF device is part of a transmit (TX) panel and is configured to:
receive a first data stream from the first modem over the first SerDes link;
send the first data stream to the second DBF device over the second SerDes link; and
send at least a portion of the first data stream to the first set of RFFE circuits.

6. The communication system of claim 4, wherein the first DBF device is part of a receive (RX) panel and is configured to:
receive a first data stream from the first set of RFFE circuits;
receive a second data stream from the second DBF device over the second SerDes link; and
send a combined data stream to the first modem over the first SerDes link, wherein the combined data stream comprises at least a portion of the first data stream and at least a portion of the second data stream, wherein the portion of the second data stream has a second time stamp that matches a first time stamp of the portion of the first data stream.

7. The communication system of claim 4, wherein the first DBF device is part of a receive (RX) panel and the first DBF device comprises:
a digital signal processing (DSP) unit; and
a memory device coupled to the DSP unit, wherein the DSP unit is configured to:
receive a first data stream from the first set of RFFE circuits;
process the first data stream and store the first data stream with first time stamp data in the memory device;
receive a second data stream from the second DBF device over the second SerDes link, the second data stream comprising second time stamp data;
combine a portion of the first data stream and a portion of the second data stream to generate a combined data stream; and
output the combined data stream to the first modem over the first SerDes link, wherein the portion of the first data stream has a first time stamp that matches a second time stamp of the portion of the second data stream.

8. The communication system of claim 7, wherein the memory device comprises:
a first memory buffer that stores the first data stream;
a second memory buffer that stores the second data stream; and
a third memory buffer that store a third data stream received from a third DBF device over a third SerDes link, and wherein the DSP unit is further configured to include a portion of the third data stream into the combined data stream, wherein the portion of the third data stream comprises a third time stamp that matches the first time stamp and the second time stamp.

9. The communication system of claim 7, wherein the memory device comprises:
a first memory buffer that stores the first data stream;
a second memory buffer that stores the combined data stream; and
a third memory buffer that stores a third data stream received from a third DBF device over a third SerDes link, and wherein the DSP unit is further configured to combine a portion of the third data stream with the combined data stream into a second combined data stream, wherein the portion of the third data stream comprise a third time stamp that matches the first time stamp and the second time stamp.

10. The communication system of claim 7, wherein the memory device comprises a first memory buffer that stores the first data stream, wherein the DSP unit is further configured to:
receive a third data stream from a third DBF device over a third SerDes link, the third data stream comprising third time stamp data;
combine the portion of the first data stream, the portion of the second data stream, and a portion of the third data stream to generate a combined data stream; and
output the combined data stream to the first modem over the first SerDes link, wherein the portion of the third data stream has a third time stamp that matches the second time stamp and the first time stamp, and wherein the portion of the second data stream is delayed at the second DBF device and the portion of the third data stream is delayed at the third DBF device such that the portion of the second data stream and the portion of the third data stream are not stored in the first memory buffer.

11. The communication system of claim 4, further comprising:
- a second modem coupled to a second chain of DBF devices, wherein:
- the first DBF device and the second DBF device are part of a first chain of DBF devices;
- DBF devices of the second chain are coupled in a series with a respective SerDes link between each pair of the DBF devices in the series;
- each DBF device in the first chain and the second chain is coupled to a respective set of RFFE circuits, wherein each of the respective set of RFFE circuits is coupled to at least one antenna element; and
- the DBF devices of the first chain and the DBF devices of the second chain are symmetrically located on a panel of a phased array antenna.

12. The communication system of claim 11, wherein the panel comprises four circuit boards, wherein antenna elements of the phased array antenna are located on a first side of the four circuit boards, wherein the first chain and the second chain are located on a second side of the four circuit boards.

13. The communication system of claim 11, wherein the panel comprises three circuit boards, wherein antenna elements of the phased array antenna are located on a first side of the three circuit boards, wherein the DBF devices of the first chain and the DBF devices of the second chain are located on a second side of the three circuit boards.

14. The communication system of claim 13, wherein the panel is a T-cut panel or a V-cut panel.

15. The communication system of claim 4, further comprising:
- a first tile comprising a first antenna module located on a first side of a first circuit board, wherein the first DBF device is located on a second side of the first circuit board; and
- a second tile comprising a second antenna module located on the first side of the first circuit board, wherein the second DBF device is located on the second side of the first circuit board, wherein the first antenna module and the second antenna module are identical.

16. A panel for a phased array antenna, the panel comprising:
- a circuit board;
- a first antenna module disposed on a first side of the circuit board, the first antenna module comprising two or more antenna elements;
- a second antenna module disposed on the first side of the circuit board, the second antenna module comprising two or more antenna elements;
- a third antenna module disposed on the first side of the circuit board, the third antenna module comprising two or more antenna elements;
- a first modem disposed on a second side of the circuit board;
- a first digital beam forming (DBF) device disposed on the second side of the circuit board, wherein the first DBF device is coupled to the first modem over a first Serializer/Deserializer (SerDes) link and coupled to the first antenna module;
- a second DBF device disposed on the second side of the circuit board, wherein the second DBF device is coupled to the first DBF device over a second SerDes link and coupled to the second antenna module; and
- a third DBF device disposed on the second side of the circuit board, wherein the third DBF device is coupled to the second DBF device over a third SerDes link and coupled to the third antenna module.

17. The panel of claim 16, further comprising:
- a fourth antenna module disposed on the second side of the circuit board, wherein the fourth antenna module is coupled to the first DBF device;
- a fifth antenna module disposed on the second side of the circuit board, wherein the fifth antenna module is coupled to the second DBF device; and
- a sixth antenna module disposed on the second side of the circuit board, wherein the sixth antenna module is coupled to the third DBF device.

18. The panel of claim 16, wherein the first DBF device, the second DBF device, and the third DBF device are part of a first chain of DBF devices, and wherein the panel further comprises a second chain of DBF device that is located on the panel symmetrically with respect to the first chain.

19. The panel of claim 16, wherein the first DBF device is part of a receive (RX) panel and the first DBF device comprises:
- a digital signal processing (DSP) unit; and
- a memory device coupled to the DSP unit, wherein the DSP unit is configured to:
  - receive a first data stream from the first antenna module;
  - process the first data stream and store the first data stream with first time stamp data in the memory device;
  - receive a second data stream from the second DBF device over the second SerDes link, the second data stream comprising second time stamp data;
  - combine a portion of the first data stream and a portion of the second data stream to generate a combined data stream; and
  - output the combined data stream to the first modem over the first SerDes link, wherein the portion of the first data stream has a first time stamp that matches a second time stamp of the portion of the second data stream.

20. The panel of claim 19, wherein the memory device comprises a first memory buffer that stores the first data stream, wherein the DSP unit is further configured to:
- receive a third data stream from a third DBF device over a third SerDes link, the third data stream comprising third time stamp data;
- combine the portion of the first data stream, the portion of the second data stream, and a portion of the third data stream to generate a combined data stream; and
- output the combined data stream to the first modem over the first SerDes link, wherein the portion of the third data stream has a third time stamp that matches the second time stamp and the first time stamp, and wherein the portion of the second data stream is delayed at the second DBF device and the portion of the third data stream is delayed at the third DBF device such that the portion of the second data stream and the portion of the third data stream are not stored in the first memory buffer.

* * * * *